United States Patent
White et al.

(10) Patent No.: US 12,293,222 B2
(45) Date of Patent: May 6, 2025

(54) METHOD AND SYSTEM FOR PERFORMING DOMAIN LEVEL SCHEDULING OF AN APPLICATION IN A DISTRIBUTED MULTI-TIERED COMPUTING ENVIRONMENT

(71) Applicant: Dell Products L.P., Round Rock, TX (US)

(72) Inventors: William Jeffery White, Plano, TX (US); Said Tabet, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 483 days.

(21) Appl. No.: 17/721,987

(22) Filed: Apr. 15, 2022

(65) Prior Publication Data

US 2023/0333881 A1    Oct. 19, 2023

(51) Int. Cl.
G06F 9/48    (2006.01)

(52) U.S. Cl.
CPC ................................. G06F 9/4881 (2013.01)

(58) Field of Classification Search
CPC ...... G06F 9/4881; G06F 9/5072; G06F 21/31; G06F 9/5038; H04L 67/10
See application file for complete search history.

(56) References Cited

U.S. PATENT DOCUMENTS

| | | |
|---|---|---|
| 8,056,079 B1 | 11/2011 | Martin |
| 11,089,092 B1 | 8/2021 | Seibel |
| 2002/0016729 A1 | 2/2002 | Breitenbach |
| 2007/0283351 A1* | 12/2007 | Degenaro ............ G06F 9/5055 718/100 |
| 2012/0066759 A1 | 3/2012 | Chen |
| 2012/0179824 A1 | 7/2012 | Jackson |
| 2012/0284408 A1 | 11/2012 | Dutta |

(Continued)

OTHER PUBLICATIONS

Tong, Z., Deng, X., Chen, H. et al. QL-HEFT: a novel machine learning scheduling scheme base on cloud computing environment. Neural Comput & Applic 32, 5553-5570 (2020). https://doi.org/10.1007/s00521-019-04118-8.

(Continued)

*Primary Examiner* — Jorge A Chu Joy-Davila
(74) *Attorney, Agent, or Firm* — Chamberlain, Hrdlicka, White, Williams & Aughtry; Aly Z. Dossa

(57) ABSTRACT

Techniques described herein relate to a method for managing a distributed multi-tiered computing (DMC) environment. The method includes identifying, by a local controller associated with an DMC domain, a domain scheduling event associated with a scheduling job; and in response to identifying the domain scheduling event: identifying a candidate list of devices of the DMC domain to schedule tasks associated with the scheduling job based on a location and service level objectives; refining the candidate list of devices based on device configuration requirements, device management requirements, and security requirements to generate a final candidate list; scheduling tasks to devices using the final candidate list; generating scheduling assignments and provisioning command packages based on the scheduled tasks; providing the scheduling assignments and the provision command packages to the devices; and updating a graph based on the scheduling assignments.

20 Claims, 15 Drawing Sheets

(56) References Cited

U.S. PATENT DOCUMENTS

| | | | |
|---|---|---|---|
| 2013/0346993 A1* | 12/2013 | Chen .................... | G06F 9/5072 718/103 |
| 2016/0011912 A1 | 1/2016 | Rangaraju | |
| 2016/0085587 A1* | 3/2016 | Dube .................... | G06F 9/4881 718/104 |
| 2016/0212007 A1* | 7/2016 | Alatorre ................ | H04L 41/04 |
| 2017/0257257 A1 | 9/2017 | Dawes | |
| 2017/0339070 A1 | 11/2017 | Chang | |
| 2018/0159745 A1 | 6/2018 | Byers | |
| 2018/0287902 A1 | 10/2018 | Chitalia | |
| 2018/0349183 A1* | 12/2018 | Popovic ............. | H04L 41/0806 |
| 2019/0324828 A1* | 10/2019 | Young .................... | G06F 9/546 |
| 2020/0021537 A1 | 1/2020 | Oliveira | |
| 2020/0159573 A1 | 5/2020 | Dobrev | |
| 2020/0192714 A1 | 6/2020 | Clow | |
| 2020/0351337 A1 | 11/2020 | Calmon | |
| 2020/0401452 A1 | 12/2020 | Piercey | |
| 2021/0064492 A1 | 3/2021 | Myers | |
| 2021/0294661 A1 | 9/2021 | Turner | |
| 2022/0094690 A1 | 3/2022 | Tarkhanyan | |
| 2022/0114033 A1* | 4/2022 | Arvinte ................ | G06F 18/217 |
| 2022/0116456 A1 | 4/2022 | Higuchi | |
| 2022/0291952 A1 | 9/2022 | Milojicic | |
| 2022/0318052 A1 | 10/2022 | Sivathanu | |
| 2023/0096811 A1 | 3/2023 | Meghani | |
| 2023/0168875 A1 | 6/2023 | Carter | |

OTHER PUBLICATIONS

Alexandru Iulian Orhean[a], Florin Pop[a] a, Ioan Raicu[b] [a] Computer Science Department, Faculty of Automatic Control and Computers, University Politehnica of Bucharest, Romania [b] Department of Computer Science (CS), Illinois Institute of Technology (IIT). New Scheduling Approach using Reinforcement Learning for Heterogeneous Distributed Systems, 2017, Journal of Parallel and Distributed Computing.

Basel Magableh, School of Computer Science, Dublin Institute of Technology, Technological University Dublin, Ireland. A Deep Recurrent Q Network towards Self-adapting Distributed Microservices architecture. arXiv:1901.04011v2 [cs.SE] Jan. 15, 2019.

Debeer and Strobl BMC Bioinformatics. Conditional Permutation Importance Revisited. (2020) 21:307 https://doi.org/10.1186/s12859-020-03622-2.

Haoran Qiu, Subho S. Banerjee, Saurabh Jha, Zbigniew T. Kalbarczyk, and Ravishankar K. Iyer, University of Illinois at Urbana-Champaign. FIRM: An Intelligent Fine-grained Resource Management Framework for SLO-Oriented Microservices. Corpus ID 978-1-939133-19-9, 2020 14th Usenix Symposium on Operating Systems Design and Implementation, Nov. 4-6, 2022.

Huang, Huang, Chen, Wang, IEEE: Simulated Annealing for Sequential Pattern Detection and Seismic Applications, Dec. 2014 doi.org/10.1109/JSTARS.2014.2344756.

Lin, Li, Liao, Franke, Capacity Optimization for Resource Pooling in Virtualized Data Centers with Composable Systems, DOI 10.1109/TPDS.2017.2757479 (2017).

Muhammad Tirmazi, Adam Barker, Nan Deng, Md E. Haque, Zhijing Gene Qin, Steven Hand, MorHarchol-Balter, and John Wilkes. 2020. Borg: the Next Generation. In Fifteenth European Conference on Computer Systems (EuroSys 20), Apr. 27-30, 2020, Heraklion, Greece. ACM, New York, NY, USA, 14 pages. https://doi.org/10.1145/3342195.3387517.

Oren Ben-Kiki et al. "YAML Aint Markup Language (YAML) version 1.2"; Revision 1.2.2 (Oct. 1, 2021); <https://yaml.org> 66 pages.

Stoica, INRA-Biometrie, Gregori, University Jaume I, Mateu, University Jaume I: Simulated Annealing and Object Point Processes: Tools for Analysis of Spatial Patterns, Jul. 2005.

Yihui Feng, Alibaba Group; Zhi Liu, Yunjian Zhao, Tatiana Jin, and Yidi Wu, The Chinese University of Hong Kong; Yang Zhang, Alibaba Group; James Cheng, The Chinese University of Hong Kong; Chao Li and Tao Guan, Alibaba Group. Scaling Large Production Clusters with Partitioned Synchronization. Corpus ID 235344400. 2021 Usenix Annual Technical Conference, Jul. 14-16, 2021.

Abdulaziz Alhubaishy et al., The Best-Worst Method for Resource Allocation and Task Scheduling in Cloud Computing, 6 pages, Year: 2020.

Aref Abdullah et al., A reliable, TOPSIS-based multi-criteria, and hierarchical load balancing method for computational grid, 21 pages, Year: 2019.

Dang Minh Quan et al., On Architecture for SLA-aware Workflows in Grid Environments, 19 Pages, Year: 2005.

Dheeraj Rane et al., Cloud Brokering Architecture for Dynamic Placement of Virtual Machines, 8 pages, 2015.

Ivan Roderoa et al., Grid broker selection strategies using aggregated resource information, 14 pages, Year: 2009.

S. M. Jaybhaye et al., Heterogeneous Resource Provisioning for Workflow-Based Applications Using AHP in Cloud Computing, Chapter 41, 15 pages, Year : 2021.

Seyed Hossein Mortazavi Etc, Cloud Path: A Multi-Tier Cloud Computing Framework, Cloud Path: 13 pages, 2017.

* cited by examiner

METHOD AND SYSTEM FOR PERFORMING DOMAIN LEVEL SCHEDULING OF AN APPLICATION IN A DISTRIBUTED MULTI-TIERED COMPUTING ENVIRONMENT

BACKGROUND

Computing devices often exist in complex ecosystems of devices in which data exists and/or is generated. Such data may be used and/or operated on to produce any number of results. Such operations are often performed by applications that include any number of services. It may be advantageous to provision all or portions of such applications within certain portions of the ecosystem of devices. However, as the complexity of such an ecosystem increases (e.g., more data, more devices, etc.), it may become difficult to determine where to provision applications, and how to efficiently do so once target domains are determined. All or portions of such application may be provisioned in a collection of devices known as a domain.

SUMMARY

In general, certain embodiments described herein relate to a method for managing a distributed multi-tiered computing (DMC) environment. The method may include identifying, by a local controller associated with an DMC domain, a domain scheduling event associated with a scheduling job; and in response to identifying the domain scheduling event: identifying a candidate list of devices of the DMC domain to schedule tasks associated with the scheduling job based on a location and service level objectives; refining the candidate list of devices based on device configuration requirements, device management requirements, and security requirements to generate a final candidate list; scheduling tasks to devices using the final candidate list; generating scheduling assignments and provisioning command packages based on the scheduled tasks; providing the scheduling assignments and the provision command packages to the devices; and updating a graph based on the scheduling assignments.

In general, certain embodiments described herein relate to a non-transitory computer readable medium that includes computer readable program code, which when executed by a computer processor enables the computer processor to perform a method for managing a distributed multi-tiered computing (DMC) environment. The method may include identifying, by a local controller associated with an DMC domain, a domain scheduling event associated with a scheduling job; and in response to identifying the domain scheduling event: identifying a candidate list of devices of the DMC domain to schedule tasks associated with the scheduling job based on a location and service level objectives; refining the candidate list of devices based on device configuration requirements, device management requirements, and security requirements to generate a final candidate list; scheduling tasks to devices using the final candidate list; generating scheduling assignments and provisioning command packages based on the scheduled tasks; providing the scheduling assignments and the provision command packages to the devices; and updating a graph based on the scheduling assignments.

In general, certain embodiments described herein relate to a system for managing a distributed multi-tiered computing (DMC) environment. The system may include a DMC environment. The system may also include a local controller of DMC environment, comprising a processor and memory, and includes the functionality to identify a domain scheduling event associated with a scheduling job; and in response to identifying the domain scheduling event: identify a candidate list of devices of the DMC domain to schedule tasks associated with the scheduling job based on a location and service level objectives; refine the candidate list of devices based on device configuration requirements, device management requirements, and security requirements to generate a final candidate list; schedule tasks to devices using the final candidate list; generate scheduling assignments and provisioning command packages based on the scheduled tasks; provide the scheduling assignments and the provision command packages to the devices; and update a graph based on the scheduling assignments.

Other aspects of the embodiments disclosed herein will be apparent from the following description and the appended claims.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

DETAILED DESCRIPTION

Figure 1A:
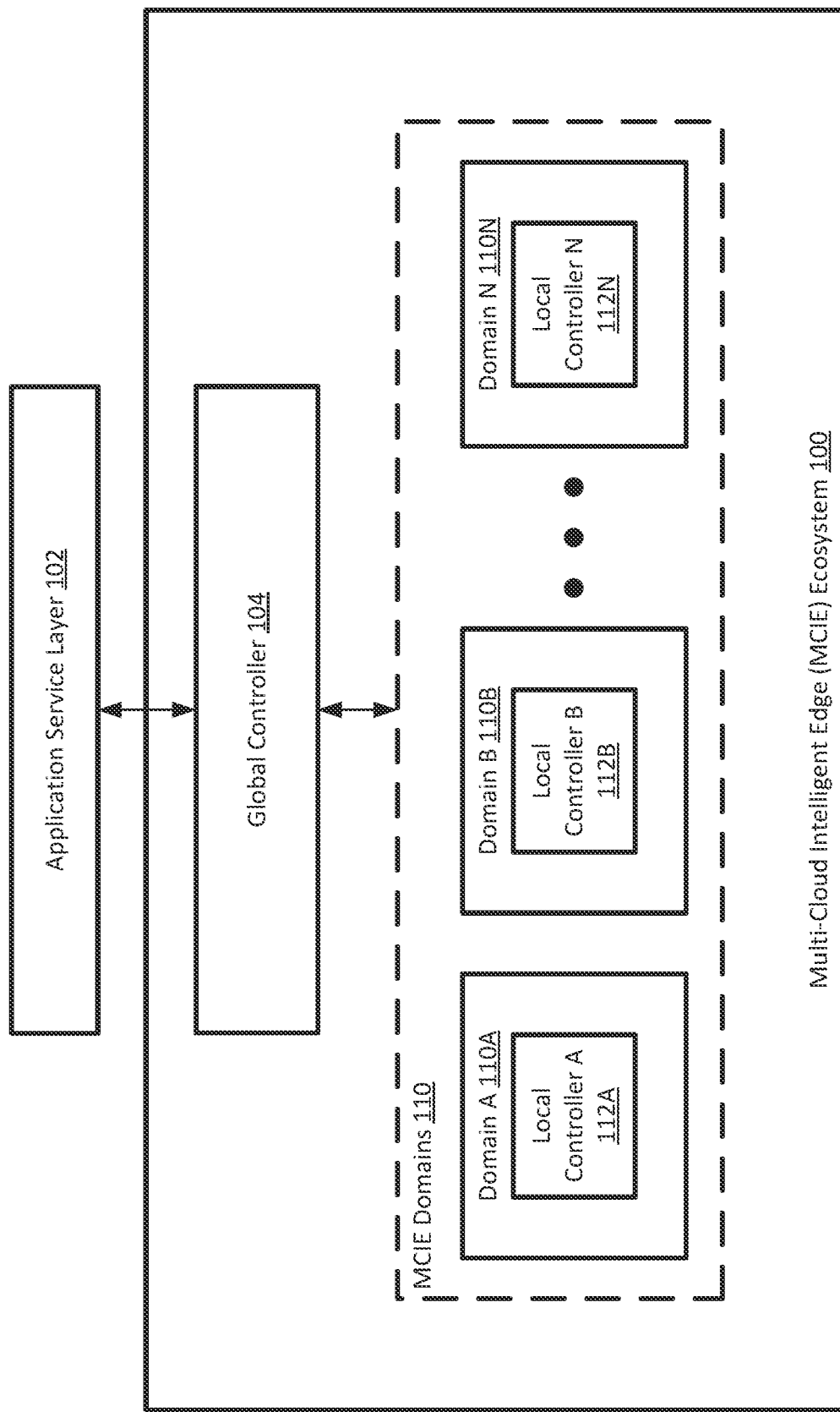
FIG. 1A shows a diagram of a system in accordance with one or more embodiments disclosed herein.

Specific embodiments will now be described with reference to the accompanying figures. In the following description, numerous details are set forth as examples of embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an entity that is programmed to and/or configured to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In general, embodiments described herein relate to methods, systems, and non-transitory computer readable mediums storing instructions for selecting scheduling policies when provisioning applications, or portions thereof, in a distributed multi-tiered computing environment.

In one or more embodiments, as computing environments grow in size and complexity (e.g., from multi-cloud to multi-core to multi-edge domains of a distributed multi-tiered computing environment), connecting more diverse devices generating more data, the need to be able to efficiently provision applications in such environments is required in order to support complex workflows. In one or more embodiments, as the overall application workflow extends within an environment to capture, process, analyze, or otherwise use data, fitting the services of the application workflow to the capabilities and capacities of the various portions of the distributed multi-tiered computing environment is required. Such fitting may allow for meeting the service level agreement (SLA) and/or service level objects (SLOs) for the application workflow and the services used in building the workflow, which may be achieved by provisioning work to portions of the distributed mule-tiered computing environment having necessary capabilities, capacity, and/or data. In one or more embodiments, such a complex distributed multi-tiered computing environment may also be required to service large quantities of requests to provision applications.

Based on the large quantity and a high frequency of application provisioning requests and the large quantity and increased complexity of the domains included in the distributed multi-tiered computing environment, the distributed multi-tiered computing environment may include a management hierarchy. In one or more embodiments, the management hierarchy includes global level management, domain level management, and device level management. In one or more embodiments, global level management services may be performed by a global controller, domain level management services may be performed by local controllers associated with the domains of the distributed multi-tiered computing environment, and the device level management services may be performed by endpoint controllers associated with devices included in the domains of the distributed multi-tiered computing environments. In one or more embodiments, instructions and/or data may be passed between the global controller, local controllers, and the endpoint controllers to perform the global level management services, domain level management services, and the device level management services, respectively. As a result, by dispersing the management functionality of the distributed multi-tiered computing environment into three levels (i.e., global level, domain level, and device level), the efficiency, performance, and scalability of the distributed multi-tiered computing environment may be improved.

In one or more embodiments, as part of the aforementioned domain level management services, a local controller of a domain may provision all, or portions thereof application tasks within a domain. The local controller may obtain a scheduling package from the global controller. In one or more embodiments, the local controller generates a final list of candidate devices based on scheduling requirements associated with application tasks specified by the scheduling package. Moreover, local controllers may generate scheduling assignments based on the final candidate list of device and the scheduling requirements. Accordingly, the local controller may efficiently schedule application tasks to devices included in the domain based on a scheduling package obtained from the global controller.

FIG. 1A shows a diagram of a system in accordance with one or more embodiments described herein. The system may include an application service layer (102) and a distributed multi-tiered computing environment. The distributed multi-tiered computing environment may be referred to as a multi-cloud intelligent edge (MCIE) environment (100) throughout this Detailed Disclosure. The MCIE environment (100) may include a global controller (104) and MCIE domains (110). The MCIE domains (110) may include any quantity of MCIE domains (110) without departing from embodiments disclosed herein. For example, the MCIE domains (110) may include domain A (110A), domain B (110B) and domain N (110N). Each domain may include (or be operatively connected to) a local controller. For example, domain A (110A) may include (or be operatively connected to) local controller A (112A), domain B (110B) may include (or be operatively connected to) local controller B (112B), and domain N (110N) may include (or be operatively connected to) local controller N (112N). All or any portion of any device or set of devices in the system illustrated in FIG. 1A may be operatively connected to any other device or set of devices via any combinations of wireless (e.g., WAN) and/or wired connections (e.g., Ethernet) referred to as a one or more networks. Each of these components is described below.

In one or more embodiments disclosed herein, the application service layer (102) includes the functionality to provide requests and manifests for provisioning applications in the MCIE environment (100). The application service layer (102) may be used by one or more users (e.g., customers of the MCIE environment (100), system administrators of the MCIE environment (100), etc.) to submit requests and manifests to the global controller (104) to provision applications in the MCIE environment (100). The application service layer (102) may also include the functionality to enable users to generate, configure, and/or modify requests and/or manifests through, for example, a graphical user interface. The application service layer (102) may include other and/or additional types of user interfaces without departing from embodiments disclosed herein.

The application service layer (102) may further include the functionality to provide and/or obtain additional information to and from the global controller (104). The additional information may include, for example, binary program files for applications, configuration files, communication information (e.g., user identifiers, network addresses, URLs, etc.), security information (e.g., encryption keys, digital signatures, certificates, etc.), and other and/or additional information that may be used by the global controller (104) to provision applications and/or establish communications between users and the global controller (104) without departing from embodiments disclosed herein. The application service layer (102) may include other and/or additional functionalities without departing from embodiments disclosed herein.

In one or more embodiments disclosed herein, the application service layer (102) is implemented using one or more computing devices. For additional details regarding computing devices, refer to FIG. 2 and FIG. 11.

In one or more embodiments disclosed herein, the application service layer (102) is implemented as a logical device. A logical device may utilize the computing resources of any number of computing devices and thereby provide the functionality of the application service layer (102) described throughout this application.

In one or more embodiments disclosed herein, the global controller (104) includes the functionality to perform global level management services for the MCIE environment (100). The global level management services may include global scheduling services. The global scheduling services may include: (i) obtaining requests and manifests from users of the application service layer (102), (ii) performing global provisioning of applications to one or more domains (e.g., 110A, 110B) of the MCIE environment (100), (iii) providing and/or obtaining information to/from local controllers (e.g., 112A, 112B) of MCIE domains (e.g., 110A, 110B), and (iv) providing and/or obtaining information to/from users of the application service layer (102). For additional information regarding the performance of global scheduling services, refer to FIGS. 4A-5.

The global scheduling services may further include scheduling policy selection services. In one or more embodiments disclosed herein, the scheduling policies are one or more data structures that include scheduling requirements, objectives, and/or criteria that may be used by local controllers to perform domain level scheduling. Additionally, the global controller (104) may further include the functionality to assign priorities to each scheduling policy selected in a scheduling package. For additional information regarding performing scheduling policy selection services, refer to FIG. 6.

In one or more embodiments disclosed herein, the scheduling policies include one or more data structures that include scheduling requirements to be used by local controllers to perform domain level scheduling services. The requirements may include makespan minimization, scheduling efficiency, resource utilization, and resource cost. The scheduling policies may include other and/or additional scheduling requirements without departing from embodiments disclosed herein.

In one or more embodiments disclosed herein, makespan minimization refers to minimizing the time that it takes to perform a domain level scheduling job. In other words, makespan minimization refers to minimizing the time that an application responds to a request as measured from the first service in the execution path to the last service.

In one or more embodiments disclosed herein, scheduling efficiency refers to minimizing the time between obtaining an application provisioning request and completing the scheduling of the application associated with the provisioning request.

In one or more embodiments disclosed herein, resource utilization may refer to maximizing resource utilization when scheduling application tasks to resources (e.g., compute resources, domain specific accelerator resources, memory resources, networking resources, storage resources, etc.) of domains.

In one or more embodiments disclosed herein, resource cost may refer to minimizing the resource cost of provisioning applications to target domains and/or devices. In other words, application tasks may be assigned to resources that computationally cost less than other resources of the domains, thereby indirectly resulting in a reduction of monetary cost to the user.

Returning to the discussion of the global scheduling services, the global scheduling services may further include generating scheduling packages using case based reasoning. Case based reasoning may include obtaining fingerprints of previously provisioned applications, or portions thereof, and identifying target domains for applications, or portions thereof, based on the fingerprints. A fingerprint may include an aggregation of scheduling information and performance metrics associated with a previously provisioned application or service. The global controller (104) may analyze the fingerprints to: (i) identify previous target domains and/or scheduling packages associated with fingerprints of previously provisioned applications or services for use in assigning new applications associated with the fingerprints, and/or (ii) determine whether any additional criteria should be used when identifying target domains or generating scheduling packages for new applications associated with fingerprints.

In one or more embodiments disclosed herein, in addition to the global scheduling services, the global level management services also includes global lifecycle services.

In one or more embodiments disclosed herein, the global controller (104) may further include the functionality to perform load management services of the global lifecycle services. The load management services may include generating load management predictions that specify short term, medium term, and long term future loads of the global controller (104), the MCIE domains (110), the local controllers (e.g., 112A, 112B, 112N), and the devices of the MCIE domains (110). The global controller (104) may initiate adjustment of future scheduling policies for the global controller (104) and local controllers (e.g., 112A, 112B, 112N) based on the load management predictions. The global controller (104) may also adjust the number of local scheduler instances of local controllers (e.g., 112A, 112B, 112N) and the infrastructure capacity of MCIE domains (110) of the MCIE environment (100).

In one or more embodiments disclosed herein, the lifecycle management services further include global resource buffer management services. The global resource buffer management services may include generating updated resource buffers for different types of devices and/or MCIE domains (110). The global controller (104) may include the functionality to periodically generate resource buffers for MCIE domains (110) using device capacity information, device configuration information, and a power law resource buffer generation algorithm. The global controller (104) may use other and/or additional algorithms to generate resource buffers without departing from embodiments disclosed herein. The global controller (104) may provide updated resource buffers to local controllers (e.g., 112A, 112B, 112N) of MCIE domains (110).

The global controller (104) may include other and/or additional functionalities without departing from embodiments disclosed herein.

In one or more embodiments disclosed herein, the global controller (104) is implemented using one or more computing devices. For additional details regarding computing devices, refer to FIG. 2 and FIG. 11.

In one or more embodiments disclosed herein, the global controller (104) is implemented as a logical device. A logical device may utilize the computing resources of any number of computing devices and thereby provide the functionality of the global controller (104) described throughout this application.

In one or more embodiments disclosed herein, the MCIE domains (110) include the functionality to execute all and/or portions of applications. The execution of the application may provide computer implemented services for users of the system. The computer implemented services may include any combination of inferencing, data analytics, computer vision, database management, etc. The computer implemented services may include other and/or additional types of computer implemented services without departing from embodiments disclosed herein.

An application may include one or more services (also referred to throughout this Detailed Disclosure as tasks or application tasks). Each service may provide a portion of the functionality of the application. The services may include, for example, data collection services, data transformation services, data processing services, monitoring services, etc. The services may include other and/or additional types of services without departing from embodiments disclosed herein. An application may include any quantity of service instances associated with each service of the application without departing from embodiments disclosed herein.

In one or more embodiments disclosed herein, each MCIE domain (e.g., 110A, 110B, 110N) of the MCIE domains (110) is implemented as one or more computing devices. For additional details regarding computing devices, refer to FIG. 2 and FIG. 11. For additional information regarding MCIE domains (110), refer to FIG. 2.

In one or more embodiments disclosed herein, the MCIE domains (110) are implemented as logical devices. A logical device may utilize the computing resources of any number of computing devices and thereby provide the functionality of the MCIE domains (110) described throughout this application. For additional information regarding MCIE domains (110), refer to FIG. 2.

In one or more embodiments disclosed herein, the local controllers (e.g., 112A, 112B, 112N) include the functionality to perform domain level management services. The domain level scheduling services may include: (i) obtaining scheduling packages and scheduling requests from the global controller (104), (ii) assigning services (or tasks) of applications to devices included in domain associated with the local controller, (iii) providing application access information (discussed below) to the global controller (104), and (iv) providing domain information (discussed below) to the global controller (104). The local controllers (e.g., 112A, 112B, 112N) may include other and/or additional functionalities without departing from the embodiments disclosed herein. For additional information regarding local controllers (e.g., 112A, 112B, 112N), refer to FIG. 1B.

In one or more embodiments disclosed herein, the local controllers (e.g., 112A, 112B, 112N) are implemented as one or more computing devices. For additional details regarding computing devices, refer to FIG. 2 and FIG. 11.

In one or more embodiments disclosed herein, the local controllers (e.g., 112A, 112B, 112N) are implemented as logical devices. A logical device may utilize the computing resources of any number of computing devices and thereby provide the functionality of the local controllers (e.g., 112A, 112B, 112N) described throughout this application.

While FIG. 1A shows a configuration of certain components, other configurations and/or other components may be used without departing from the scope of embodiments described herein. Accordingly, embodiments disclosed herein should not be limited to the configuration of components shown in FIG. 1A.

Figure 1B:
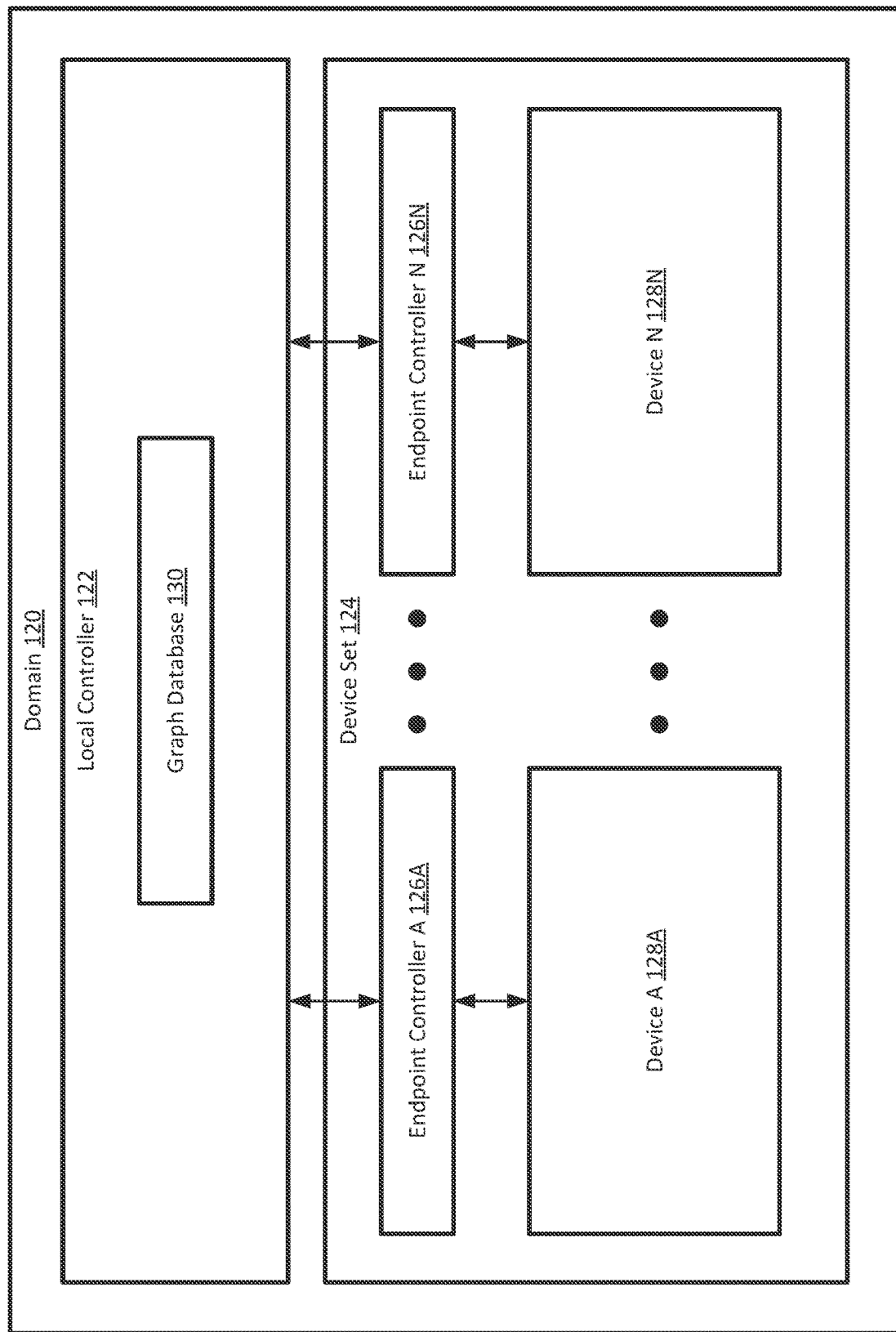
FIG. 1B shows a diagram of a domain in accordance with one or more embodiments disclosed herein.

FIG. 1B shows a diagram of a domain in accordance with one or more embodiments disclosed herein. The domain (120) may be an embodiment of the MCIE domains (110) (e.g., domain A (110A), domain B (110B), and domain N (110N)) discussed above with regard to FIG. 1A. As discussed above, the domain (120) may include the functionality to execute all and/or portions of applications. To provide the aforementioned functionality, the domain (120)

includes a local controller (122) and a device set (124). Each of the aforementioned components is discussed below.

The local controller (122) may be an embodiment of the local controllers (e.g., 112A, 112B, 112N) discussed above with regard to FIG. 1A. As discussed above, the local controller (122) may include the functionality to perform domain level scheduling services for the domain (120). The local controller may further include the functionality to perform domain level scheduling services using constraint management scheduling, heuristic scheduling, and/or reinforcement learning scheduling. For additional information regarding the performance of domain level scheduling services, refer to FIGS. 7-9. Moreover, as part of performing the domain level scheduling services, the local controller (122) may use and/or maintain a graph database (130).

In one or more embodiments disclosed herein, the graph database (130) is implemented as one or more data structures that include domain information. The graph database (130) may be implemented using any appropriate implementation of a graph without departing from embodiments disclosed herein. The domain information may specify devices included in the device set (124) of the domain (120) (e.g., include device identifiers associated with the devices). The domain information may further specify the capability and the capacity of the devices of the device set (124). The domain information may include resource units associated with each device in the device set that specify the capability of the corresponding device. The resource units may include compute units (e.g., quantity of processors and/or processor cores), memory units (e.g., size of total memory capacity), network units (e.g., quantity network interface cards (NICs), and/or total network bandwidth), and accelerator units (e.g., quantity of graphics processing units (GPUs) and/or quantity of GPU memory, field programmable gate arrays (FPGAs) and/or quantity of FPGA logic elements, etc.) associated with each device of the device set (124). The resource units may include other and/or additional information regarding the capability (e.g., storage units associated with a total quantity of data storage capacity) of the devices in the device set (124) without departing from embodiments disclosed herein.

In one or more embodiments disclosed herein, the resource units may be normalized using a reference device. For example, the reference device may include 100 CPU cores, 32 gigabytes of memory for RAM, 40 gigabytes of memory for a GPU, and 10 gigabytes per second of network bandwidth. A device (e.g., 128A) of the device set (124) for the domain (120) may include 48 CPU cores, 16 gigabytes of memory for RAM, two 40 gigabyte GPUs, and two 10 gigabytes per second NICs. The normalized resource units associated with the device would include 0.48 normalized compute units, 0.5 normalized memory units, 2.0 normalized accelerator units, and 2.0 normalized network units.

In one or more embodiments disclosed herein, the resource units, or a portion thereof, may also be normalized based on relative performance. For example, a first processor may be an older generation compared to a second processor, and therefore may only be able to perform 80 percent of the cycles per second compared to that of the second processor. If a first device includes 100 cores of the first processor and a second device include 100 cores of the second processor, then the first device may include 0.8 normalized compute units and the second device may include 1.0 normalized compute units assuming that the processor included in the reference system includes the same performance as that of the second device.

Continuing with the discussion of the domain information, the domain information may further specify portions of the normalized resource units (e.g., percentages of the normalized resource units) associated with the device that are available for provisioning and that are provisioned to execute existing application and/or services. The domain information may further specify the applications, or portions thereof, (e.g., services) that are executing on each device included in the device set (124) (e.g., include application identifiers and/or service identifiers associated with each device). The domain information may be generated and/or obtained by the local controller (122). The local controller (122) may include the domain information in the graph database (130). The local controller (122) may update the graph database over time. The graph database (130) may include other and/or additional information associated with the domain (120) without departing from embodiments disclosed herein.

The graph database (130) may be stored in storage of the local controller (122). The storage may be implemented using physical devices that provide data storage services (e.g., storing data and providing copies of previously stored data). The devices that provide data storage services may include hardware devices and/or logical devices. For example, the storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

The storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

While discussed above as being stored in storage of the local controller (122), the graph database may be stored in one or more storages of the domain (120) (e.g., storages included in the device set (124)), and/or stored in a distributed or otherwise shared storage accessible by the global controller (104, FIG. 1A) and local controllers (e.g., 112A, 112B, 112N, FIG. 1A) using any appropriate method of distributed data storage (e.g., network file system, peer-to-peer storage network, etc.) without departing from embodiments disclosed herein.

In one or more embodiments disclosed herein, in addition to the domain scheduling services, the domain level management services also includes domain lifecycle services.

In one or more embodiments disclosed herein, the local controller (122) includes the functionality to perform the domain lifecycle services. The domain lifecycle services may include performing anomaly detection, performing service impairment root cause analysis, and performing service impairment remediation.

The local controller (122) may include other and/or additional functionalities without departing from embodiments disclosed herein.

In one or more embodiments disclosed herein, the device set (124) includes one or more endpoint controllers and one or more devices. For example, the device may include endpoint controller A (126A), endpoint controller N (126N), device A (128A), and device N (128N). Each device (e.g., 128A) may include and/or otherwise be operatively connected to an endpoint controller (e.g., 126A).

In one or more embodiments disclosed herein, an endpoint controller includes the functionality to perform device level management services for a corresponding device. For example, endpoint controller A (126A) may perform device level management services for device A (128A) and endpoint controller N (126N) may perform device level management services for device N (128N).

In one or more embodiments disclosed herein, the device level management services include device level scheduling services. The device level scheduling services may include: (i) obtaining provisioning commands and scheduling assignments from the local controller (122), (ii) performing the provisioning commands and using the scheduling assignments to instantiate applications and/or services on the corresponding device, (iii) setting up monitoring services associated with the device, and (iv) sending configuration confirmations and monitoring information to the local controller (122). The device level scheduling services may include other and/or additional services without departing from embodiments disclosed herein. For additional information regarding device level scheduling services, refer to FIG. 10.

In one or more embodiments disclosed herein, the device level management services further includes device lifecycle services. The device lifecycle services may include resource buffer management services. The resource buffer management services may include (i) obtaining resource buffers from the local controller (122), (ii) maintaining resource buffers associated with the device, monitoring device metrics to determine whether the resource buffer should be adjusted, (iii) updating resource buffers based on newly obtained resource buffers and/or the device metrics. The resource buffer management services may include other and/or additional services without departing from embodiments disclosed herein.

The endpoint controllers (e.g., 126A, 126N) may include other and/or additional functionalities without departing from embodiments disclosed herein.

In one or more embodiments disclosed herein, the endpoint controllers (e.g., 126A, 126N) are implemented as one or more computing devices. A computing device may be an embodiment of the computing devices discussed above and with respect to FIG. 11.

In one or more embodiments disclosed herein, the endpoint controllers (e.g., 126A, 126N) are implemented as logical devices. A logical device may utilize the computing resources of any number of computing devices and thereby provide the functionality of the endpoint controllers (e.g., 126A, 126N) described throughout this application.

In one or more embodiments disclosed herein, the endpoint controllers (e.g., 126A, 126N) are implemented as physical devices of the device set. A physical device may include circuitry. The physical device may be, for example, a field-programmable gate array, application specific integrated circuit, programmable processor, microcontroller, digital signal processor, or other hardware processor. The physical device may be configured to provide the functionality of the endpoint controllers (e.g., 126A, 126N) described throughout this Detailed Description.

In one or more embodiments disclosed herein, the endpoint controllers (e.g., 126A, 126N) are implemented as computer instructions, e.g., computer code, stored on a persistent storage that when executed by a processor of the device set (124) causes the device set (124) to provide the functionality of the endpoint controllers (e.g., 126A, 126N) described throughout this Detailed Description.

In one or more embodiments disclosed herein, the devices (e.g., 128A, 128N) include the functionality to execute applications and/or services to provide the aforementioned functionality of the domain (120) (e.g., to provide computer implemented services to users). The devices (e.g., 128A, 128N) may include other and/or additional functionalities without departing from embodiments disclosed herein.

In one or more embodiments disclosed herein, a device (e.g., 128A) is implemented as a computing device. In one or more embodiments, a computing device is any device, portion of a device, or any set of devices capable of electronically processing instructions and may include any number of components, which include, but are not limited to, any of the following: one or more processors (e.g., components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, any or all of the aforementioned examples may be combined to create a system of such devices (e.g., the device set (124)). Other types of computing devices may be used without departing from the scope of the embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium. As discussed above, embodiments disclosed herein may be implemented using computing devices.

In one or more embodiments, such computing devices may be operatively connected to other computing devices of the device set (124) in any way, thereby creating any topology of computing devices within the device set (124). In one or more embodiments, one or more computing devices in the device set (124) may be operatively connected to any one or more devices in any other domain of the MCIE environment (100, FIG. 1A). Such operative connections may be all or part of a network as discussed above. A network may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap, at least in part, with the Internet.

The network may include any number of devices within any domain (e.g., 110A, 110B, 110N, FIG. 1A) of the MCIE environment (100), as well as devices external to, or between, such portions of MCIE environment (100). In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the scope of embodiments described herein. Examples of a network device include, but are not limited to, a network switch, a router, a multilayer switch, a fibre channel device, an InfiniBand® device, etc. A network device is not limited to the aforementioned specific examples.

In one or more embodiments, a network device includes functionality to receive network traffic data units (e.g., frames, packets, tunneling protocol frames, etc.) at any of the network interfaces (i.e., ports) of a network device and to process the network traffic data units. In one or more embodiments, processing a network traffic data unit includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Examples of network traffic data unit processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device. In one or more embodiments, network devices are configured to participate in one or more network protocols, which may include discovery schemes by which a given network device may obtain information about all or any of the network topology in which the network device exists. Such discovery schemes may include sharing of information between network devices, and may also include providing information to other devices within MCIE environment (100), such as, for example, local controllers and/or endpoint controllers (discussed below).

In one or more embodiments, any or all of the devices in the device set (124) may form one or more virtualization environments (not shown). In one or more embodiments, a virtualization environment is any environment in which any number of computing devices are subject, at least in part, to a shared scheme pooling compute resources for use in deploying virtualized computing device instances (e.g., VMs, containers, emulators, etc.), which may be used in any arrangement to perform all or any portion of any work requested within a domain.

While only illustrated as including a limited number of components, the domain may include other and/or additional components without departing from embodiments disclosed herein.

Figure 2:
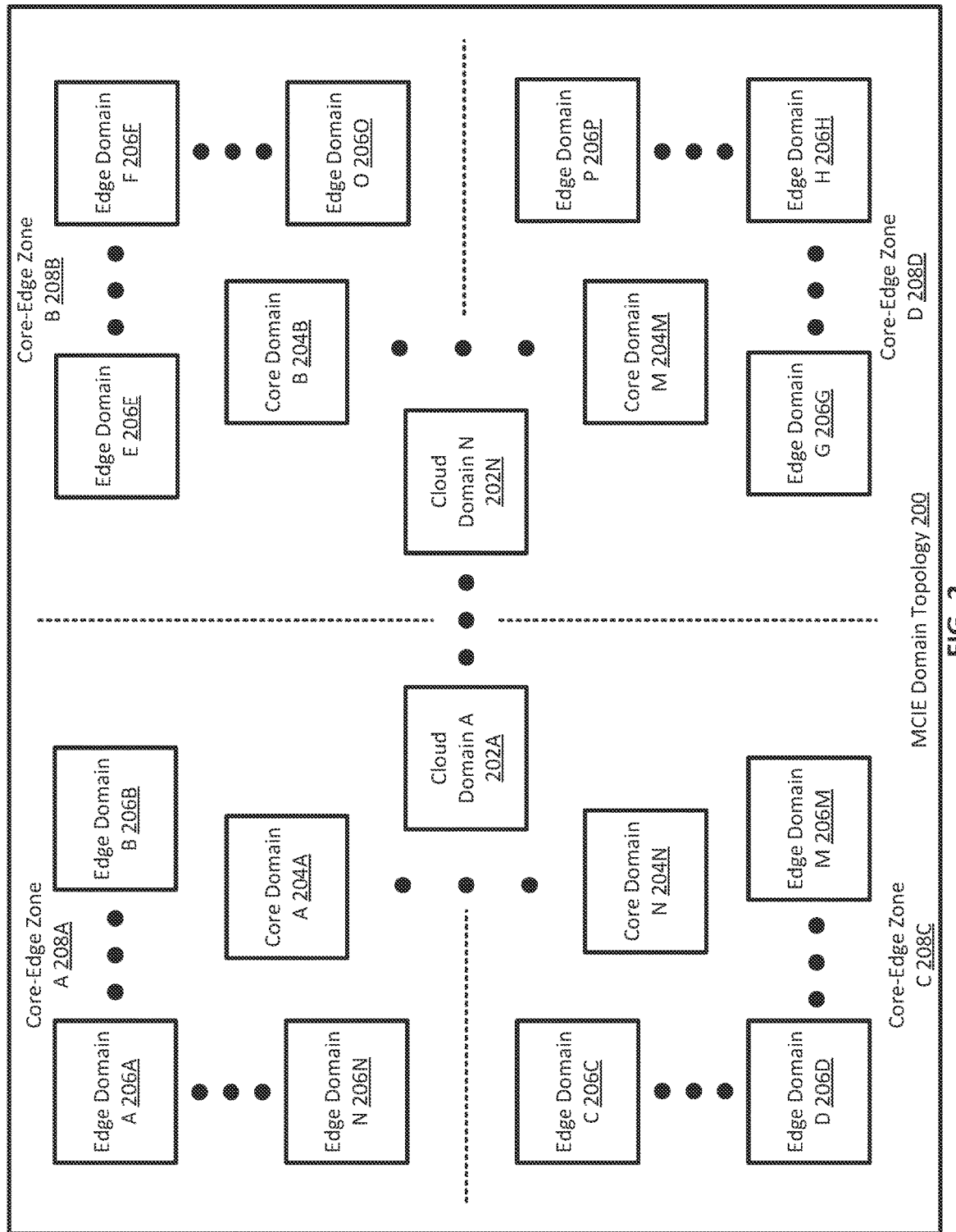
FIG. 2 shows a diagram of an MCIE domain topology in accordance with one or more embodiments disclosed herein.

FIG. 2 shows a diagram of a MCIE domain topology in accordance with one or more embodiments disclosed herein. As discussed above, the MCIE domains (110, FIG. 1A) may include any quantity of domains without departing from the embodiments disclosed herein. In one or more embodiments, MCIE domains (110, FIG. 1A) may be considered a hierarchy of domains. In the example embodiment shown in FIG. 2, the MCIE domain topology (200) includes edge domains, core domains, and cloud domains. The MCIE domain topology (200) may include cloud domains such as cloud domain A (202A), and cloud domain N (202N). The MCIE domain topology (200) may also include core domains such as core domain A (204A), core domain B (204B), core domain M (204M), and core domain N (204N). The MCIE domain topology (200) may further include edge domains such as edge domain A (206A), edge domain B (206B), edge domain C (206C), edge domain D (206D), edge domain E (206E), edge domain F (206F), edge domain G (206G), edge domain H (206H), edge domain M (206M), edge domain N (206N), edge domain O (2060), and edge domain P (206P).

The MCIE domain topology (200) is not limited to the exemplary arrangement shown in FIG. 2. The MCIE domain topology (200) may have any number of edge domains, which may be operatively connected to any number of core domains, which may, in turn, be operatively connected to one or more cloud domains. Additionally, a given MCIE domain topology (200) may have more or less layers without departing from the scope of embodiments described herein. For example, an edge domain may be operatively connected to a cloud domain without an intervening core domain. As another example, there may be only edge domains and core domains in the MCIE domain topology (200). One of ordinary skill in the art will recognize that there are many possible arrangements of the MCIE domain topology (200) other than the example topology shown in FIG. 2.

In one or more embodiments disclosed herein, each domain in the MCIE domain topology (200) includes a device set as discussed above in the description of the domain in FIG. 1B. In one or more embodiments, each device set is a set of computing devices, such as is discussed above in the description of device set A. However, the set of computing devices in different device sets may be different, and may be particular to the type of domain (e.g., edge, cloud, core) of the MCIE domain topology (200) that the device set is in. For example, an edge domain (e.g., 206A) of MCIE domain topology (200) may include sensors collecting data, controllers controlling the sensors, desktop devices, mobile computing devices, etc. Other domains may include different computing devices. For example, a core domain (e.g., 204A) of the MCIE domain topology (200) may include more powerful (e.g., having more compute resources) devices, a greater quantity of more powerful devices, specific architectures of sets of devices for performing certain tasks, etc. Also similarly, a cloud domain of the MCIE domain topology (200) may include still more and different devices configured and deployed in different ways than the other types of domains of the MCIE domain topology (200).

Additionally, the MCIE domain topology (200) may be arranged in a hierarchy. For example, a single cloud domain (e.g., 202A) may be operatively connected to any number of core domains (e.g., 204A), and each of which may be operatively connected to any number of edge domains (e.g., 206A, 206B, 206N). The particular device set in any given domain of the MCIE domain topology (200) may determine what capabilities the domain in which the device set exists is suited to perform, which is known to and/or determined by the local controllers for the domains (e.g., 112A, 112B, 112N, FIG. 1A).

Moreover, the MCIE domain topology (200) may be arranged based on geographical locations and/or geographical regions. In other words, a cloud domain (e.g., 202A) may include a device set that is associated with and/or physically spans a geographical region. A core domain (e.g., 204A) operatively connected to the cloud domain (e.g., 202A) may include a device set that is associated with and/or physically spans a portion of the geographical region associated with the cloud domain (e.g., 202A). An edge domain (e.g., 206A) operatively connected to the core domain (e.g., 204A) may include a device set that is associated with and/or physically spans a particular location within the portion of the geographical region associated with the core domain (e.g., 204A). As a simple example, a cloud domain (e.g., 202A) may be associated with the entirety of North America, a core domain (e.g., 204A) operatively connected to the cloud domain (e.g., 202A) may be associated with the United States of America, and an edge domain (e.g., 206A) may be associated with a warehouse located in New York City, New York.

Portions of the geographical regions associated with the cloud domains that include a core domain and one or more edge domains may be referred to as core-edge zones. The MCIE domain topology (200) may include core-edge zones such as core-edge zone A (208A), core-edge zone B (208B), core-edge zone C (208C), and core-edge zone D (208D). Core-edge zone A (208A) may include core domain A (204A), which may be operatively connected to edge domain A (206A), edge domain B (206B), and edge domain N (206N). Core-edge zone B (208B) may include core domain B (204B), which may be operatively connected to edge domain E (206E), edge domain F (206F), and edge domain O (206O). Core-edge zone C (208C) may include core domain N (204N), which may be operatively connected to edge domain C (206C), edge domain D (206D), and edge domain M (206M). Finally, core-edge zone D (208D) may include core domain M (204M), which may be operatively connected to edge domain G (206G), edge domain H (206H), and edge domain P (206P). The MCIE domain topology (200) may be arranged based on other and/or additional types of logical divisions (e.g., divisions within a company, types of devices included in device sets of domains, etc.) of domains without departing from embodiments disclosed herein.

While FIG. 2 shows a configuration of components, other configurations may be used without departing from the scope of embodiments described herein. Accordingly, embodiments disclosed herein should not be limited to the configuration of components shown in FIG. 2.

Figure 3:
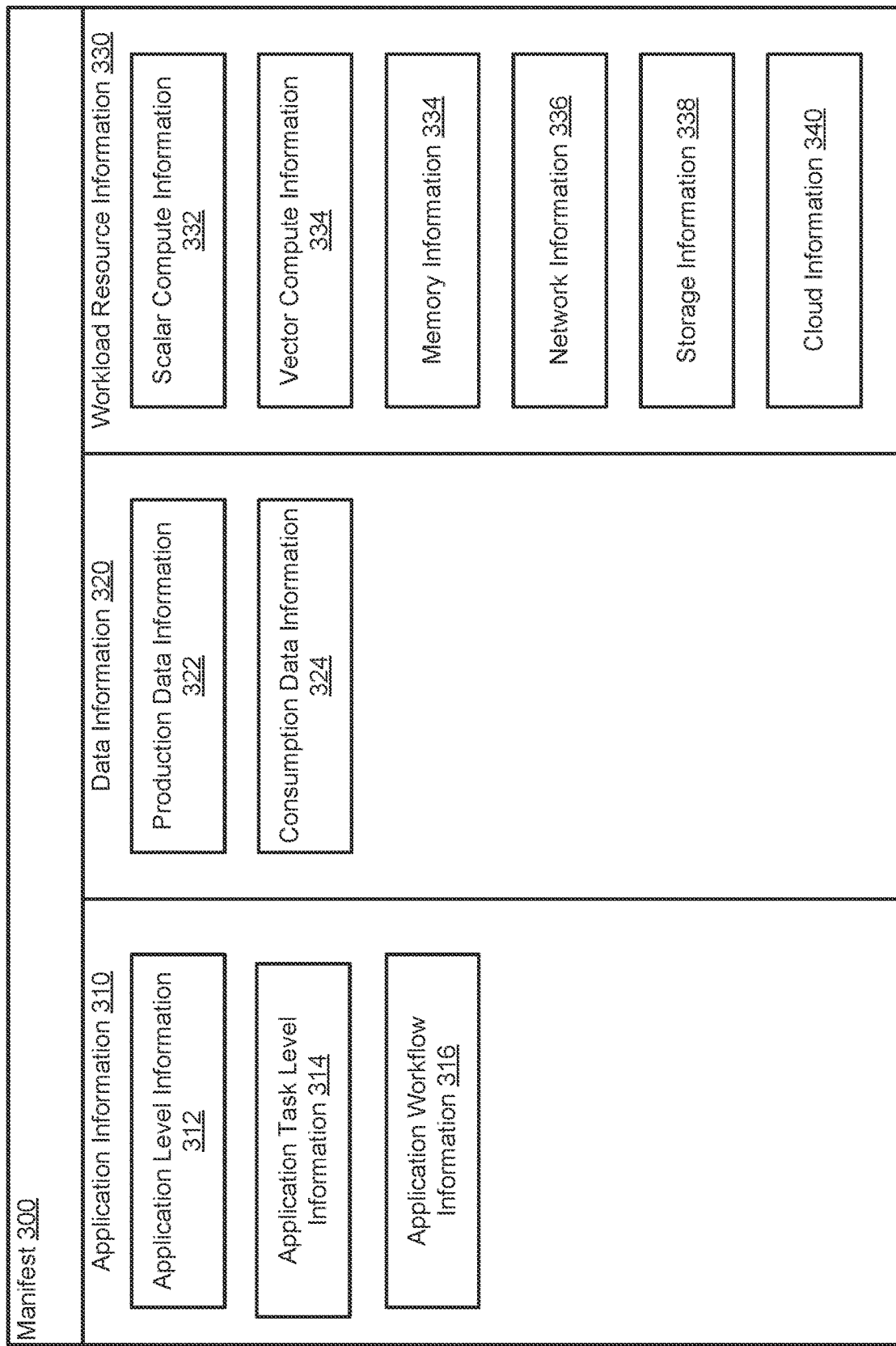
FIG. 3 shows a diagram of an example manifest in accordance with one or more embodiments disclosed herein.

FIG. 3 shows a diagram of a manifest in accordance with one or more embodiments disclosed herein. As discussed above, a user may submit a manifest (300) along with an application provisioning request using the application service layer (102, FIG. 1A) to the global controller (104, FIG. 1A) to provision an application in the MCIE environment (100, FIG. 1A). The manifest (300) may be configured and/or otherwise generated by the user by selecting, assigning, configuring, and/or including information associated with the application corresponding to the application provisioning request within the manifest (300).

The manifest (300) may be implemented as one or more data structures. The manifest (300) may be implemented as, for example, a YAML Ain't Markup Language (YAML) file. The manifest (300) may be used by the global controller (104, FIG. 1A) to perform global level scheduling services. The global controller (104, FIG. 1A) may include any portion of the information included in the manifest (300) in scheduling packages, which may be used by local controllers (e.g., 112A, 112B, 112N, FIG. 1A) to perform domain level scheduling services. The manifest (300) may include application information (310), data information (320), and workload resource information (330). The manifest (300) may include other and/or additional types of information that may be used to provision applications without departing from embodiments disclosed herein.

In one or more embodiments disclosed herein, the application information (310) includes application level information (312), application task level information (314), and application workflow information (316). The application information (310) may include other and/or additional information associated with the application to be provisioned without departing from embodiments disclosed herein.

The application level information (312) may include high level information associated with the application associated with the manifest. The high level information may include, for example, a request identifier associated with the application provisioning request corresponding to the manifest (300), a user identifier associated with the user that submitted the manifest (300), a cluster or application identifier associated with a previously provisioned application (e.g., for review, update, and delete requests), a request directive (e.g., a flag, tag, etc.) that specifies whether the application provisioning request is a create request, a review request, an update request, or a delete request, an runtime environment indicator and an application indicator (e.g., to indicate whether the manifest (300) is associated with an application and/or a runtime environment), and pre-emptible resource statuses.

The application level information (312) may also include target performance information associated with the application corresponding to the manifest (300). The performance information may include a target input latency associated with the manifest (300). The performance information may also include SLO metrics. The SLO metrics may include a target application response latency, a target application performance (e.g., percentage of successful completion of tasks), and a target application uptime. The application level information (312) may also include targeted domain information. The targeted domain information may specify the type of domains (e.g., edge, core, cloud) and/or specific domains that a user selected to use to provision the application. The application level information (312) may further include location information. The location information may include one or more geographical regions and/or locations selected by the user in which to provision the application. The application level information (312) may further include a chaos experiment sandbox indicator (e.g., a flag, a tag, etc.) that may indicate whether the chaos testing is to be performed for the application prior to final provisioning. The application level information (312) may include other and/or additional types of high level information associated with the application corresponding to the manifest (300) without departing from embodiments disclosed herein.

The application task level information (314) may include task specific information associated with the application corresponding to the manifest (300). The task specific information may include an application and/or runtime environment identifier, an application template identifiers, a runtime environment template identifiers, virtual machine template identifiers, task identifiers, task priorities, task execution times, task hardware requirements, task instruction set architecture (ISA) requirements, task accelerator requirements, task operating system requirements, virtual machine requirements, edge runtime environment requirements, cloud runtime environment requirements, and/or security cloud credentials. The application task level information may include other and/or additional task specific information without departing from embodiments disclosed herein.

The application workflow information (316) may include information that specifies the total workflow of the application corresponding to the manifest (300). The application workflow information (316) may include an order of execution for deployment of services of the application, a service dependency graph, an execution time target, a sync policy, a deployment duration, outside dependencies, and/or success criteria. The application workflow information (316) may include other and/or additional types of information associated with the workflow of the application corresponding to the manifest without departing from embodiments disclosed herein.

In one or more embodiments disclosed herein, the data information (320) includes production data information (322) and consumption data information (324. The data information (320) may include other and/or additional information associated with the data produced and/or consumed by the application to be provisioned without departing from embodiments disclosed herein.

In one or more embodiments disclosed herein, the production data information (322) may include information associated with the data produced by the application during execution. The production data information (322) may include, for example, storage identifiers, a list of directories, file system mount points, network addresses, URL addresses, and streaming services endpoints which all, or a portion thereof, may be used by the application to store data generated by the application. The production data information (322) may include other and/or additional information associated with the generation and storage of data generated by the application without departing from embodiments disclosed herein.

In one or more embodiments disclosed herein, the consumption data information (324) may include information associated with the data used by the application during execution. The consumption data information (324) may include, for example, data identifiers, file identifiers, file priorities, storage identifiers, a list of directories, file system mount points, network addresses, URL addresses, and streaming services endpoints which all, or a portion thereof, may be used by the application to access data consumed by the application. The consumption data information (324) may include other and/or additional information associated with the access and storage of data used by the application without departing from embodiments disclosed herein.

In one or more embodiments disclosed herein, the workload resource information (330) includes resource requirement information associated with all, or a portion thereof, the tasks of the application corresponding to the manifest (300). The resource requirement information may include scalar compute information (332), vector compute information (334), memory information (334), network information (336), storage information (338), and/or cloud information (340). The resource requirement information may include other and/or additional types of information associated with the resource requirements of the application tasks without departing from embodiments disclosed herein.

In one or more embodiments disclosed herein, the scalar compute information (332) includes scalar compute resource requirements associated with the application tasks. The scalar compute resource requirements may include task identifiers, critical path clock frequencies, minimum clock frequency, processor type, processor quantity, and/or domain identifiers. The scalar compute resource requirements may include other and/or additional information associated with the scalar compute resource requirements of the application tasks without departing from embodiments disclosed herein.

In one or more embodiments disclosed herein, the vector compute information (334) includes vector compute resource requirements associated with the application tasks. The vector compute resource requirements may include task identifiers, performance metrics (e.g., TeraFlops (TF), Tera Operations Per Second TOPS, etc.), minimum performance metrics (e.g., minimum TF, minimum TOPS, etc.), domain specific accelerator types, processor types, domain identifiers, processor quantities, quantity of GPU memory, quantity of FPGA logic cells, and/or peer-to-peer information (e.g., NVLink, PCIE, inter-GPU network type, etc.). The vector compute resource requirements may include other and/or additional information associated with the vector compute resource requirements of the application tasks without departing from embodiments disclosed herein.

In one or more embodiments disclosed herein, the memory information (334) may specify memory requirements associated with the application tasks. The memory requirements may include task identifiers, memory types, domain identifiers, quantity of memory, and/or minimum quantity of memory. The memory requirements may include other and/or additional information regarding memory requirements of the application tasks without departing from embodiments disclosed herein.

In one or more embodiments disclosed herein, the network information (336) may include network requirements associated with application tasks. The network requirements may include, task identifiers, network type (e.g., Ethernet, RDMA, etc.), types of network devices, average required network bandwidth, peak required network bandwidth, minimum required network bandwidth, and/or quantity of network devices. The network requirements may include other and/or additional information regarding network requirements of the application tasks without departing from embodiments disclosed herein.

In one or more embodiments disclosed herein, the storage information (338) includes data storage requirements associated with the application tasks. The data storage requirements may include, task identifiers, storage device types (e.g., HDDs, NVME, PMEM, etc.), domain identifiers, quantity of storage per domain required, and/or storage size by storage device type and location (e.g., domain type and/or geographical location). The storage requirements may include other and/or additional information regarding storage requirements of the application tasks without departing from embodiments disclosed herein.

In one or more embodiments disclosed herein, the cloud information (340) includes cloud requirements associated with the application tasks. The cloud requirements may include task identifiers, cloud types, crossplane supported configuration options, and/or cloud configuration requirements. The cloud requirements may include other and/or additional information regarding cloud requirements of the application tasks without departing from embodiments disclosed herein.

As discussed herein, an identifier may refer to a unique combination of characters that may be used to specify and/or identify a particular entity. The characters may include numerical characters referencing numbers assigned to particular entities. The characters may refer to alphabetical characters referencing a name assigned to particular entities. The characters may further refer to alphanumeric characters that includes a combination of numeric characters and alphabetic characters. An identifier may refer to a local (e.g., may be used by a particular executing entity such as the global controller) and/or a global identifier (e.g., may be used by all executing entities within the system) without departing from embodiments disclosed herein.

FIGS. 4A-4D show flowcharts of a method for provisioning an application in accordance with one or more embodiments disclosed herein. The method of FIGS. 4A-4D may be performed by, for example, the global controller (104, FIG. 1A). Other components illustrated in FIG. 1A may perform all, or a portion, of the steps shown in FIGS. 4A-4D without departing from embodiments disclosed herein. While the various steps in the flowchart shown in FIGS. 4A-4D are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

Figure 4A:
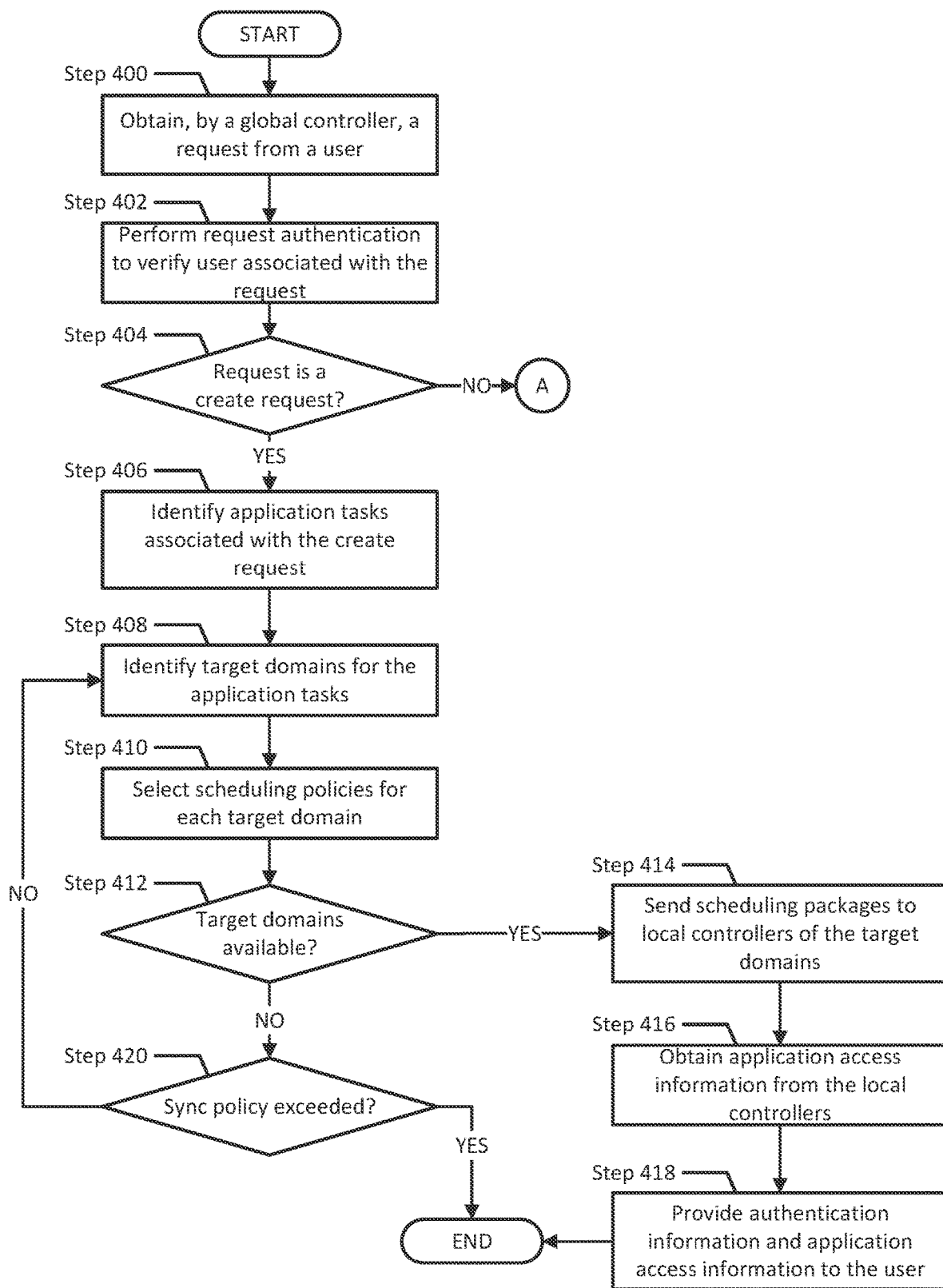
FIGS. 4A-4D show flowcharts of a method for provisioning an application in accordance with one or more embodiments disclosed herein.

Turning to FIG. 4A, at Step 400, a request is obtained from a user. The request may be an application provisioning request. In one or more embodiments disclosed herein, the request is obtained from the user through the application service layer using any appropriate method of data transmission. As an example, the application service layer may communicate the request as network data traffic units over a series of network devices that operatively connect the application service layer and the global controller. The request may include a manifest without departing from embodiments disclosed herein. The request may further include authentication information associated with the user. The request may be obtained from the user via other and/or additional methods without departing from embodiments disclosed herein.

At Step 402, request authentication is performed to verify the user associated with the request. As discussed above, the request may include authentication information associated with the user. The authentication information may include, for example, a user identifier, a company identifier, security credentials (e.g., a username, a password, a personal identification number (PIN), etc.), and/or security information (e.g., encryption keys, digital signatures, etc.). In one or more embodiments disclosed herein, the global control uses the authentication information included in the request to perform authentication to verify the user associated with the request. The global controller may use any appropriate method for performing authentication using the authentication information without departing from embodiments disclosed herein. For example, the global controller may compare a user identifier, company identifier, and/or security credentials with a list of existing user identifiers, company identifiers, and/or security credentials maintained by the global controller and verify the user by identifying a match between the user identifier, company identifiers, and/or security credentials. The global controller may perform request authentication to verify the user associated with the request via other and/or additional methods without departing from embodiments disclosed herein.

Although not illustrated in the flowchart of FIG. 4A, if the global controller is unable to verify the user associated with the request, then the method may end following Step 402. In another embodiment disclosed herein, if the global controller is unable to verify the user associated with the request, then the global controller may send an error notification that specifies that the request authentication failed to the user. After sending the error notification, the method may end following Step 402.

At Step 404, a determination is made as to whether the request is a create request. As discussed above, the request may include a manifest. Moreover, the manifest may include a request directive. The request directive may specify whether the request is a create request, review request, update request, or delete request. The request directive may be implemented as tags and/or flags, each associated with a create request, a review request, an update request, and a delete request. The request directive included in the manifest may include either a single tag associated with the type of request corresponding to the request or a single set flag associated with the type of request corresponding to the request.

In one or more embodiments disclosed herein, the global controller checks the request directive to determine whether the request is a create request. In one or more embodiments disclosed herein, if the request directive includes a tag or set flag associated with a create request, then the global controller may determine that the request is a create request. In one or more embodiments disclosed herein, if the request directive does not include a tag or set flag associated with a create request (e.g., includes a tag or set flag associated with another type of request), then the global controller may determine that the request is not a create request. The global controller may determine whether the request is a create request via other and/or additional methods without departing from embodiments disclosed herein.

In one or more embodiments disclosed herein, if it is determined that the request is a create request, then the method proceeds to Step 406. In one or more embodiments disclosed herein, if it is determined that the request is not a create request, then the method proceeds to Step 422 of FIG. 4B.

At Step 406, application tasks associated with the create request are identified. As discussed above, the request may include a manifest. The manifest may specify the application tasks associated with the application corresponding with the create request (e.g., within the application task level information (314, FIG. 3) of the manifest (300, FIG. 3)). The global controller may parse the manifest to identify the application tasks associated with the application corresponding the create request. The application tasks associated with the create request may be identified via other and/or additional methods without departing from embodiments disclosed herein.

At Step 408, target domains for the application tasks are identified. In one or more embodiments disclosed herein, the global controller identifies target domains for the application tasks based on the manifest included in the request and capability information associated with the domains included in the MCIE environment. As discussed above, the manifest may include information that the global controller may use to schedule the application to one or more target domains included in the MCIE environment information. For each application task, the global controller may identify a target domain that satisfies the scheduling requirements included in the manifest. The scheduling requirements may include user specified domain types, hardware requirements (e.g., compute requirements, memory requirements, domain accelerator requirements, network requirements, and/or storage requirements), geographical location requirements, etc. The global controller may use capability information associated with the MCIE domains provided by the local controllers (e.g., all, or a portion thereof, the graph database) to specify the capabilities of the MCIE domains. Any quantity of target domains may be identified for any quantity of application tasks without departing from embodiments disclosed herein. Target domains for the application tasks may be identified via other and/or additional methods without departing from embodiments disclosed herein.

At Step 410, scheduling policies are selected for each target domain. In one or more embodiments disclosed herein, the global controller selects scheduling policies based on the manifest. In addition to the discussion of FIG. 3, the manifest included in the request may specify whether a user has requested to select a particular scheduling policy and, if selected, a priority associated with the selected scheduling policy. As discussed above, the scheduling policies may include makespan minimization, scheduling efficiency, resource utilization, and resource cost. In addition to the manifest, the global controller may select scheduling policies and/or associated priorities based on load information associated with the local controllers. The global controller may have access to current and/or future predicted load information associated with the local controllers of the target domains. For local controllers associated with high loads (e.g., performing a scheduling a large quantity of application tasks or include a larger quantity of application task scheduling jobs than a configurable backlog limit), then the global controller may deprioritize or refrain from selecting computationally intensive scheduling policies such as makespan minimization. The global controller may select scheduling policies for each target domain via other and/or additional methods without departing from embodiments disclosed herein.

At Step 412, a determination is made as to whether the target domains are available. In one or more embodiments disclosed herein, the global controller uses capacity information associated with each target domain to determine whether the target domain includes the available capacity to execute the associated application task(s). As discussed above, the global controller may obtain capacity information (e.g., as included in the graph database) from the local controller associated with each information. The global controller may compare the scheduling requirements associated each application task with the corresponding target domain's available capacity. In one or more embodiments disclosed herein, if the available capacity of the target domains exceeds the storage requirements of all associated application tasks, then the global controller may determine that the target domains are available. In one or more embodiments disclosed herein, if the available capacity of the target domains does not exceed the storage requirements of all associated application tasks, then the global controller may determine that not all the target domains are available. The global controller may determine whether the target domains are available via other and/or additional methods without departing from embodiments disclosed herein.

In one or more embodiments disclosed herein, if it is determined that the target domains are available, the method proceeds to Step 414. In one or more embodiments disclosed herein, if it is determined that at least one target domain are not available, the method proceeds to Step 420.

At Step 414, scheduling packages are sent to the local controllers of the target domains. In one or more embodiments disclosed herein, the global controller generates a scheduling package for each target domain.

In one or more embodiments disclosed herein, a scheduling package may refer to one or more data structures that may be used by the local controller of an associated target domain to perform domain level scheduling services. The scheduling package may specify the application task(s) to be scheduled, all, or a portion thereof, the information included in the manifest associated with the application task(s), and the selected scheduling policies and the associated priorities of the selected scheduling policies. A scheduling package may include other and/or additional information that may be used to perform domain level scheduling services without departing from embodiments disclosed herein.

In one or more embodiments disclosed herein, the global controller sends to generated scheduling packages to the local controllers of the associated target domains. In one or more embodiments disclosed herein, the scheduling packages are sent to the local controllers using any appropriate method of data transmission. As an example, the global controller may communicate the scheduling packages as network data traffic units over a series of network devices that operatively connect the local controllers of the target domains and the global controller. The scheduling packages may be sent to the local controllers of the target domains via other and/or additional methods without departing from embodiments disclosed herein.

At Step 416, application access information is obtained from the local controllers. After obtaining the scheduling packages, the local controllers may use the scheduling packages to perform domain level scheduling services. As a result, the local controllers may send scheduling assignments and provisioning commands to endpoint controllers, which may implement the scheduling assignments and provisioning commands to instantiate the application tasks within the target domains. Additionally, the local controllers may obtain and/or generate application access information associated with the application from the local controllers. The local controllers may then provide the application access information to the global controller. In one or more embodiments disclosed herein, the application access information is sent to the global controller using any appropriate method of data transmission. As an example, the local controllers may communicate the application access information as network data traffic units over a series of network devices that operatively connect the local controllers of the target domains and the global controller. Application access information may be obtained from the local controllers via other and/or additional methods without departing from embodiments disclosed herein.

In one or more embodiments disclosed herein, the application access information refers to one or more data structures that may be used by the user that submitted the request to access the application provisioned within the MCIE environment. The application access information may include access information associated with the application. The application access information may include domain identifiers, device identifiers, URLs, network addresses, etc. associated with the provisioned application. The application access information may include other and/or additional information associated with provisioned application without departing from embodiments disclosed herein.

At Step 418, authentication information and application access information is provided to the user. In one or more embodiments disclosed herein, the authentication information and the application access information are provided to the user through the application service layer using any appropriate method of data transmission. As an example, the global controller may communicate the authentication information and the application access information as network data traffic units over a series of network devices that operatively connect the application service layer and the global controller. The authentication information may be one or more data structures that include a correlation identifier which may be associated with the provisioned application which the user may use to access and submit further request associated with the provisioned application. The authentication information may include other and/or additional information (e.g., a user identifier, successful provisioning confirmation, etc.). The authentication information and the application access information may be provided to the user via other and/or additional methods without departing from embodiments disclosed herein.

In one or more embodiments disclosed herein, the method ends following step 418.

At Step 420, a determination is made as to whether the sync policy is exceeded. In one or more embodiments disclosed herein, a sync policy may refer to one or more data structures that include retry requirements associated with application. The retry requirements may specify a retry count limit and/or a retry time limit. The retry count limit may begin upon receipt of the request. The sync policy may be included in the manifest. In one or more embodiments disclosed herein, the global controller checks whether the retry count and/or the retry time exceed the retry count limit and/or the retry time limit respectively. In one or more embodiments disclosed herein, if the retry count and/or the retry time do not exceed the retry count limit and/or the retry time limit respectively, then the global controller may determine that the sync policy is not exceeded. In one or more embodiments disclosed herein, if the retry count or the retry time exceed the retry count limit or the retry time limit respectively, then the global controller may determine that the sync policy is exceeded. The determination as to whether the sync policy is exceeded may be made via other and/or additional methods without departing from embodiments disclosed herein.

In one or more embodiments disclosed herein, if it is determined that the sync policy is exceeded, then the method ends following Step 420. In one or more embodiments disclosed herein, if it is determined that the sync policy is not exceeded, then the method proceeds to Step 408 to identify new target domains associated with application tasks which were associated with unavailable target domains as determined in Step 412.

Figure 4B:
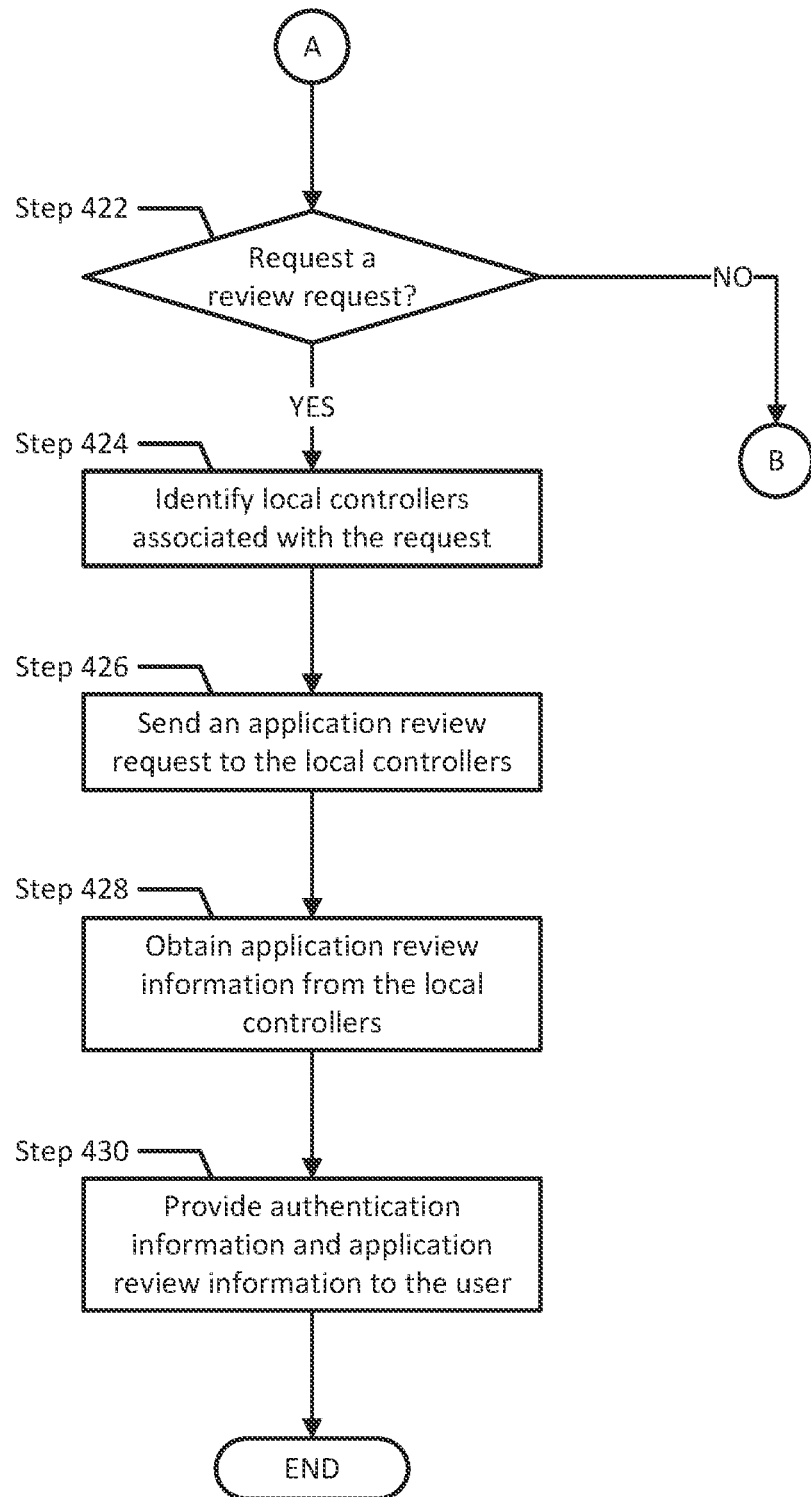

Turning to FIG. 4B, at Step 422, a determination is made as to whether the request is a create request. As discussed above, the request may include a manifest. Moreover, the manifest may include a request directive. The request directive may specify whether the request is a create request, review request, update request, or delete request. The request directive may be implemented as tags and/or flags, each associated with a create request, a review request, an update request, and a delete request. The request directive included in the manifest may include either a single tag associated with the type of request corresponding to the request or a single set flag associated with the type of request corresponding to the request.

In one or more embodiments disclosed herein, the global controller checks the request directive to determine whether the request is a review request. In one or more embodiments disclosed herein, if the request directive includes a tag or set flag associated with a review request, then the global controller may determine that the request is a review request. In one or more embodiments disclosed herein, if the request directive does not include a tag or set flag associated with a review request (e.g., includes a tag or set flag associated with another type of request), then the global controller may determine that the request is not a review request. The global controller may determine whether the request is a review request via other and/or additional methods without departing from embodiments disclosed herein.

In one or more embodiments disclosed herein, if it is determined that the request is a review request, then the method proceeds to Step 424. In one or more embodiments disclosed herein, if it is determined that the request is not a review request, then the method proceeds to Step 432 of FIG. 4C.

At Step 424, local controllers associated with the request are identified. The global controller may include or otherwise have access to provisioned application access information. The provisioned application access information may include correlation identifiers, user identifiers, domain identifiers, and/or local controller identifiers associated with previously provisioned applications. The global controller update the provisioned application access information when new applications are provisioned, applications are updated, and/or when applications are deleted. The review request may include a correlation identifier associated with the application with which the review request is associated. The global controller may use the correlation identifier included in the review request to identify the local controller identifiers included in the provisioned application access information that are associated with the correlation identifier. Local controllers associated with the request may be identified via other and/or additional methods without departing from embodiments disclosed herein.

At Step 426, an application review request is sent to the local controllers. In one or more embodiments disclosed herein, an application review request is sent to each of the local controllers using any appropriate method of data transmission. As an example, the global controller may communicate the application review requests as network data traffic units over a series of network devices that operatively connect the local controllers to the global controller. The application review request may be sent to the local controllers via other and/or additional methods without departing from embodiments disclosed herein.

At Step 428, application review information is obtained from the local controllers. In response to obtaining the application review requests, the local controller may obtain and/or generate review information associated with the application. The application review information may refer to one or more data structures that include any information associated with the status of the application without departing from embodiments disclosed herein. The review information may include, for example, performance metrics (e.g., SLOs, service success rate, service latencies, etc.), service uptimes, etc. After generating and/or obtaining the application review information, the local controller may provide the application review information to the global controller. In one or more embodiments disclosed herein, application review information is sent to the global controller using any appropriate method of data transmission. As an example, the local controllers may communicate the application review information as network data traffic units over a series of network devices that operatively connect the local controllers to the global controller. The application review information may be obtained from the local controllers via other and/or additional methods without departing from embodiments disclosed herein.

At Step 430, authentication information and the application review information are sent to the user. The global controller may compile the application review information obtained from the local controllers. In one or more embodiments disclosed herein, the application review information and the authentication information are sent to the user through the application service layer using any appropriate method of data transmission. For additional information regarding authentication information, refer to Step 418 of FIG. 4A. As an example, the global controller may communicate the application review information and the authentication information as network data traffic units over a series of network devices that operatively connect the global controller to the application service layer. The application review information and the authentication information may be sent to the user via other and/or additional methods without departing from embodiments disclosed herein.

In one or more embodiments disclosed herein, the method ends following Step 430.

Figure 4C:
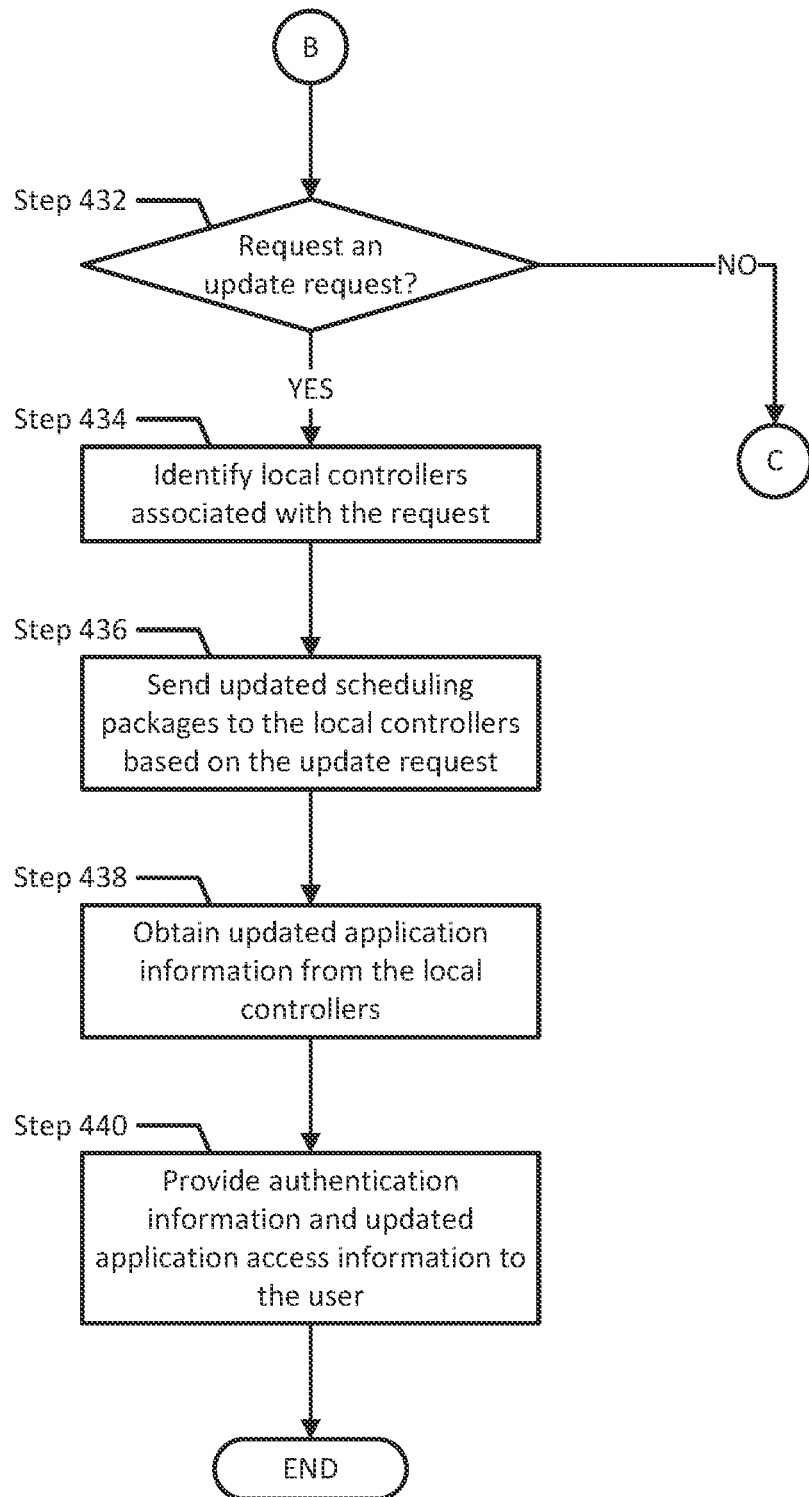

Turning to FIG. 4C, at Step 432, a determination is made as to whether the request is an update request. As discussed above, the request may include a manifest. Moreover, the manifest may include a request directive. The request directive may specify whether the request is a create request, review request, update request, or delete request. The request directive may be implemented as tags and/or flags, each associated with a create request, a review request, an update request, and a delete request. The request directive included in the manifest may include either a single tag associated with the type of request corresponding to the request or a single set flag associated with the type of request corresponding to the request.

In one or more embodiments disclosed herein, the global controller checks the request directive to determine whether the request is an update request. In one or more embodiments disclosed herein, if the request directive includes a tag or set flag associated with an update request, then the global controller may determine that the request is an update request. In one or more embodiments disclosed herein, if the request directive does not include a tag or set flag associated with an update request (e.g., includes a tag or set flag associated with another type of request), then the global controller may determine that the request is not an update request. The global controller may determine whether the request is an update request via other and/or additional methods without departing from embodiments disclosed herein.

In one or more embodiments disclosed herein, if it is determined that the request is an update request, then the method proceeds to Step 406. In one or more embodiments disclosed herein, if it is determined that the request is not an update request, then the method proceeds to Step 442 of FIG. 4D.

At Step 434, local controllers associated with the request are identified. The global controller may include or otherwise have access to provisioned application access information. The provisioned application access information may include correlation identifiers, user identifiers, domain identifiers, and/or local controller identifiers associated with previously provisioned applications. The global controller update the provisioned application access information when new applications are provisioned, applications are updated, and/or when applications are deleted. The request may include a correlation identifier associated with the application with which the review request is associated. The global controller may use the correlation identifier included in the request to identify the local controller identifiers included in the provisioned application access information that are associated with the correlation identifier.

The manifest may specify one or more application tasks and/or domains that may be updated. The global controller may also identify local controllers associated with the request based on the manifest. Additionally, if the manifest associated with the update request indicates that additional and/or different domains are required to perform the application update request, then the global controller may identify local controller associated with target domains based on the manifest as discussed in Steps 406 and 408 of FIG. 4A. Local controllers associated with the request may be identified via other and/or additional methods without departing from embodiments disclosed herein. Local controllers associated with the request may be identified via other and/or additional methods without departing from embodiments disclosed herein.

At Step 436, an updated scheduling package(s) are sent to the local controllers based on the update request. Updated scheduling package(s) may be sent to the local controllers based on the update request as discussed above in Step 414 of FIG. 4A.

At Step 438, updated application access information is obtained from the local controllers. After obtaining the updated scheduling packages, the local controllers may use the updated scheduling packages to perform domain level scheduling services to update the provisioned application. As a result, the local controllers may send scheduling assignments and provisioning commands to endpoint controllers, which may implement the scheduling assignments and provisioning commands to instantiate the application tasks within the target domains. Additionally, the local controllers may obtain and/or generate updated application access information associated with the application from the local controllers. The local controllers may then provide the updated application access information to the global controller. In one or more embodiments disclosed herein, the updated application access information is sent to the global controller using any appropriate method of data transmission. As an example, the local controllers may communicate the updated application access information as network data traffic units over a series of network devices that operatively connect the local controllers of the target domains and the global controller. Updated application access information may be obtained from the local controllers via other and/or additional methods without departing from embodiments disclosed herein.

In one or more embodiments disclosed herein, the updated application access information is an embodiment of the application access information discussed above in Step 416.

At Step 440, authentication information and the updated application access information are sent to the user. In one or more embodiments disclosed herein, the authentication information and the updated application access information are provided to the user through the application service layer using any appropriate method of data transmission. As an example, the global controller may communicate the authentication information and the updated application access information as network data traffic units over a series of network devices that operatively connect the application service layer and the global controller. The authentication information may be one or more data structures that include a correlation identifier which may be associated with the provisioned application which the user may use to access and submit further request associated with the provisioned application. The authentication information may include other and/or additional information (e.g., a user identifier, successful provisioning confirmation, etc.). The authentication information and the updated application access information may be provided to the user via other and/or additional methods without departing from embodiments disclosed herein.

In one or more embodiments disclosed herein, the method ends following Step 440.

Figure 4D:
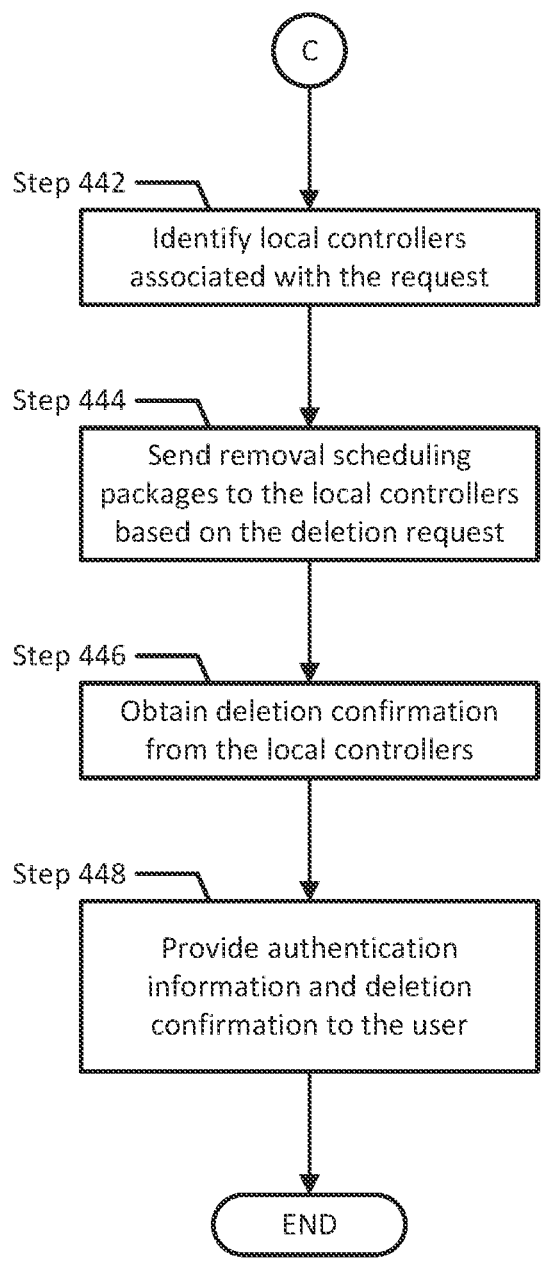

Turning to FIG. 4D, at step 442, local controllers associated with the request are identified. The global controller may include or otherwise have access to provisioned application access information. The provisioned application access information may include correlation identifiers, user identifiers, domain identifiers, and/or local controller identifiers associated with previously provisioned applications. The global controller update the provisioned application access information when new applications are provisioned, applications are updated, and/or when applications are deleted. The request may include a correlation identifier associated with the application with which the review request is associated. The global controller may use the correlation identifier included in the request to identify the local controller identifiers included in the provisioned application access information that are associated with the correlation identifier. Local controllers associated with the request may be identified via other and/or additional methods without departing from embodiments disclosed herein.

At Step 444, removal scheduling packages are sent to the local controllers based on the deletion request. In one or more embodiments disclosed herein, the global controller generates a removal scheduling package for each target domain.

In one or more embodiments disclosed herein, a removal scheduling package may refer to one or more data structures that may be used delete all, or a portion thereof (e.g., application tasks), of an application from the MCIE environment. The removal scheduling package may specify the application task(s) to be removed. A removal scheduling package may include other and/or additional information that may be used to remove application tasks from MCIE domains without departing from embodiments disclosed herein.

In one or more embodiments disclosed herein, the global controller sends to generated removal scheduling packages to the local controllers of the associated domains. In one or more embodiments disclosed herein, the removal scheduling packages are sent to the local controllers using any appropriate method of data transmission. As an example, the global controller may communicate the removal scheduling packages as network data traffic units over a series of network devices that operatively connect the local controllers of the target domains and the global controller. The removal scheduling packages may be sent to the local controllers of the target domains via other and/or additional methods without departing from embodiments disclosed herein.

At Step 446, deletion confirmation is obtained from the local controllers. In one or more embodiments disclosed herein, the deletion confirmation may refer to a message that indicates that application tasks and/or the application were successfully deleted. The deletion confirmation may be sent to the global controller using any appropriate method of data transmission. As an example, the local controllers may communicate the deletion confirmation as network data traffic units over a series of network devices that operatively connect the local controllers and the global controller. The deletion confirmation may be obtained from the local controllers via other and/or additional methods without departing from embodiments disclosed herein.

At Step 448, authentication information and the deletion confirmation are sent to the user. In one or more embodiments disclosed herein, the authentication information and the deletion confirmation are provided to the user through the application service layer using any appropriate method of data transmission. As an example, the global controller may communicate the authentication information and the deletion confirmation as network data traffic units over a series of network devices that operatively connect the application service layer and the global controller. The authentication information may be one or more data structures that include a correlation identifier which may be associated with the provisioned application which the user may use to access and submit further request associated with the provisioned application. The authentication information may include other and/or additional information (e.g., a user identifier). The authentication information and the deletion confirmation may be provided to the user via other and/or additional methods without departing from embodiments disclosed herein.

In one or more embodiments disclosed herein, the method ends following Step 448.

First Example

The following section describes a first example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to include simple examples to illustrate, at least in part, concepts described herein.

Consider a scenario in which a global controller provides global level scheduling services for an MCIE environment. At a first point in time, a user submits an application provisioning request to the global controller through the application service layer. The request includes user identifier and a personal identification number (PIN) associated with the user. In response to obtaining the request, the global controller performs request authentication to verify the user associated with the request. The global controller includes a list of registered user identifiers and PINs associated with each user identifier. The global controller performs authentication to verify the user by determining the user identifier and the PIN included in the request match a user identifier and corresponding PIN included in the list of registered users stored in the global controller.

After performing request authentication, the global controller determines whether the request is a create request. The request further includes a manifest. The manifest includes a request directive. The global controller identifies the request directive indicates that the application provisioning request is a create request for scheduling a new application within the MCIE environment. Next, the global controller identifies that the manifest specifies that the application includes twenty application tasks. The global controller then identifies that the manifest specifies that the user desires to provision the application in the geographical region of the state of Texas. The global controller then identifies, using capability information associated with the domains included in the MCIE environment, that the MCIE environment includes one cloud domain, two core domains, and ten edge domains in the state of Texas.

After identifying the domains included in the state of Texas, the global controller uses the scheduling requirements (e.g., hardware requirements) associated with each application tasks and capability information associated with the application tasks to identify target domains that satisfy the scheduling requirements. The target domains include the cloud domain, one of the two core domains, and one of the edge domains. Ten application tasks are to be scheduled into the cloud domain, seven application tasks are to be scheduled in the core domain, and the remaining three application tasks are to be scheduled in the edge domain. After identifying the target domains associated with each application task, the global controller then selects scheduling policies for each target domain. The global controller determines that the manifest specifies that the user has selected the default priority and selection of scheduling policies. As a result, each target domain will include the following scheduling policies in order from highest to lowest priority, makespan minimization, scheduling efficiency, resource utilization, and resource cost.

After selecting the scheduling policies for each target domain, the global controller determines whether each target domain is available by comparing the scheduling requirements of the application tasks associated with the target domains to capacity information associated with the target domains. For each of the three target domains, the capacity information exceeds the scheduling requirements. Accordingly, the global controller determines that each of the three target domains are available.

In response to the determination, the global controller generates a scheduling package for each of the target domains. The scheduling packages include the application tasks scheduled to the corresponding domains. The scheduling packages also include the selected scheduling policies and manifest information associated with each of the application tasks associated with the scheduling packages. The global controller then sends the scheduling packages to local controllers of the target domains (e.g., the cloud domain, the core domain, and the edge domain). In response to obtaining the scheduling packages, the local controller each perform domain level scheduling for the application tasks associated with their domains, thereby instantiating the application tasks on devices included in each of the domains.

As a result, the local controllers obtain application access information including URLs and network addresses that the user may use to access the portions of the application provisioned to the three domains. The local controller provides the application access information to the global controller, which then provides the application access information to the user through the application service layer. The global controller also generates a correlation identifier associated with the provisioned application. The correlation identifier may also be provided by the user, who may use the correlation identifier to access the application and submit future application provisioning request associated with the application.

End of First Example

Figure 5:
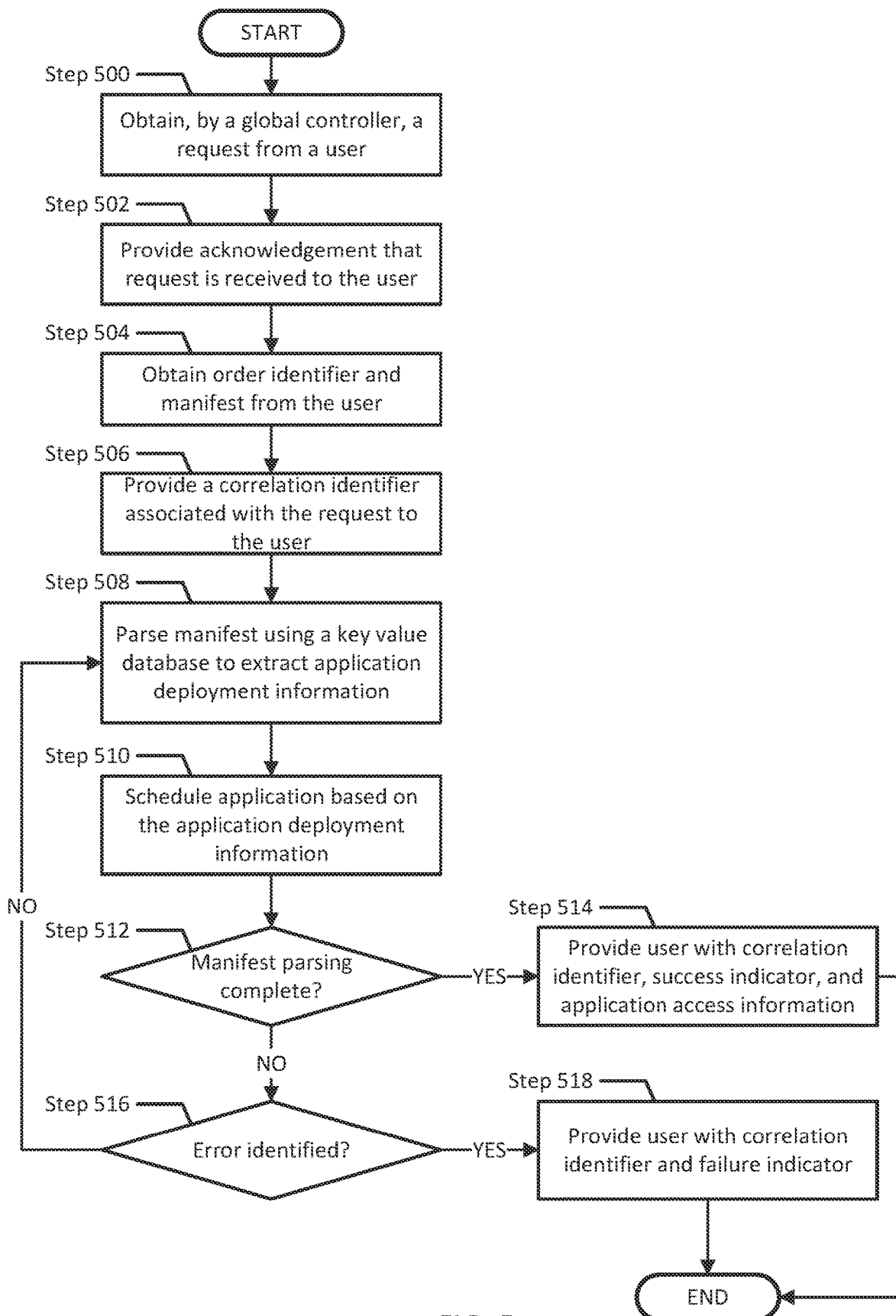
FIG. 5 shows a flowchart of a method for parsing a manifest to provision an application in accordance with one or more embodiments disclosed herein.

FIG. 5 shows a flowchart of a method for parsing a manifest to provision an application in accordance with one or more embodiments disclosed herein. The method of FIG. 5 may be performed by, for example, the global controller (104, FIG. 1A). Other components illustrated in FIG. 1A may perform all, or a portion, of the steps shown in FIG. 5 without departing from embodiments disclosed herein. While the various steps in the flowchart shown in FIG. 5 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

At Step 500, a request from a user is obtained. In one or more embodiments disclosed herein, the request is obtained from the user through the application service layer using any appropriate method of data transmission. As an example, the application service layer may communicate the request as network data traffic units over a series of network devices that operatively connect the application service layer and the global controller. The request may be obtained from the user via other and/or additional methods without departing from embodiments disclosed herein.

At Step 502, acknowledgement that the request is received is provided to the user. In response to obtaining the request, in one or more embodiments disclosed herein, the global controller provides acknowledgement that the request is received to the user through the application service layer using any appropriate method of data transmission. As an example, the global controller may communicate the request as network data traffic units over a series of network devices that operatively connect the application service layer and the global controller. The acknowledgement that the request is received may be provided to the user via other and/or additional methods without departing from embodiments disclosed herein.

At Step 504, an order identifier and a manifest is obtained from the user. In response to obtaining the acknowledgment, the user may send the order identifier and the manifest associated with the request to the global controller through the application service layer. In one or more embodiments disclosed herein, the user provides the order identifier and the manifest to the global controller through the application service layer using any appropriate method of data transmission. As an example, the user may communicate the order identifier and the manifest as network data traffic units over a series of network devices that operatively connect the application service layer and the global controller. The acknowledgement that the request is received may be provided to the user via other and/or additional methods without departing from embodiments disclosed herein.

At Step 506, a correlation identifier associated with the request is sent to the user. In one or more embodiments disclosed herein, the global controller generates and/or obtains a correlation identifier. The correlation identifier may be associated with the order identifier and the application provisioning job associated with the order identifier. The correlation identifier may be used to associate the user and the order identifier with the application corresponding to the request. The user may use the correlation identifier to submit future requests associated with the application. In one or more embodiments disclosed herein, the global controller provides correlation identifier to the user through the application service layer using any appropriate method of data transmission. As an example, the global controller may communicate the request as network data traffic units over a series of network devices that operatively connect the application service layer and the global controller. The correlation identifier associated with the request may be provided to the user via other and/or additional methods without departing from embodiments disclosed herein.

In one or more embodiments disclosed herein, the performance of Step 500 through Step 506 implement a light stateful approach between the global controller and the application service layer (e.g., user). A light stateful approach may refer to minimal maintenance of state between the global controller and the application service layer when services application provisioning requests. As a result, application provisioning requests may be serviced by the global controller with minimal status updates, requests, confirmations, and/or information being shared between the global controller and the application service layer. Therefore, a light stateful approach may improve the efficiency of servicing application provisioning requests, and enable the global controller to service a large quantity of application service requests.

At Step 508, the manifest is parsed using a key value database to extract application deployment information. In one or more embodiments disclosed herein, the global controller may parse the manifest upon receipt of the manifest in Step 504 without waiting for the entirety of the manifest to be obtained. The global controller may parse the manifest by extracting application deployment information included in the manifest using a key value database. A key value database may refer to a data storage method that stores objects (e.g., application deployment information, application programming interface (API) calls used to extract application deployment information and/or perform global scheduling services, etc.) and associated keys. The keys may refer to hashes, numbers, and/or identifiers which may be associated with particular objects stored in the key value database. The keys may be used to quickly retrieve objects stored in the key value database. The application deployment information may include all, or a portion thereof, the information included in the manifest that may be used to provision the application associated with the manifest within the MCIE environment. For additional information regarding the information included in the manifest, refer to FIG. 3. The manifest may be parsed using a key value database to extract application deployment information via other and/or additional methods without departing from embodiments disclosed herein.

At Step 510, an application is scheduled based on the application deployment information. In one or more embodiments disclosed herein, the global controller schedules the application based on application deployment information by identifying target domains for the application tasks based on the application deployment information and capability information associated with the domains included in the MCIE environment. The application deployment information may include information that the global controller may use to schedule the application to one or more target domains included in the MCIE environment information. For each application task, the global controller may identify a target domain that satisfies the scheduling requirements included in the application deployment information. The scheduling requirements may include user specified domain types, hardware requirements (e.g., compute requirements, memory requirements, domain accelerator requirements, network requirements, and/or storage requirements), geographical location requirements, etc. The global controller may use capability information associated with the MCIE domains provided by the local controllers (e.g., all or a portion of the graph database) to specify the capabilities of the MCIE domains. Any quantity of target domains may be identified for any quantity of application tasks without departing from embodiments disclosed herein. Target domains for the application tasks may be identified via other and/or additional methods without departing from embodiments disclosed herein.

In one or more embodiments disclosed herein, the global controller generates a scheduling package for each target domain.

In one or more embodiments disclosed herein, a scheduling package may refer to one or more data structures that may be used by the local controller of an associated target domain to perform domain level scheduling services. The scheduling package may specify the application task(s) to be scheduled, all, or a portion thereof, the information included in the manifest associated with the application task(s), and the selected scheduling policies and the associated priorities of the selected scheduling policies. A scheduling package may include other and/or additional information that may be used to perform domain level scheduling services without departing from embodiments disclosed herein.

In one or more embodiments disclosed herein, the global controller sends to generated scheduling packages to the local controllers of the associated target domains. In one or more embodiments disclosed herein, the scheduling packages are sent to the local controllers using any appropriate method of data transmission. As an example, the global controller may communicate the scheduling packages as network data traffic units over a series of network devices that operatively connect the local controllers of the target domains and the global controller. The scheduling packages may be sent to the local controllers of the target domains via other and/or additional methods without departing from embodiments disclosed herein.

The application may be scheduled based on the application deployment information via other and/or additional methods without departing from embodiments disclosed herein.

At Step 512, a determination is made as to whether the manifest parsing is complete. As discussed above, the global controller may parse the manifest upon receipt of the manifest in Step 504 without waiting for the entirety of the manifest to be obtained. As a result, the global controller may perform Steps 504, 508, and 510 as the manifest is ingested by the global controller until the manifest is completely parsed and the scheduling is complete. The global controller may determine whether the manifest parsing using any appropriate method for identifying an end of a data structure without departing from embodiments disclosed herein. For example, the global controller may use an end-of-file flag associated with the manifest to determine whether the parsing of the manifest is complete. The end-of-file flag may indicate that no additional data may be included in the manifest. In one or more embodiments disclosed herein, if the global controller has not identified the end-of-file flag included in the manifest during parsing, then the global controller determines that the manifest parsing is not complete. In one or more embodiments disclosed herein, if the global controller has identifies the end-of-file flag included in the manifest during parsing, then the global controller determines that the manifest parsing is complete. The determination as to whether the manifest parsing is complete may be made via other and/or additional methods without departing from embodiments disclosed herein.

In one or more embodiments disclosed herein, if it is determined the manifest parsing is complete, then the method proceeds to Step 514. The global controller may wait until the entirety of the application (e.g., all application tasks) is scheduled to one or more target domains prior to proceeding to Step 514. In one or more embodiments disclosed herein, if it is determined the manifest parsing is not complete, then the method proceeds to Step 518.

At Step 514, the correlation identifier, success indicator, and application access information are provided to the user. In one or more embodiments disclosed herein, the correlation identifier, the success indicator, and the application access information are provided to the user through the application service layer using any appropriate method of data transmission. As an example, the global controller may communicate the correlation identifier, the success indicator, and the application access information as network data traffic units over a series of network devices that operatively connect the application service layer and the global controller. The authentication information may be one or more data structures that include a correlation identifier which may be associated with the provisioned application which the user may use to access and submit further request associated with the provisioned application. The authentication information may include other and/or additional information (e.g., a user identifier, successful provisioning confirmation, etc.). The success indicator may be a flag, tag, message, etc. that indicates to the user that the application provisioning request was successfully serviced. The correlation identifier, the success indicator, and the application access information may be provided to the user via other and/or additional methods without departing from embodiments disclosed herein.

In one or more embodiments disclosed herein, the application access information refers to one or more data structures that may be used by the user that submitted the request to access the application provisioned within the MCIE environment. The application access information may include access information associated with the application. The application access information may include domain identifiers, device identifiers, URLs, network addresses, etc. associated with the provisioned application. The application access information may include other and/or additional information associated with provisioned application without departing from embodiments disclosed herein.

In one or more embodiments disclosed herein, the method ends following Step 514.

At Step 516, a determination is made as to whether an error is identified. In one or more embodiments disclosed herein, the global controller monitors the parsing of the manifest and the scheduling of the application to identify any errors that may occur using any appropriate method of monitoring without departing from embodiments disclosed herein. The errors may include, for example, requested domains unavailable, manifest transmission timeout, scheduling retry count or time limit exceeded, and/or unknown application deployment information identified. The error may include other and/or additional types of error that may occur during the parsing of the manifest and the scheduling of the application without departing from embodiments disclosed herein. In one or more embodiments disclosed herein, if the global controller identifies that an error has occurred that may result in the failure to parse the manifest and/or schedule the application, then the global controller determines that an error is identified. In one or more embodiments disclosed herein, if the global controller does not identify that an error has occurred that may result in the failure to parse the manifest and/or schedule the application, then the global controller may determine that an error is not identified. The determination as to whether an error is identified may be made via other and/or additional methods without departing from embodiments disclosed herein.

In one or more embodiments disclosed herein, if it is determined that an error is identified, then the method proceeds to step 518. In one or more embodiments disclosed herein, if it is determined that an error is not identified, then the method proceeds to step 508 (e.g., continue monitoring for errors until the manifest is completely parsed and the application is completely scheduled).

At Step 518, the user correlation identifier and a failure indicator is provided to the user. In one or more embodiments disclosed herein, the correlation identifier and the failure indicator are provided to the user through the application service layer using any appropriate method of data transmission. As an example, the global controller may communicate the correlation identifier and the failure indicator as network data traffic units over a series of network devices that operatively connect the application service layer and the global controller. The failure indicator may be a flag, tag, message, etc. that indicates to the user that the application provisioning request was not successfully serviced. The correlation identifier and the failure indicator may be provided to the user via other and/or additional methods without departing from embodiments disclosed herein.

In one or more embodiments disclosed herein, the method ends following Step 518.

Second Example

The following section describes a second example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to include simple examples to illustrate, at least in part, concepts described herein.

Consider a scenario in which a global controller parses a manifest obtained from a user to provision an application within the MCIE environment. At a first point in time, the global controller obtains a request from the user through the application service layer. In response to obtaining the request, the global controller sends an acknowledgement to the user that the request is received. After obtaining the acknowledgement, the user sends an order identifier and a manifest to the global controller. The global controller then generates a correlation identifier to associate the application corresponding to the request with the order identifier and the user. The global controller then provides the correlation identifier to the user.

Upon receipt of the manifest, the global controller parses the manifest using a key value database to extract application deployment information as the manifest is being received. In other words, the global controller parses the manifest prior to obtaining the entirety of the manifest. Parsing the manifest using the key value data includes storing data objects parsed from the manifest with associated keys. The data objects include application deployment information (e.g., application tasks, scheduling requirements, scheduling policy selections, user specified geographical regions, etc.) and commands (e.g., API calls) to parse the manifest and/or to perform global scheduling of the application. As the global controller populates the key value database with application deployment information extracted from the manifest, the global controller performs global scheduling services to provision the application associated with the manifest in the MCIE environment. The global controller may be quickly receive data objects (e.g., scheduling requirements, application tasks, etc.) from the key value database using the associated key to schedule the application based on the application deployment information as the manifest is parsed.

The global controller identifies that the application deployment information specifies that the application includes twenty application tasks. The global controller then identifies that the application deployment information further specifies that the user desires to provision the application in the geographical region of the state of California. The global controller then identifies, using capability information associated with the domains included in the MCIE environment, that the MCIE environment includes one cloud domain, eight core domains, and fifty edge domains in the state of California.

After identifying the domains included in the state of California, the global controller uses the scheduling requirements (e.g., hardware requirements) associated with each application tasks and capability information associated with the application tasks to identify target domains that satisfy the scheduling requirements. The target domains include the cloud domain, one of the eight core domains, and one of the fifty edge domains. Ten application tasks are to be scheduled into the cloud domain, seven application tasks are to be scheduled in the core domain, and the remaining three application tasks are to be scheduled in the edge domain. After identifying the target domains associated with each application task, the global controller then selects scheduling policies for each target domain. The global controller determines that the manifest specifies that the user has selected the default priority and selection of scheduling policies. As a result, each target domain will include the following scheduling policies in order from highest to lowest priority, makespan minimization, scheduling efficiency, resource utilization, and resource cost.

After determining that the parsing of the manifest is complete and target domains are identified for all application tasks included in the manifest, the global controller generates a scheduling package for each of the target domains. The scheduling packages include the application tasks scheduled to the corresponding domains. The scheduling packages also include the selected scheduling policies and application deployment information associated with each of the application tasks associated with the scheduling packages. The global controller then sends the scheduling packages to local controllers of the target domains (e.g., the cloud domain, the core domain, and the edge domain). In response to obtaining the scheduling packages, the local controller each perform domain level scheduling for the application tasks associated with their domains, thereby instantiating the application tasks on devices included in each of the domains.

As a result, the local controllers obtain application access information including URLs and network addresses that the user may use to access the portions of the application provisioned to the three domains. The local controller provides the application access information to the global controller, which then provides the application access information to the user through the application service layer. The global controller also generates a correlation identifier associated with the provisioned application. The correlation identifier may also be provided by the user, who may use the correlation identifier to access the application and submit future application provisioning request associated with the application.

End of Second Example

Figure 6:
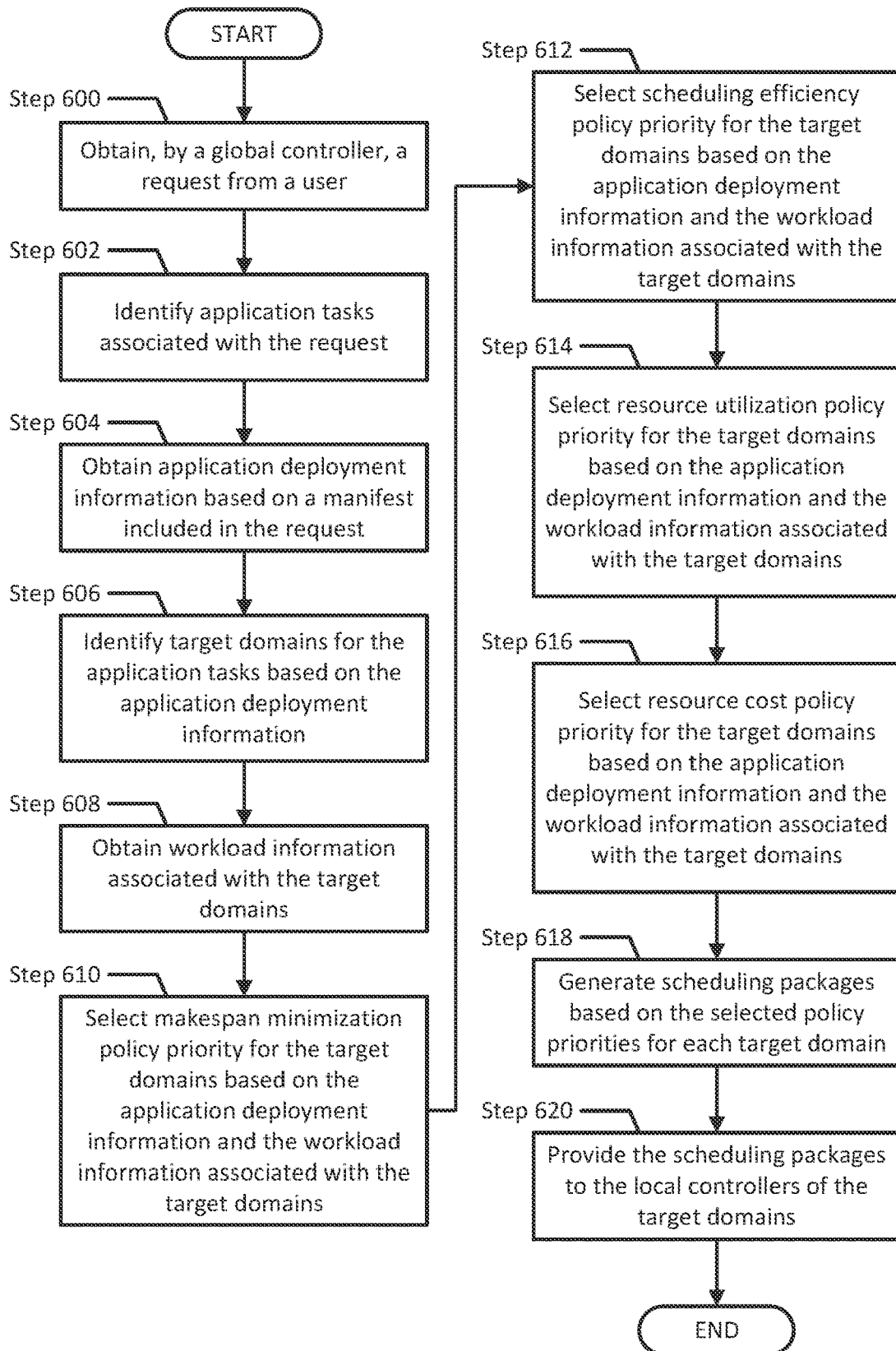
FIG. 6 shows a flowchart of a method for selecting scheduling policies when provisioning an application in accordance with one or more embodiments disclosed herein.

FIG. 6 shows a flowchart of a method for selecting scheduling policies when provisioning an application in accordance with one or more embodiments disclosed herein. The method of FIG. 6 may be performed by, for example, the global controller (104, FIG. 1A). Other components illustrated in FIG. 1A may perform all, or a portion, of the steps shown in FIG. 6 without departing from embodiments disclosed herein. While the various steps in the flowchart shown in FIG. 6 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

At Step 600, a request from a user is obtained by the global controller. The request may be an application provisioning request to provision an application within the MCIE environment. The request may include a manifest associated with the application. In one or more embodiments disclosed herein, the request is obtained from the user through the application service layer using any appropriate method of data transmission. As an example, the application service layer may communicate the request as network data traffic units over a series of network devices that operatively connect the application service layer and the global controller. The request may be obtained from the user via other and/or additional methods without departing from embodiments disclosed herein.

At Step 602, application tasks associated with the request are identified. As discussed above, the request may include a manifest. The manifest may specify the application tasks associated with the application corresponding with the create request (e.g., within the application task level information (314, FIG. 3) of the manifest (300, FIG. 3)). The global controller may parse the manifest to identify the application tasks associated with the application corresponding the create request. The application tasks associated with the request may be identified via other and/or additional methods without departing from embodiments disclosed herein.

At Step 604, application deployment information is obtained based on a manifest included in the request. The global controller may parse the manifest by extracting application deployment information included in the manifest using a key value database. A key value database may refer to a data storage method that stores objects (e.g., application deployment information, application programming interface (API) calls used to extract application deployment information and/or perform global scheduling services, etc.) and associated keys. The keys may refer to hashes, numbers, and/or identifiers which may be associated with particular objects stored in the key value database. The keys may be used to quickly retrieve objects stored in the key value database. The application deployment information may include all, or a portion thereof, the information included in the manifest that may be used to provision the application associated with the manifest within the MCIE environment. For additional information regarding the information included in the manifest, refer to FIG. 3. Application deployment information may be obtained based on a manifest included in the request via other and/or additional methods without departing from embodiments disclosed herein.

At Step 606, target domains for the application tasks are identified based on the application deployment information. In one or more embodiments disclosed herein, the global controller identifies target domains for the application tasks based on the application deployment information and capability information associated with the domains included in the MCIE environment. As discussed above, the application deployment information may include information that the global controller may use to schedule the application to one or more target domains included in the MCIE environment information. For each application task, the global controller may identify a target domain that satisfies the scheduling requirements specified in the application deployment information. The scheduling requirements may include user specified domain types, hardware requirements (e.g., compute requirements, memory requirements, domain accelerator requirements, network requirements, and/or storage requirements), geographical location requirements, etc. The global controller may use capability information associated with the MCIE domains provided by the local controllers (e.g., all, or a portion of, the graph database) to specify the capabilities of the MCIE domains. Any quantity of target domains may be identified for any quantity of application tasks without departing from embodiments disclosed herein. Target domains for the application tasks may be identified based on the application deployment information via other and/or additional methods without departing from embodiments disclosed herein.

At Step 608, workload information associated with the target domains are obtained. In one or more embodiments disclosed herein, the global control may obtain and/or otherwise have access to workload information associated with the target domains. The workload information may refer to one or more data structures that includes capacity information associated with the local controllers of the target domains. The workload information may include, the quantity of active scheduling jobs associated with local controllers, the quantity of scheduling jobs and/or application tasks included in a backlog of the local controllers, and the quantity of local controller scheduler instances active on the local controllers. The workload information may include other and/or additional information associated with the target domains without departing from embodiments disclosed herein. The global controller may generate the workload information by monitoring the local controllers. The global controller may also periodically obtain the workload information from the local controllers. Workload information associated with the target domains may be obtained via other and/or additional methods without departing from embodiments disclosed herein.

At Step 610, makespan minimization policy priority is selected for the target domains based on the application deployment information and the workload information associated with the target domains. In one or more embodiments disclosed herein, the global controller selects the default makespan minimization policy priority for the target domains. The application deployment information may not include any user selected preferences for the scheduling policies. Moreover, the workload information may indicate that the load on the local controllers is not heavy (e.g., scheduling jobs threshold, backlog tasks threshold, and/or active local controller scheduling instances threshold not exceeded). In such scenarios, the global controller may select a default makespan minimization policy priority. The default makespan minimization priority may be the highest priority without departing from embodiments disclosed herein.

In one or more embodiments disclosed herein, a scheduling policy priority may refer to an order in which the local controller may perform (or attempt to satisfy) the scheduling operations associated with a scheduling policy. In other words, a local controller may perform or attempt to satisfy a scheduling policy operation with a higher priority prior to performing or attempting to satisfy a scheduling policy operation with a lower priority. The priority may refer to a position in an ordered list of scheduling policies. The first position of the ordered list of scheduling policies may correspond to the highest priority and the last position of the ordered list of scheduling policies may correspond to the lowest priority. For example, if makespan minimization has a higher priority than resource cost, then the local controller may attempt to satisfy the makespan minimization policy requirements prior to attempting to satisfy the resource cost policy requirements.

In one or more embodiments disclosed herein, the application deployment information includes a user preference associated with the makespan minimization scheduling policy. The user preference may specify whether to include the makespan minimization scheduling policies and a priority associated with the makespan minimization scheduling policy. The priority may be a position in the ordered list of selected scheduling policies. The global controller may select the makespan minimization policy priority based on the user preference included in the application deployment information.

In one or more embodiments disclosed herein, the global controller selects the makespan minimization priority based on the workload information. If there is not user preferences associated with the makespan minimization priority, then the global controller will check the workload information associated with the local controllers of the target domains. If the workload information indicates that the local controllers associated with the target domains are experiencing a heavy workload (e.g., scheduling jobs threshold exceeded, backlog tasks threshold exceeded, active local controller scheduling instances threshold exceeded, etc.), the global controller may select a lower prioritization for the makespan minimization policy or refrain from selecting the makespan minimization policy for those target domains.

In one or more embodiments disclosed herein, the makespan minimization policy priorities may be selected on an application task basis (e.g., selected for each application task) and/or a target domain basis (e.g., selected for all application tasks associated with a target domain). Makespan minimization policy priority may be selected for the target domains based on the application deployment information and the workload information associated with the target domains via other and/or additional methods without departing from embodiments disclosed herein.

At Step 612, scheduling efficiency policy priority is selected for the target domains based on the application deployment information and the workload information associated with the target domains. In one or more embodiments disclosed herein, the global controller selects the default scheduling efficiency policy priority for the target domains. The application deployment information may not include any user selected preferences for the scheduling policies. Moreover, the workload information may indicate that the load on the local controllers is not heavy (e.g., scheduling jobs threshold, backlog tasks threshold, and/or active local controller scheduling instances threshold not exceeded). In such scenarios, the global controller may select a default scheduling efficiency policy priority. The default scheduling efficiency priority may be the second highest priority (e.g., the second position of the ordered list of scheduling policies) without departing from embodiments disclosed herein.

In one or more embodiments disclosed herein, the global controller selects the scheduling efficiency priority based on the workload information. If there is not user preferences associated with the scheduling efficiency priority, then the global controller will check the workload information associated with the local controllers of the target domains. If the workload information indicates that the local controllers associated with the target domains are experiencing a heavy workload (e.g., scheduling jobs threshold exceeded, backlog tasks threshold exceeded, active local controller scheduling instances threshold exceeded, etc.), the global controller may select a lower prioritization for the scheduling efficiency policy or refrain from selecting the scheduling efficiency policy for those target domains.

In one or more embodiments disclosed herein, the scheduling efficiency policy priorities may be selected on an application task basis (e.g., selected for each application task) and/or a target domain basis (e.g., selected for all application tasks associated with a target domain). Scheduling efficiency policy priority may be selected for the target domains based on the application deployment information and the workload information associated with the target domains via other and/or additional methods without departing from embodiments disclosed herein.

At Step 614, resource utilization policy priority is selected for the target domains based on the application deployment information and the workload information associated with the target domains. In one or more embodiments disclosed herein, the global controller selects the default resource utilization policy priority for the target domains. The application deployment information may not include any user selected preferences for the scheduling policies. Moreover, the workload information may indicate that the load on the local controllers is not heavy (e.g., scheduling jobs threshold, backlog tasks threshold, and/or active local controller scheduling instances threshold not exceeded). In such scenarios, the global controller may select a default resource utilization policy priority. The default resource utilization priority may be the third highest priority (e.g., the third position of the ordered list of scheduling policies) without departing from embodiments disclosed herein.

In one or more embodiments disclosed herein, the global controller selects the resource utilization priority based on the workload information. If there is not user preferences associated with the resource utilization priority, then the global controller will check the workload information associated with the local controllers of the target domains. If the workload information indicates that the local controllers associated with the target domains are experiencing a heavy workload (e.g., scheduling jobs threshold exceeded, backlog tasks threshold exceeded, active local controller scheduling instances threshold exceeded, etc.), the global controller may select a lower prioritization for the resource utilization policy or refrain from selecting the resource utilization policy for those target domains.

In one or more embodiments disclosed herein, the resource utilization policy priorities may be selected on an application task basis (e.g., selected for each application task) and/or a target domain basis (e.g., selected for all application tasks associated with a target domain). Resource utilization policy priority may be selected for the target domains based on the application deployment information and the workload information associated with the target domains via other and/or additional methods without departing from embodiments disclosed herein.

At Step 616, resource cost policy priority is selected for the target domains based on the application deployment information and the workload information associated with the target domains. In one or more embodiments disclosed herein, the global controller selects the default resource cost policy priority for the target domains. The application deployment information may not include any user selected preferences for the scheduling policies. Moreover, the workload information may indicate that the load on the local controllers is not heavy (e.g., scheduling jobs threshold, backlog tasks threshold, and/or active local controller scheduling instances threshold not exceeded). In such scenarios, the global controller may select a default resource cost policy priority. The default resource cost priority may be the third highest priority (e.g., the third position of the ordered list of scheduling policies) without departing from embodiments disclosed herein.

In one or more embodiments disclosed herein, the global controller selects the resource cost priority based on the workload information. If there is not user preferences associated with the resource cost priority, then the global controller will check the workload information associated with the local controllers of the target domains. If the workload information indicates that the local controllers associated with the target domains are experiencing a heavy workload (e.g., scheduling jobs threshold exceeded, backlog tasks threshold exceeded, active local controller scheduling instances threshold exceeded, etc.), the global controller may select a lower prioritization for the resource cost policy or refrain from selecting the resource cost policy for those target domains.

In one or more embodiments disclosed herein, the resource cost policy priorities may be selected on an application task basis (e.g., selected for each application task) and/or a target domain basis (e.g., selected for all application tasks associated with a target domain). Resource cost policy priority may be selected for the target domains based on the application deployment information and the workload information associated with the target domains via other and/or additional methods without departing from embodiments disclosed herein.

At Step 618, scheduling packages are generated based on the selected policy priorities for each target domain. In one or more embodiments disclosed herein, the global controller generates a scheduling package for each target domain. The scheduling packages may include the selected scheduling policies and their corresponding priorities associated with each target domain. The scheduling packages may be generated based on the selected policy priorities for each target domain via other and/or additional methods without departing from embodiments disclosed herein.

In one or more embodiments disclosed herein, a scheduling package may refer to one or more data structures that may be used by the local controller of an associated target domain to perform domain level scheduling services. The scheduling package may specify the application task(s) to be scheduled, all, or a portion thereof, the information included in the manifest associated with the application task(s), and the selected scheduling policies and the associated priorities of the selected scheduling policies. A scheduling package may include other and/or additional information that may be used to perform domain level scheduling services without departing from embodiments disclosed herein.

At Step 620, the scheduling packages are provided to the local controllers of the target domains. In one or more embodiments disclosed herein, the global controller sends to generated scheduling packages to the local controllers of the associated target domains. In one or more embodiments disclosed herein, the scheduling packages are sent to the local controllers using any appropriate method of data transmission. As an example, the global controller may communicate the scheduling packages as network data traffic units over a series of network devices that operatively connect the local controllers of the target domains and the global controller. The scheduling packages may be sent to the local controllers of the target domains via other and/or additional methods without departing from embodiments disclosed herein.

In one or more embodiments disclosed herein, the method ends following Step 620.

Third Example

The following section describes a third example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to include simple examples to illustrate, at least in part, concepts described herein.

Consider a scenario in which a global controller selects the scheduling policies for target domains to provision an application within an MCIE environment. At a first point in time, a user submits an application provisioning request to the global controller through the application service layer. Next, the global controller identifies that the manifest specifies that the application includes twenty application tasks. The global controller then identifies that the manifest further specifies that the user desires to provision the application in the geographical region of the state of Texas. The global controller then identifies, using capability information associated with the domains included in the MCIE environment, that the MCIE environment includes one cloud domain, two core domains, and ten edge domains in the state of Texas.

After identifying the domains included in the state of Texas, the global controller uses the scheduling requirements (e.g., hardware requirements) associated with each application tasks and capability information associated with the application tasks to identify target domains that satisfy the scheduling requirements. The target domains include the cloud domain, one of the two core domains, and one of the edge domains. Ten application tasks are to be scheduled into the cloud domain, seven application tasks are to be scheduled in the core domain, and the remaining three application tasks are to be scheduled in the edge domain. After identifying the target domains associated with each application task, the global controller obtains workload information associated with each target domain. The workload information specifies the current load on the local controllers of the target domains.

The global controller determines that the manifest specifies that the user has selected that each of the ten application tasks scheduled to the cloud domain should use the default priority and selection of scheduling policies. As a result, the cloud target domain will include the following scheduling policies in order from highest to lowest priority, makespan minimization, scheduling efficiency, resource utilization, and resource cost. The global controller also determines that the manifest does not include any user preferences for the selection of scheduling policies for the remaining ten application tasks. Based on the determination, the global controller checks the workload information associated with both the cloud target domain and the edge target domain. The workload information indicates that the load on the local controller of the core target domain is low and that the load on the local controller of the edge domain is high. As a result, the global controller selects the default priority and selection of scheduling policies for the core target domain, but only selects the resource utilization priority for the edge domain. Therefore, the domain level scheduling may be expedited on the edge target domain in response to the high load on the local controller of the edge target domain.

The global controller then generates a scheduling package for each of the target domains. The scheduling packages include the application tasks scheduled to the corresponding domains. The scheduling packages also include the selected scheduling policies and manifest information associated with each of the application tasks associated with the scheduling packages. The global controller then sends the scheduling packages to local controllers of the target domains (e.g., the cloud domain, the core domain, and the edge domain). In response to obtaining the scheduling packages, the local controller each perform domain level scheduling for the application tasks associated with their domains, thereby instantiating the application tasks on devices included in each of the domains.

End of Third Example

Figure 7:
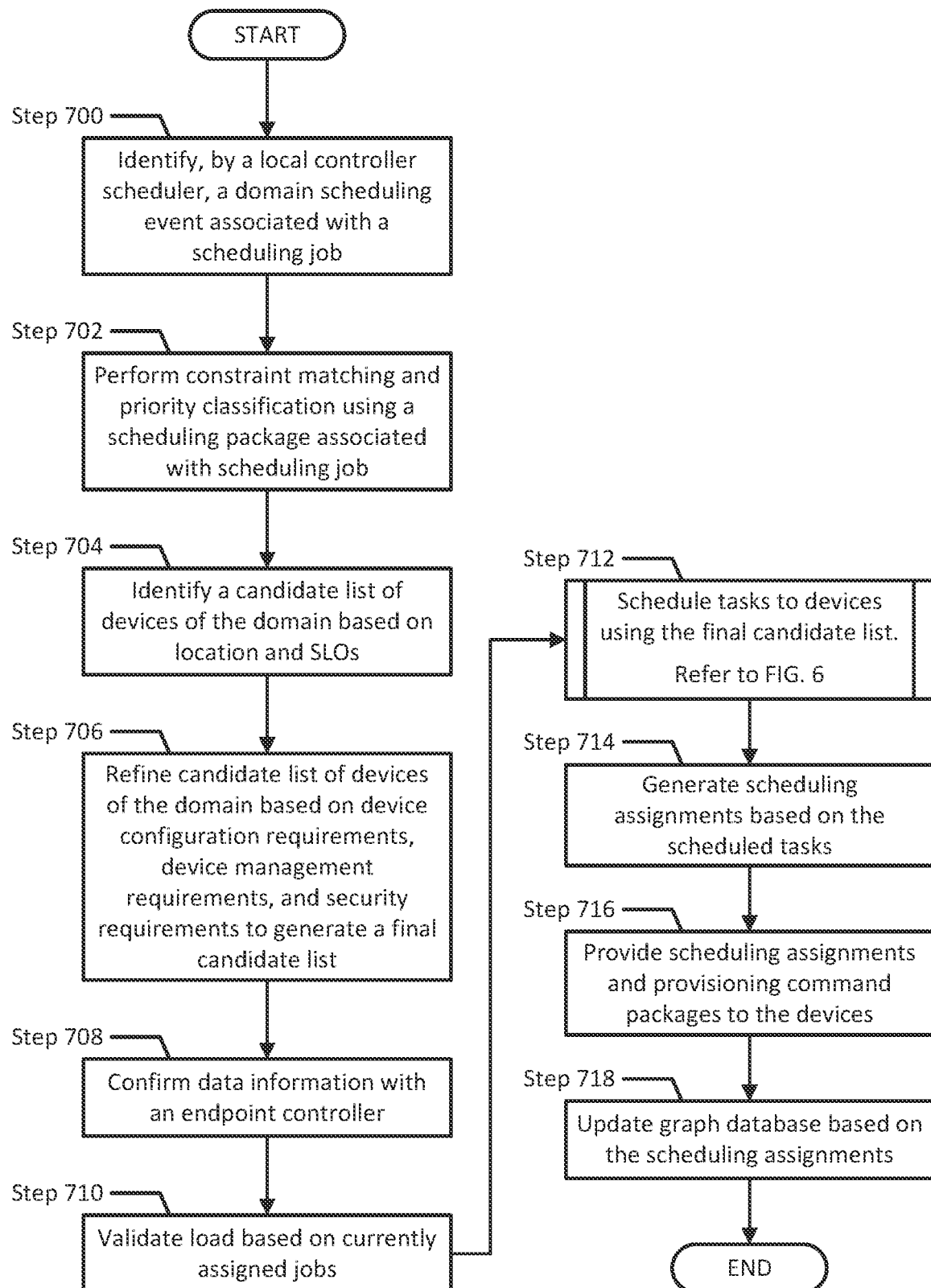
FIG. 7 shows a flowchart of a method for assigning application tasks within a domain in accordance with one or more embodiments disclosed herein.

FIG. 7 shows a flowchart of a method for assigning application tasks within a domain in accordance with one or more embodiments disclosed herein. The method of FIG. 7 may be performed by, for example, a local controller (e.g., 112A, FIG. 1A). Other components illustrated in FIG. 1A may perform all, or a portion, of the steps shown in FIG. 7 without departing from embodiments disclosed herein. While the various steps in the flowchart shown in FIG. 7 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

At Step 700, a domain scheduling event associated with a scheduling job is identified by the local controller. In one or more embodiments disclosed herein, the local controller monitors for a domain scheduling event. The domain scheduling event may include obtaining a scheduling package from the global controller, identifying a configurable amount of scheduling jobs in a queue, and/or identifying a configurable amount of application tasks included in a backlog. The domain scheduling event may include other and/or additional types of events associated with scheduling jobs without departing from embodiments disclosed herein. The local controller may identifier the occurrence of the aforementioned events as a domain scheduling event. A domain scheduling event associated with a scheduling job may be identified by the local controller via other and/or additional methods without departing from embodiments disclosed herein.

At Step 702, constraint matching and priority classification is performed using a scheduling package associated with the scheduling job. In one or more embodiments disclosed herein, the local controller performs constraint matching and priority classification by parsing the scheduling package. As discussed above, a scheduling package may include a list of application tasks to schedule within the domain associated with the local controller. The scheduling package may further include scheduling constraints (e.g., scheduling requirements and/or scheduling criteria) and priorities associated with the application tasks. The local controller may perform constraint matching and priority classification by (i) identifying the scheduling constraints associated with each application task, and (ii) identifying a priority associated with each application task respectively. As a result, the local controller may identify the scheduling constraints and the priorities associated with each application task associated with the scheduling job. The scheduling job may refer to the operation of scheduling application tasks associated with a scheduling package within the domain corresponding to the local controller. Constraint matching and priority classification may be performed via other and/or additional methods without departing from embodiments disclosed herein.

At Step 704, a candidate list of devices of the domain are identified based on location and SLOs. In one or more embodiments disclosed herein, the local controller identifies the candidate list of devices using a graph database. As discussed above, the graph database may include capability information and associated with each device included in the domain. The capability information may specify performance characteristics (e.g., device latencies, resource capacities, etc.). The graph database may further include location information (e.g., geographical locations such as coordinates, cities, geographical regions, etc.) associated with the devices included in the domain.

The local controller may compare the location information and performance characteristics of the graph database associated with each device with the SLOs and the locations included in the scheduling constraints associated with each application task. The local controller may identify a candidate list of devices that satisfy location requirements and SLOs associated with each application task. The candidate list of devices may include one or more devices of the device set of the domain that are located within the location requirements and are capable of providing the SLOs associated with each application task as specified by the scheduling criteria identified in Step 704. A device included in the candidate list of devices may be satisfy the SLOs and location requirements associated with any quantity of application tasks without departing from embodiments disclosed herein. The candidate list of devices of the domain are identified based on location and SLOs via other and/or additional methods without departing from embodiments disclosed herein.

At Step 706, the candidate list of devices is refined based on the device configuration requirements, the device management requirements, and the device security requirements to generate a final candidate list. As discussed above, each application task may be associated with scheduling requirements which include device configuration requirements, device management requirements, and device security requirements. The device configuration requirements may include resource requirements (e.g., compute requirements, network requirements, accelerator requirements, memory requirements, storage requirements, etc.), specific types of resources (e.g., GPU, FPGA, specific types of processors, RAM, DRAM, PMEM, etc.), and/or specific quantities of resources associated with the application tasks. The hardware configuration requirements may include other and/or additional types of requirements associated with the application tasks without departing from embodiments disclosed herein. The device management requirements may include software management requirements. The software management requirements may include specific operating systems, hypervisors, and/or cloud environments. The device management requirements may include other and/or additional types of management requirements associated with the application tasks without departing from embodiments disclosed herein. The device security requirements may include security requirements associated with the application tasks. The security requirements may include encryption capabilities, types of encryption keys, digital signatures, etc. associated with the application tasks. The security requirements may include other and/or additional types of security requirements without departing from embodiments disclosed herein.

In one or more embodiments disclosed herein, the local controller refines the candidate list of devices to generate a final candidate list of devices that satisfy the device configuration requirements, the device management requirements, and the device security requirements. The local controller may compare the device configuration requirements, the device management requirements, and the device security requirements with the capability information associated with the candidate list of devices to identify a subset of devices included in the candidate list of devices that satisfy the device configuration requirements, the device management requirements, and the device security requirements. The subset of devices included in the candidate list may be the final candidate list of devices. The candidate list of devices may be refined based on the device configuration requirements, the device management requirements, and the device security requirements to generate a final candidate list via other and/or additional methods without departing from embodiments disclosed herein.

At Step 708, data information is confirmed with an endpoint controller. As discussed above, one or more application tasks may consume one or more data sources during execution. The scheduling package may include data information associated with data to be consumed by the application tasks. The data information (e.g., data consumption information) may include file identifiers, storage locations, network addresses, etc. associated with the data sources. The local controller may send a verification request to one or more endpoint controllers of one or more devices included in the final candidate list of devices to confirm whether the devices include or otherwise have access to the data sources. The request may include all, or a portion thereof, the data information. In response to obtaining the request, the endpoint controllers may verify whether the data sources are included or otherwise accessible. The endpoint controllers may then notify the local controller whether the data sources are included or otherwise available. In one or more embodiments disclosed herein, the method proceeds to Step 710 following the confirmation of the data information.

In one or more embodiments disclosed herein, although not shown in FIG. 7, if the devices notify the local controller that the data sources are not included or otherwise inaccessible, the local controller may (i) repeat Steps 704 and 706 to identify other candidate devices that may include access to the data sources, (ii) add application tasks associated with the data sources to the backlog, or (iii) cancel the scheduling job and request the global controller to reschedule the application tasks associated with the data sources.

Data information may be confirmed with an endpoint controller via other and/or additional methods without departing from embodiments disclosed herein.

At Step 710, the load is validated based on currently assigned jobs. In one or more embodiments disclosed herein, the local controller validates the load of the devices included in the final candidate list with the scheduling requirements associated with the application tasks. The scheduling requirements may include the resource requirements associated with the application tasks. The local controller may compare the resource requirements associated with the application tasks with the capacity information associated with the devices included in the candidate list of devices. The capacity information may be included in the graph database, and may specify the resource availability based on the currently assigned application tasks executing on the devices. The local controller may confirm whether the resource availability of the devices included in the final candidate list as specified by the capacity information is greater than the resource requirements of the application tasks. In one or more embodiments disclosed herein, the method proceeds to Step 712 following the validation of the load based on the currently assigned jobs.

In one or more embodiments disclosed herein, although not shown in FIG. 7, if the devices notify the local controller that the data sources are not included or otherwise inaccessible, the local controller may (i) repeat Steps 704, 706, and 708 to identify other candidate devices that can handle the resource requirements of the application tasks, (ii) add application tasks associated with the unavailable candidate devices to the backlog, or (iii) cancel the scheduling job and request the global controller to reschedule the application tasks associated with the unavailable candidate devices.

The load may be validated based on currently assigned jobs via other and/or additional methods without departing from embodiments disclosed herein.

At Step 712, tasks are scheduled to devices using the final candidate list. For additional information regarding scheduling tasks to devices using the final candidate list, refer to FIG. 8.

At Step 714, scheduling assignments are generated based on the scheduled tasks. As a result of Step 712, the local controller may identify devices for which to execute each application task. The local controller may then generate scheduling assignments based on the identified devices. The scheduling assignments may refer to one or more data structures that specify which device executes each application task. The scheduling assignments may include mappings between device identifiers and application task identifiers. The scheduling assignments may include other and/or additional information that may be used to specify scheduled tasks and corresponding devices without departing from embodiments disclosed herein. The scheduling assignments may be generated based on the scheduled tasks via other and/or additional methods without departing from embodiments disclosed herein.

At Step 716, scheduling assignments and provisioning command packages are sent to the devices. The local controller may generate a provisioning command package based on the scheduling assignments. The provisioning command package may refer to one or more data structures that includes instructions for instantiating the application tasks the associated devices. The instructions may include API calls, binaries, and/or application task templates. The instructions may include other and/or additional information that may be used to instantiate the application tasks on the associated devices without departing from embodiments disclosed herein.

In one or more embodiments disclosed herein, the scheduling assignments and provisioning command packages are provided to endpoint controllers of the devices using any appropriate method of data transmission. As an example, the local controller may communicate the scheduling assignments and provisioning command packages as network data traffic units over a series of network devices that operatively connect the local controller and the endpoint controllers of the devices. The scheduling assignments and provisioning command packages may be provided to the devices via other and/or additional methods without departing from embodiments disclosed herein.

At Step 718, the graph database is updated based on the scheduling assignments. The local controller may update the capacity information of the graph database based on the scheduling assignments. The updated capacity information may include the application identifiers, the application task identifiers, and the resource information associated with each device used to complete the scheduling job. The graph database may be updated based on the scheduling assignments via other and/or additional methods without departing from embodiments disclosed herein.

In one or more embodiments disclosed herein, the method ends following Step 718.

Fourth Example

The following section describes a fourth example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to include simple examples to illustrate, at least in part, concepts described herein.

Consider a scenario in which a local controller performs domain level scheduling of application tasks in devices of a domain. At a first point in time, the local controller identifies a domain scheduling event. The domain scheduling event includes obtaining a scheduling package which initiates the performance of a scheduling job by the local controller. The scheduling job includes scheduling application tasks included in the scheduling package to one or more devices of the domain. The local controller then performs constraint matching and priority classification using the scheduling package. As a result, the local controller matches the scheduling constraints and/or criteria included in the scheduling package with each corresponding application task and classifies each application task based on a corresponding priority specified by the scheduling package. The local controller then identifies a candidate list of devices included in the domain that satisfy location requirements and SLOs (e.g., latency, resource performance metrics, etc.) included in the scheduling constraints and/or criteria associated with each application task. The scheduling constraints specify that each application task is to be scheduled in a device located in New York City, New York. The local controller therefore identifies ten devices that are located in New York City that also satisfy the SLOs associated with the application tasks.

The local controller then refines the candidate list of devices based on device configuration requirements, device management requirements, and device security requirements. The device configuration requirements specify that devices with a GPU are required. The device management requirements specify that devices with Linux operating systems are required. Finally, the device security requirements specify that devices that include public key infrastructure (PKI) capabilities are required by the application tasks. As a result, the local controller refines the candidate list of ten devices down to three of the ten devices to generate a final candidate list. The final candidate list includes the three devices.

The scheduling package further specifies file names associated with files that the application tasks consume during execution. As a result, the local controller sends a data verification request to endpoint controllers of the three devices in the final candidate list to confirm that the three devices include or otherwise have access to files associated with the file names. The endpoint controllers respond to the data verification request with confirmation that the files are available to the three devices. The local controller then compares the scheduling requirements (e.g., resource requirements) associated with the application tasks with the capacity information associated with the devices to validate that the three devices are available to schedule the application tasks.

After confirming data information and validating the load on the three devices, the local controller generates scheduling assignments. The scheduling assignments specify that five tasks are scheduled to a first device of the final candidate list, and the remaining five tasks are scheduled to a second device of the final candidate list. The local controller then generates provisioning command packages for the first device and the second device to instantiate the application tasks. The local controller then provides the scheduling assignments provisioning command packages to endpoint controllers of the first device and the second device. As a result, the endpoint controller instantiates the application tasks on the first device and the second device using the scheduling assignments and the provisioning command packages. Finally, the local controller updates the graph database based on the scheduling assignments. Therefore, the graph database updates the capacity information of the first device and the second device based on the scheduling assignments and includes the scheduling assignments associated with the first device and the second device.

End of Fourth Example

Figure 8:
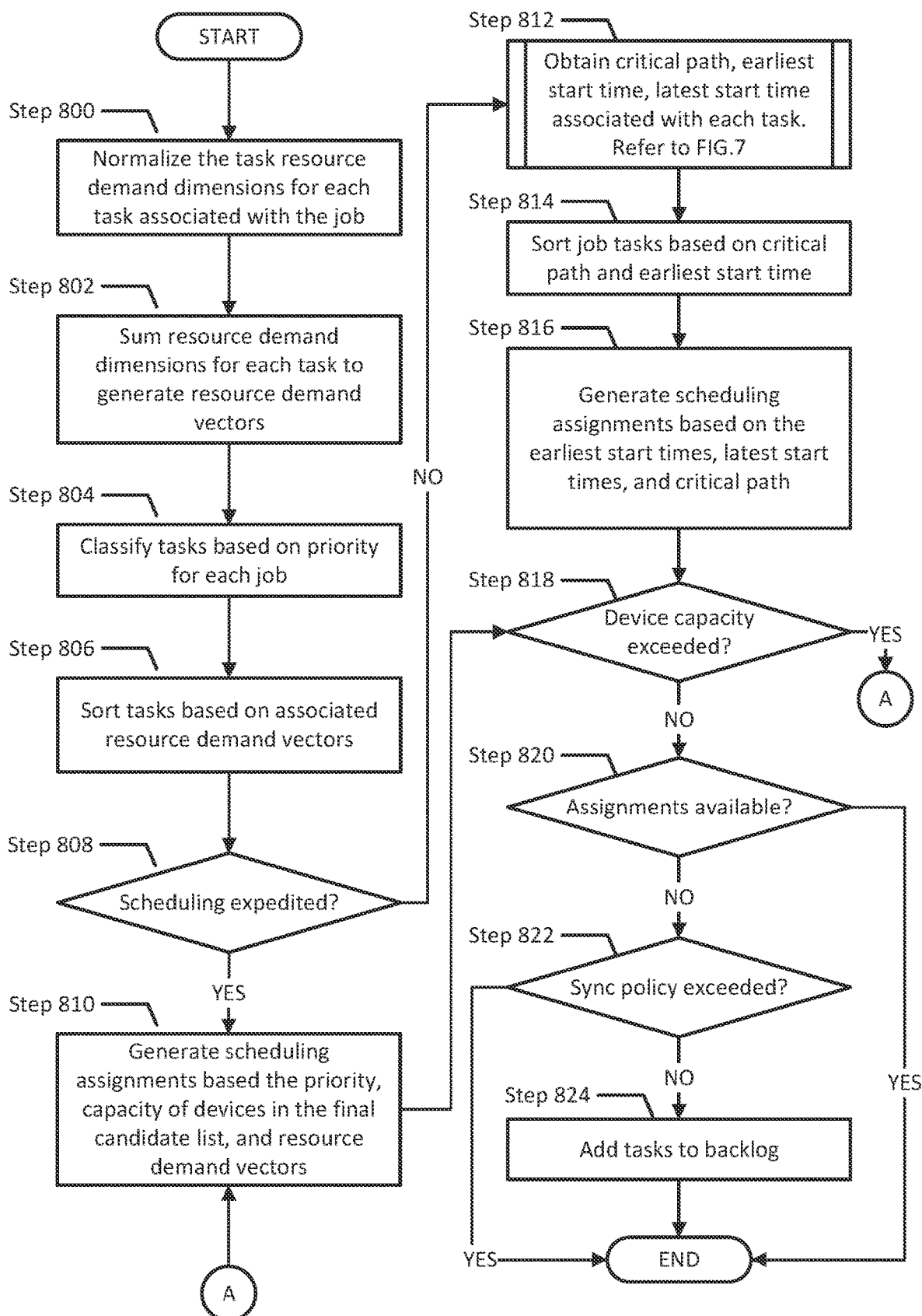
FIG. 8 shows a flowchart of a method for performing heuristic scheduling of application tasks within a domain in accordance with one or more embodiments disclosed herein.

FIG. 8 shows a flowchart of a method for performing heuristic scheduling of application tasks within a domain in accordance with one or more embodiments disclosed herein. The method of FIG. 8 may be performed by, for example, a local controller (e.g., 112A, FIG. 1A). Other components illustrated in FIG. 1A may perform all, or a portion, of the steps shown in FIG. 8 without departing from embodiments disclosed herein. While the various steps in the flowchart shown in FIG. 8 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

At Step 800, task resource demand dimensions are normalized for each task associated with the job. As discussed above, the scheduling package may include the resource requirements (resource demands) associated with the application tasks. The resource requirements may include resource units required to execute the application task. The resource units may include may include compute units (e.g., quantity of processors and/or processor cores), memory units (e.g., size of total memory capacity), network units (e.g., quantity network interface cards (NICs), and/or total network bandwidth), and accelerator units (e.g., quantity of graphics processing units (GPUs) and/or quantity of GPU memory, field programmable gate arrays (FPGAs) and/or quantity of FPGA logic elements, etc.) associated with each application task. The local controller may normalize the resource units associated with each application task using a reference device.

For example, the reference device may include 100 CPU cores, 32 gigabytes of memory for RAM, 40 gigabytes of memory for a GPU, and 10 gigabytes per second of network bandwidth. An application task may require 20 CPU cores, 8 gigabytes of memory for RAM, one 40 gigabyte GPU, and one 10 gigabytes per second NIC. The normalized resource demand dimensions associated with the application task would include 0.2 normalized compute units, 0.25 normalized memory units, 1.0 normalized accelerator units, and 1.0 normalized network units.

The task resource demand dimensions may be normalized for each task associated with the job via other and/or additional methods without departing from embodiments disclosed herein.

At Step 802, the resource demand dimensions are summed for each task to generate resource demand vectors. In one or more embodiments disclosed herein, the local controller sums the normalized resource demand dimensions for each application task to generate resource demand vectors associated with each application task. Continuing with the example discussed above in Step 800, an application task may include the normalized resource demand dimensions of 0.2 normalized compute units, 0.25 normalized memory units, 1.0 normalized accelerator units, and 1.0 normalized network units. The local controller may sum the resource demand dimensions associated with the application task to generate a resource demand vector of 2.45 corresponding to the application task. The resource demand dimensions may be summed for each application task to generate resource demand vectors via other and/or additional methods without departing from embodiments disclosed herein.

At Step 804, the tasks are classified based on priority for each job. The scheduling package may include a priority associated with each application task. The local controller may classify each application task based on the priority associated with each application task included in the scheduling package. The priority associated with an application task may determine when such an application is to be scheduled in the order of application tasks. Application tasks associated with higher priorities may be scheduled prior to application tasks associated with lower priorities. The local controller may classify each application task based on the priority designation associated with application task included in the scheduling package. In one or more embodiments disclosed herein, the local controller classifies application tasks for each scheduling job using the scheduling package associated with the scheduling job. The tasks may be classified based on priority for each scheduling job via other and/or additional methods without departing from embodiments disclosed herein.

At Step 806, the application tasks are sorted based on associated resource demand vectors. In one or more embodiments disclosed herein, the local controller sorts the application tasks in descending resource dimension vector order for each scheduling job. As a result, the application tasks are ordered with the application task associated with the highest resource demand vector in the first position and the application task associated with the lowest resource demand vector is in the last position. The application tasks may be sorted based on associated resource demand vectors via other and/or additional methods without departing from embodiments disclosed herein.

At Step 808, a determination is made as to whether scheduling is expedited. In one or embodiments disclosed herein, the local controller determines whether scheduling is expedited using the scheduling package associated with the scheduling job. As discussed above, the scheduling package may include the selected scheduling policies associated with the scheduling job. The selected scheduling policies may include makespan minimization. A makespan minimization operation may be computationally extensive and may not be performed when scheduling is expedited. The makespan minimization may not be among the selected scheduling policies if the scheduling is expedited. In one or more embodiments disclosed herein, if makespan minimization is included among the selected scheduling policies as specified by the scheduling package, then the local controller determines that the scheduling is not expedited. In one or more embodiments disclosed herein, if makespan minimization is included among the selected scheduling policies as specified by the scheduling package, then the local controller determines that the scheduling is not expedited. The determination as to whether scheduling is expedited may be made via other and/or additional methods without departing from embodiments disclosed herein.

In one or more embodiments disclosed herein, if it is determined that the scheduling is expedited, then the method proceeds to Step 810. In one or more embodiments disclosed herein, if it is determined that the scheduling is not expedited, then the method proceeds to Step 812.

At Step 810, scheduling assignments are generated based on the priority, capacity of devices in the final candidate list, and the resource demand vectors. In one or more embodiments disclosed herein, the local controller generates scheduling assignments for each application task. A scheduling assignment may refer to a device of the domain in which the local controller schedules to execute a corresponding application task. The local controller may schedule application tasks based on the associated priorities and the resource demand vectors. In other words, application tasks associated with higher priorities and larger resource demand vectors are scheduled prior to application tasks with lower priorities and lower resource demand vectors. The local controller may schedule all application tasks associated with a particular priority in descending resource dimension vector order prior to scheduling application tasks associated with the next lowest priority. Application tasks may be scheduled to devices of the final candidate list this that include the capacity to execute the application tasks based on the resource requirements of the application tasks and the capacity of the devices in the final candidate list. The scheduling assignments may follow a particular order of execution of the application tasks specified by a service dependency graph included in the scheduling package.

In one or more embodiments disclosed herein, the local controller may adhere to scheduling policy requirements associated with selected scheduling policies (e.g., scheduling efficiency, resource utilization, and resource cost) when scheduling application tasks to devices in the final candidate list. The scheduling policy requirements may be specified by the selected scheduling policies included in the scheduling package. For example, for resource utilization, the local controller may attempt to schedule application tasks in such a way as to maximize the capacity of the devices in the final candidate list allocated to execute the application tasks. In yet another example, for resource cost, the local controller may attempt to schedule application tasks to devices associated with the lowest available resource costs (e.g., less devices used, less resources of devices used, etc.). In a further example, for scheduling efficiency, the local controller may attempt to schedule application tasks as quickly as possible to minimize the overall scheduling time. The scheduling policy operations may be performed based on priorities associated with each selected scheduling policy.

Scheduling assignments may be generated based on the priority, capacity of devices in the final candidate list, and the resource demand vectors via other and/or additional methods without departing from embodiments disclosed herein.

In one or more embodiments disclosed herein, the method proceeds to Step 818 following Step 810.

At Step 812, the critical path, the earliest start time, and the latest start time associated with each task is obtained. For additional information regarding obtaining the critical path, the earliest start time, and the latest start time associated with each task, refer to FIG. 9.

At Step 814, the job tasks are sorted based on critical path and earliest start time. As discussed above, the local controller may obtain a critical path associated with the application tasks, an earliest start time and a latest start time associated with each application task. In one or more embodiments disclosed herein, the local controller sorts the application tasks in ascending earliest start time order. As a result, the application tasks are ordered with the application task associated with the highest resource demand vector in the first position and the application task associated with the lowest resource demand vector is in the last position. The application tasks may be sorted based on associated resource demand vectors via other and/or additional methods without departing from embodiments disclosed herein.

At Step 816, scheduling assignments are generated based on the earliest start times, latest start times, and the critical path. In one or more embodiments disclosed herein, the local controller generates scheduling assignments in adherence with the makespan minimization scheduling policy using the earliest start time, the latest start time, and the critical path of the application tasks. A scheduling assignment may refer to a device of the domain in which the local controller schedules to execute a corresponding application task. As discussed below, an application task may be scheduled between the earliest start time and the latest start time associated with the application task, improving the flexibility of scheduling application tasks. The local controller may schedule a first application task (e.g., the starting application task) on a first device based on the available capacity of the device. As a result, the first device may take time to execute the application task during scheduling. The first device may be unavailable during the execution time of the first application tasks. The execution time may be estimated based on the normalized compute unit requirements associated with the application task and the normalized compute units of a device.

Therefore, the next application task in the order may be scheduled on the first device if the associated latest start time is greater than the execution time of the first application task, otherwise the next application may be required to be scheduled in another device in the final candidate list. By using the earliest start time, the latest start time, and the execution times of the application tasks, the local controller may optimize the scheduling assignments of the application tasks to minimize resource utilization and overall execution time of application tasks using the flexibility provided by the earliest start time and latest start time. Additionally, the local controller may attempt to schedule application tasks included in the critical path to the same device.

In one or more embodiments disclosed herein, the local controller may adhere to other scheduling policy requirements associated with selected scheduling policies (e.g., scheduling efficiency, resource utilization, and resource cost) when scheduling application tasks to devices in the final candidate list. The scheduling policy requirements may be specified by the selected scheduling policies included in the scheduling package. For example, for resource utilization, the local controller may attempt to schedule application tasks in such a way as to maximize the capacity of the devices in the final candidate list allocated to execute the application tasks. In yet another example, for resource cost, the local controller may attempt to schedule application tasks to devices associated with the lowest available resource costs (e.g., less devices used, less resources of devices used, etc.). In a further example, for scheduling efficiency, the local controller may attempt to schedule application tasks as quickly as possible to minimize the overall scheduling time. The scheduling policy operations may be performed based on priorities associated with each selected scheduling policy.

Scheduling assignments may be generated based on the earliest start times, latest start times, and the critical path via other and/or additional methods without departing from embodiments disclosed herein.

At Step 818, a determination is made as to whether device capacity is exceeded. In one or more embodiments disclosed herein, the local controller determines whether the capacity of a device included in the scheduling assignments is exceeded. The local controller may compare the current capacity information associated with each device with the total resource demand dimensions of the one or more application tasks assigned to the device. In one or more embodiments disclosed herein, if the total resource demand dimensions exceeds the current capacity information of a device included in the scheduling assignments, then the local controller determines that a device capacity is exceeded. In one or more embodiments disclosed herein, if the total resource demand dimensions do not exceed the current capacity information of the devices included in the scheduling assignments, then the local controller determines that a device capacity is not exceeded. The determination as to whether device capacity is exceeded may be made via other and/or additional methods without departing from embodiments disclosed herein.

In one or more embodiments disclosed herein, if it is determined that a device capacity is exceeded, then the method proceeds to Step 810. In such embodiments, Step 810 may be repeated for all application tasks associated with devices that included exceed capacities to generate new scheduling assignments. In one or more embodiments disclosed herein, if it is determined that a device capacity is not exceeded, then the method proceeds to Step 820.

At Step 820, a determination is made as to whether the scheduling assignments are available. In one or more embodiments disclosed herein, the local controller sends an availability check request to the endpoint controllers of the devices included in the scheduling assignments to determine whether the scheduling assignments are available. The devices included in the scheduling assignment may be unavailable for any reason without departing from embodiments disclosed herein. For example, a device may be powered off, undergoing maintenance, experiencing failure, etc. In response to obtaining the availability check request, an endpoint controller may: (i) confirm that the devices are available, (ii) notify the local controller that the device is currently unavailable, or (iii) fail to respond within a configurable period of time (e.g., request timeout). In one or more embodiments disclosed herein, if the local controller obtains confirmation from each endpoint controller that all devices associated with the scheduling assignments are available, then the local controller determines that the scheduling assignments are available. In one or more embodiments disclosed herein, if the local controller obtains a notification from an endpoint controller that a device associated with the scheduling assignments is unavailable or an availability check request timeout occurs, then the local controller determines that the scheduling assignments are not available. The determination as to whether the scheduling assignments are available may be made via other and/or additional methods without departing from embodiments disclosed herein.

In one or more embodiments disclosed herein, if it is determined that the scheduling assignments are available, then the method ends following Step 820. In one or more embodiments disclosed herein, if it is determined that the scheduling assignments are not available, then the method proceeds to Step 822.

At Step 822, a determination is made as to whether a sync policy is exceeded. As discussed above with regard to Step 620, all, or a portion thereof, the scheduling assignments may be unavailable. As a result, it may be determined whether a sync policy is exceeded, and if not, the application tasks associated with unavailable scheduling assignments may be added to a backlog. In one or more embodiments disclosed herein, a sync policy may refer to one or more data structures that include retry requirements associated with application tasks. The retry requirements may specify a retry count limit and/or a retry time limit. The retry time limit may begin upon the start of the scheduling job associated with the application tasks. The sync policy may be included in the scheduling package. In one or more embodiments disclosed herein, the local controller checks whether the retry count and/or the retry time exceed the retry count limit and/or the retry time limit respectively. In one or more embodiments disclosed herein, if the retry count and/or the retry time do not exceed the retry count limit and/or the retry time limit respectively, then the local controller may determine that the sync policy is not exceeded. In one or more embodiments disclosed herein, if the retry count or the retry time exceed the retry count limit or the retry time limit respectively, then the local controller may determine that the sync policy is exceeded. The determination as to whether the sync policy is exceeded may be made via other and/or additional methods without departing from embodiments disclosed herein.

In one or more embodiments disclosed herein, if it is determined that a sync policy is exceeded, then the method ends following Step 822. In one or more embodiments disclosed herein, if it is determined that a sync policy is not exceeded, then the method proceeds to Step 824.

At Step 824, the application tasks are added to the backlog. As discussed above with regard to Steps 820 and 824, if the sync policy is not exceeded, then application tasks associated with unavailable scheduling assignments may be added to the backlog. In one or more embodiments disclosed herein, the backlog refers to one or more data structures that includes or otherwise specifies application tasks to be scheduled by the local controller. The backlog may include application task identifiers, scheduling packages and/or scheduling package identifiers associated with the application tasks, and other and/or additional information associated with application tasks to be scheduled by the local controller without departing from embodiments disclosed herein. The local controller may then repeat the methods of FIGS. 7-9 to schedule the application tasks included in the backlog. The application tasks may be added to the backlog via other and/or additional methods without departing from embodiments disclosed herein.

In one or more embodiments disclosed herein, the method ends following Step 824.

Fifth Example

The following section describes a fifth example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to include simple examples to illustrate, at least in part, concepts described herein.

Consider a scenario in which a local controller schedules application tasks to a final candidate list of devices in a domain. The application tasks include a total of eight application tasks (also referred to throughout this Detailed Description as services). The final candidate list of devices includes a total of three devices. At a first point in time, the local controller normalizes the task resource demand dimensions for each application task using the resource unit requirements associated with each application task included in the scheduling package and a reference device. For the sake of the example, the reference device includes 100 CPU cores, 32 gigabytes of memory for RAM, 40 gigabytes of memory for a GPU, and 10 gigabytes per second of network bandwidth. An application task of the eight application tasks requires 20 CPU cores, 8 gigabytes of memory for RAM, one 40 gigabyte GPU, and one 10 gigabytes per second NIC. The normalized resource demand dimensions associated with the application task therefore include 0.2 normalized compute units, 0.25 normalized memory units, 1.0 normalized accelerator units, and 1.0 normalized network units.

The local controller then sums the resource demand dimensions associated with each application tasks to generate resource demand vectors associated with each application task. The resource demand vectors for the application tasks may include values of 2.45, 3.1, 4.2, 1.8, 6.3, 5.1, 3.2, and 4.3 for each of the eight application tasks respectively. The local controller then classifies the tasks based on priority. The scheduling package includes priorities associated with the application tasks. The first, fourth, and fifth application tasks are associated with a high priority, the second, third, and eighth application tasks are associated with a medium priority, and the sixth and seventh application tasks are associated with a low priority. The local controller then sorts the application tasks in descending resource demand vector order. Based on the aforementioned resource demand vector values, the application task are sorted into the following order: fifth application task, sixth application task, eighth application task, third application task, seventh application task, second application task, first application task, and fourth application task.

The local controller then determines whether to the scheduling is expedited based on the scheduling package. The local controller identifies that the makespan minimization scheduling policy is selected, therefore, the local controller determines that the scheduling is not expedited. In response to the determination, the local controller obtains a critical path, earliest start time and a latest start time associated with each of the application tasks using reinforcement Q-learning. Refer to the sixth example for additional discussion regarding performing reinforcement Q-learning to obtain the critical path, the earliest start time, and the latest start times associated with the application tasks. The local controller then re-sorts the application tasks based on earliest start time.

The earliest start time associated with each application task includes zero, first relative time period, second relative time period, fourth relative time period, sixth relative time period, ninth relative time period, tenth relative time period, and twelfth relative time period respectively. Accordingly, application tasks are sorted as follows: first application task, second application task, third application task, fourth application task, fifth application task, sixth application task, seventh application task, and eighth application task. The local controller also identifies that the critical path includes the first application task and the eighth application task. The local controller also determines the estimated execution times associated with each application task and the devices in the final candidate list using the normalized compute units associated with the application task and the devices.

The local controller then generates the scheduling assignments based on the earliest start times, latest start times, and the critical path associated with the application tasks. The local controller schedules all eight of the application tasks within the two of the three devices of the candidate list of devices. The scheduling assignments for the first device include the first application task which executes until the seventh relative time period, the fourth application task which begins at the eight relative time period and executes until the ninth relative time period, the seventh application task with begins at the eleventh relative time period and ends at the twelfth relative time period, and the eighth application task which begins at the thirteenth relative time period and ends at the fourteenth relative time period.

The scheduling assignments for the second device include the second task which begins at the second relative time period and ends at the third relative time period, the third application task, which begins at the fourth relative time period and ends at the fifth relative time period, the fifth task which begins at the eighth relative time period and ends at the twelfth relative time period, and the sixth application task which begins at the thirteenth relative time period and ends at the fifteenth relative time period. As a result, the scheduling assignment are generated based on the critical path and in such a way as to minimize the execution time of the application tasks. The local controller may determine that the scheduling assignments do not exceed the device capacity and that the devices are available for assignment.

End of Fifth Example

Figure 9:
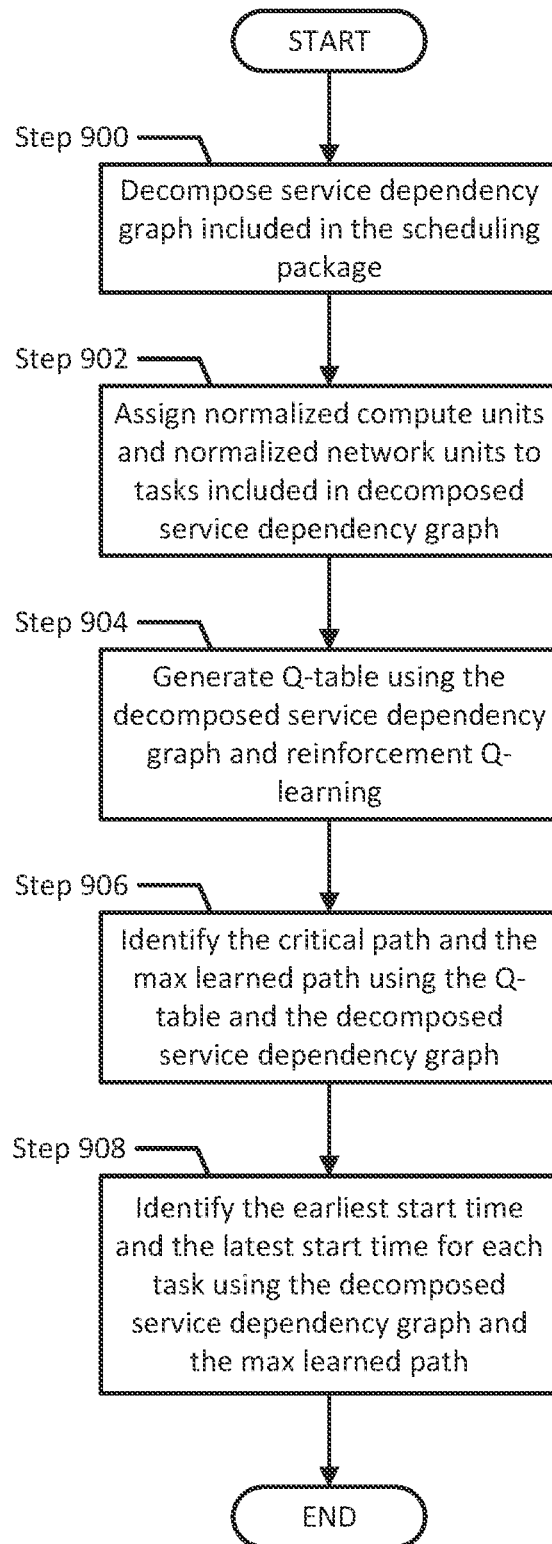
FIG. 9 shows a flowchart of a method for performing reinforcement learning during assignment of application tasks within a domain in accordance with one or more embodiments disclosed herein.

FIG. 9 shows a flowchart of a method for performing reinforcement learning during assignment of application tasks within a domain in accordance with one or more embodiments disclosed herein. The method of FIG. 9 may be performed by, for example, a local controller (e.g., 112A, FIG. 1A). Other components illustrated in FIG. 1A may perform all, or a portion, of the steps shown in FIG. 9 without departing from embodiments disclosed herein. While the various steps in the flowchart shown in FIG. 9 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

At Step 900, the service dependency graph included in the scheduling package is decomposed. As discussed above, the scheduling package may include a service dependency graph. The service dependency graph may refer to a directed acyclic graph that specifies a hierarchical relationship of dependencies between the services (e.g., application tasks) included in the service dependency graph. The service dependency graph may further include the compute units associated with each service and the network units associated with the dependent services (e.g., network bandwidth of the service divided by each connected service upon which the service is dependent). The service dependency graph may include other and/or additional information (e.g., service identifiers, mappings between dependent services, etc.) without departing from embodiments disclosed herein. In one or more embodiments disclosed herein, the local controller parses the service dependency graph to generate a decomposed service dependency graph. The decomposed service dependency graph may include each service included in the service dependency graph. Additionally, the decomposed service dependency graph may specify, for each service, the services upon which the service is dependent, the compute units associated with the service, and the network units associated with each service. The service dependency graph included in the scheduling package may be decomposed via other and/or additional methods without departing from embodiments disclosed herein.

At Step 902, normalized compute units and normalized network units are assigned to the decomposed service dependency graph. As discussed above, the decomposed service dependency graph may include compute units associated with each service and network units between each dependent service for each service. The local controller may normalize the compute units and network units associated with each service using a reference device.

For example, the reference device may include 10 CPU cores and 10 gigabytes per second of network bandwidth. An application task may require 20 CPU cores, and one 10 gigabytes per second network bandwidth between another dependent service. The normalized compute units associated with the application task would include 2.0 normalized compute units. Similarly, the normalized network units associated with the application task may include 1.0 normalized network units. The normalized network units may be used to identify the normalized network units between two dependent services by summing the normalized network units between two dependent services.

The local controller may assign the normalized compute units and the normalized network units to each associated service included in the decomposed service dependency graph. The normalized compute units and normalized network units may be assigned to the decomposed service dependency graph via other and/or additional methods without departing from embodiments disclosed herein.

At Step 904, the Q-table is generated using the decomposed service dependency graph and reinforcement Q-learning. In one or more embodiments disclosed herein, the local controller generates the Q-table by applying a reinforcement Q-learning algorithm to the information included in the decomposed service dependency graph. The reinforcement Q-learning algorithm may calculate the Q-value, also known as the reward score, for traversing from a first service to a next service upon which the first service is dependent. The Q-value may be calculated using the sum of the normalized compute units of the next service and the normalized network units between the current service and the next service, a learning rate, and a reward discount and the reinforcement Q-learning algorithm. The Q-value may be calculated for each service and next service included in the decomposed service dependency graph. The Q-table may include the current service, the next service, and the associated Q-value for each traversal between dependent services of the decomposed service dependency graph. The Q-table may include other and/or additional information (e.g., the learning rate, the reward discount, the normalized compute units, and the normalized network units between dependent services used to generate each Q-value) without departing from embodiments disclosed herein. The Q-table may be generated using the decomposed service dependency graph and reinforced Q-learning via other and/or additional methods without departing from embodiments disclosed herein.

At Step 906, the critical path and the max learned path are identified using the Q-table and the decomposed service dependency graph. In one or more embodiments disclosed herein, the local controller identifies the critical path by traversing from the final service to the first service included in the decomposed service dependency graph using the highest Q-values. Each service included in the traversal may be identified as a part of the critical path. For example, the final service may be connected to two other services (e.g., each of the two services are dependent upon the final service), a first service and a second service. The Q-value from the first service to the last service may be higher than the Q-value from the second service to the last service. Therefore, the critical path may include the final service and the first service.

In one or more embodiments disclosed herein, the local controller identifies the max learned path by identifying the longest path associated with each service using the decomposed service dependency graph. The longest path associated with a service may refer to the largest sum of normalized compute units and normalized network units between the starting service and the service. For example, there may be two paths from the starting service to a targeted service based on the decomposed service dependency graph. The first path may include a total of four services (e.g., includes two intermediate services) from the starting service to the targeted service, while the second path may include a total of three services (e.g., includes one intermediate service) from the starting service to the targeted service. The first path may include a higher total sum of normalized compute units and normalized network units between the four services than the total sum of normalized compute units and network units between the three services of the second path. As a result, the local controller may identify the first path as the longest path associated with the targeted service. The compilation of longest paths associated with each service included in the decomposed service dependency graph may be referred to as the max learned path.

The critical path and the max learned path may be identified using the Q-table and the decomposed service dependency graph via other and/or additional methods without departing from embodiments disclosed herein.

At Step 908, the earliest start time and the latest start time are identified for each task using the decomposed service dependency graph and the max learned path. In one or more embodiments disclosed herein, the local controller identifies the earliest start time by summing the normalized compute units and the normalized network units between the services of the longest path excluding the service itself. The starting service may include an earliest start time of zero (e.g., must be scheduled first). For example, a target service, or application task, may include a longest path that comprises the starting service, a first intermediate service, a second intermediate service, and the target service itself. The starting service may include 1.0 normalized compute units, the first intermediate service may include 2.0 normalized compute units, and the second intermediate service may include 4.0 normalized compute units. The normalized network units between the starting service and the first intermediate service may include 2.0 normalized network units, the normalized network units between the first intermediate service and the second intermediate service may include 2.0 normalized network units, and the normalized network units between the second intermediate service and the target service may include 1.0 normalized network units. Therefore, the local controller may identify the earliest start time associated with the target service as the $12^{th}$ time period relative to the scheduling of the application services.

In one or more embodiments disclosed herein, the earliest start time may refer to the earliest relative time period in which an associated application task (or service) may be scheduled compared to the other application tasks included in the scheduling job. A relative time period may refer to any period of time it may take to schedule all, or a portion thereof, an application task without departing from embodiments disclosed herein. The relative time periods may be used to schedule the application tasks in a particular order.

In one or more embodiments disclosed herein, the local controller identifies the latest start time associated with each task by subtracting (i) the normalized network units between each service and the corresponding next services in the decomposed service dependency graph included in the max learned path and (ii) the normalized compute units of each service from (iii) the earliest start time of the next service. In scenarios in which there are multiple next services included in the max learned path associated with a service, the next service with the smallest normalized network units between the service and the next service may be considered the next service. The starting service may have a latest start time of zero. In other words, the starting service of the decomposed service dependency graph must be first scheduled service. For example, a target service may include two next services in the max learned path. The first service may include a normalized network unit value of 2.0 between the target service and the second service may include a normalized network unit value of 3.0. Therefore, the first service may be considered the next service associated with the target service. The first service may include the $12^{th}$ relative time period as the earliest start time. The target service may include a normalized compute unit value of 2.0. Therefore, the latest start time associated with the target service may be identified as the $8^{th}$ relative time period.

In one or more embodiments disclosed herein, the latest start time may refer to the latest relative time period in which an associated application task (or service) may be scheduled compared to the other application tasks included in the scheduling job. As a result, an application task may be scheduled between the earliest start time and the latest start time, improving the flexibility of scheduling application tasks in a domain.

The earliest start time and the latest start time may be identified for each task using the decomposed service dependency graph and the max learned path via other and/or additional methods without departing from embodiments disclosed herein.

In or more embodiments disclosed herein, the local controller schedules the application tasks based on the earliest start time, latest start time, and the critical path via the methods described above in FIG. 8.

In one or more embodiments disclosed herein, the method ends following Step 908.

Sixth Example

The following section describes a sixth example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to include simple examples to illustrate, at least in part, concepts described herein.

Consider a scenario in which a local controller performs reinforcement Q-learning to identify the critical path, the earliest start times, and the latest start times associated with application tasks. The application tasks (or services) include seven total application tasks. The scheduling package includes a service dependency graph. The service dependency graph specifies dependencies between the application tasks. The first application task is a starting application task, which includes a dependency with each of the second application task, the third application task and the fourth application task (e.g., the second, third, and fourth application tasks are all dependent upon the first application task). The second application task includes a dependency with the third application task, the fifth application task and the sixth application task. The third application task includes a dependency with only on the sixth application task. The fourth application task includes a dependency with the sixth application task and the seventh application task. The fifth application task includes a dependency with only the eighth application task. The sixth application task includes a dependency with only the eighth application task. The seventh application task includes a dependency with the sixth application task and the eighth application task. The eighth application task is the ending application task and does not include any further dependencies.

The local controller decomposes the service dependency graph to generate the decomposed service dependency graph. The local controller then assigns normalized compute units associated with each application task and normalized network units between each dependent application tasks. The application tasks may be assigned the normalized compute units value of one, five, four, nine, six, five, one, and ten respectively. The normalized network unit values assigned between the first application task and the second application task, the first application task and the third application task, and the first application task and the fourth application task include two, two, and one respectively.

The normalized network unit values assigned between the second application task and the third application task, the second application task and the fifth application task, and the second application task and the sixth application task include one, two, and three respectively. The normalized network unit value assigned between the third application task and the sixth application task is two. The normalized network unit values assigned between the fourth application task and the sixth application task and the fourth application task and the seventh application task include three and two respectively. The normalized network unit value assigned between the fifth application task and the eighth application task is one. The normalized network unit value assigned between the sixth application task and the eighth application task is three. Finally, the normalized network unit values assigned between the seventh application task and the sixth application task and the seventh application task and the eighth application task include one and four respectively.

The local controller then applies a reinforcement Q-learning algorithm to the decomposed service dependency graph to generate a Q-table. The Q-table includes Q-values associated with each traversal from one application task to the next application task in the decomposed service dependency graph. The Q-value going from the first application task to the second application task is 1.4, the Q-value going from the first application task to the third application task is 1.2, the Q-value going from the first application task to the fourth application task is 2.0, and so on. The local controller then use the Q-table to identify the critical path and the max learned path. The critical path is identified by traversing the service dependency graph from the ending service to the starting service using the highest Q-values. The critical path includes the eighth application task to the sixth application task, the sixth application task to the third application task, the third application task to the second application task, and from the second application task to the first application task. Therefore, the critical path includes the first application task, the second application task, the third application task, the sixth application, and the eighth application task.

The max learned path is calculated by finding the longest path associated with each application task. The longest path includes the largest number of application tasks (e.g., largest sum of normalized compute units and normalized network units) required to get from the starting application task to the application task associated with the longest path. The max learned path comprises the longest path associated with each application task. The max learned path includes from the first application task to the second application task, from the second application task to the fifth application task, from the second application task to the third application task, from the third application task to the sixth application task, from the sixth application task to the eighth application task, from the first application task to the fourth application task, and from the fourth application task to the seventh application task.

The local controller then identifies the earliest start time and latest start time associated with each application task using the max learned path. The earliest start time is calculated by summing the normalized compute units of every task included in the max learned path leading up to the target service with the normalized network units between each application task leading up to the target service in the max learned path. Based on the aforementioned max learned path, the normalized compute unit values, and the normalized network unit values, the earliest start times are: zero (e.g., the starting application task is always scheduled first), three, nine, two, ten, fifteen, thirteen, and twenty-three respectively. The latest start time is calculated by subtracting the normalized compute units of next application task associated with the target application task included in the max learned path and the normalized network units between the target application task and the next application task from the earliest start time of the next application task. Based on the aforementioned max learned path, the normalized compute unit values, and the normalized network unit values, the latest start times are: zero (e.g., the starting application task is always scheduled first), three, nine, two, sixteen, fifteen, eighteen, and twenty-three (e.g., ending application task does not include a next application task so latest start time is equal to the earliest start time) respectively.

The local controller then uses the earliest start times, latest start times, and the critical path associated with the application tasks to generate scheduling assignments. Refer to the fifth example for additional discussion regarding examples generating scheduling assignments.

End of Sixth Example

Figure 10:
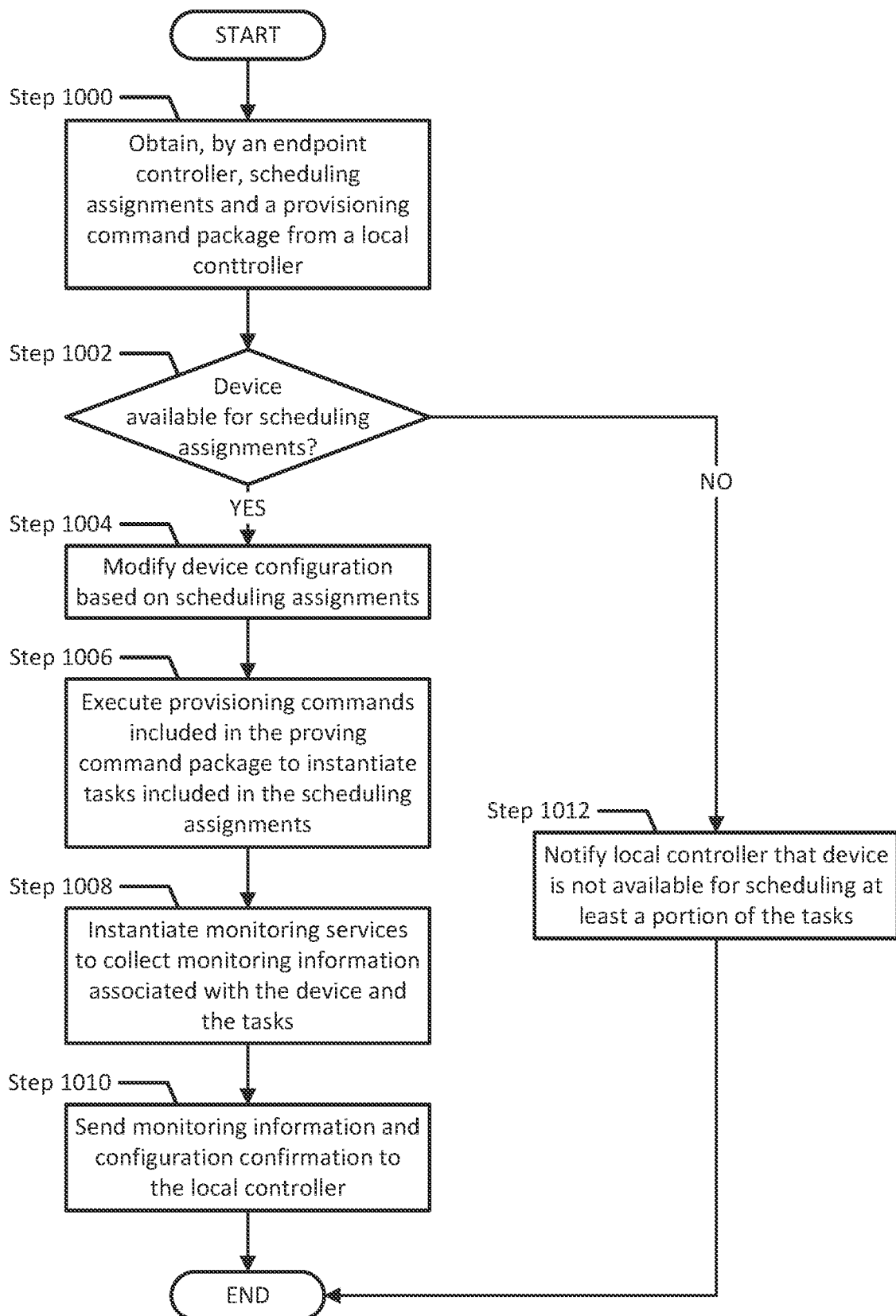
FIG. 10 shows a flowchart of a method for performing device level scheduling in accordance with one or more embodiments disclosed herein.

FIG. 10 shows a flowchart of a method for performing device level scheduling in accordance with one or more embodiments disclosed herein. The method of FIG. 10 may be performed by, for example, an endpoint controller (e.g., 126A, FIG. 1B). Other components illustrated in FIGS. 1A and 1B may perform all, or a portion, of the steps shown in FIG. 10 without departing from embodiments disclosed herein. While the various steps in the flowchart shown in FIG. 10 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

At Step 1000, scheduling assignments and a provisioning command package are obtained by an endpoint controller from a local controller. In one or more embodiments disclosed herein, the scheduling assignments and provisioning command package are provided to the endpoint controller using any appropriate method of data transmission. As an example, the local controller may communicate the scheduling assignments and provisioning command package as network data traffic units over a series of network devices that operatively connect the local controller and the endpoint controller. The scheduling assignments and provisioning command package may be obtained by an endpoint controller from a local controller via other and/or additional methods without departing from embodiments disclosed herein.

At Step 1002, a determination is made as to whether the device is available for the scheduling assignments. In one or more embodiments disclosed herein, the endpoint controller determines whether the available capacity of a device included is exceeded by the resource requirements of the one or more application tasks included in the scheduling assignments. The scheduling assignments may include the resource requirements of the one or more application tasks associated with the scheduling assignments. The endpoint controller may compare the current capacity information associated with the device with the total resource demand dimensions (e.g., resource requirements) of the one or more application tasks assigned to the device. In one or more embodiments disclosed herein, if the total resource demand dimensions exceeds the current capacity information of the device, then the endpoint controller determines that the device is not available for the scheduling assignments. In one or more embodiments disclosed herein, if the total resource demand dimensions do not exceed the current capacity information of the device, then the endpoint controller determines that the device is available for the scheduling assignments. The determination as to whether the device is available for the scheduling assignments may be made via other and/or additional methods without departing from embodiments disclosed herein.

In one or more embodiments disclosed herein, if it is determined that the device is not available for the scheduling assignments, then the method proceeds to Step 1012. In one or more embodiments disclosed herein, if it is determined that the device is available for the scheduling assignments, then the method proceeds to Step 1004.

At Step 1004, device configuration is modified based on the scheduling assignments. The endpoint controller may modify the configuration of the device based on the scheduling assignment by adjusting virtual infrastructure parameters, modifying the network configurations, setting up data streaming and/or collection services, allocating virtual and/or hardware devices to perform one or more application tasks, etc. The endpoint controller may perform and/or additional types of actions to reconfigure the device based on the scheduling assignments without departing from embodiments disclosed herein. The device configuration may be modified based on the scheduling assignments via other and/or additional methods without departing from embodiments disclosed herein.

At Step 1006, provisioning commands included in the provisioning command package are executed to instantiate the tasks included in the scheduling assignments. As discussed above, provisioning command package may refer to one or more data structures that includes instructions or commands for instantiating the application tasks the associated devices. The instructions may include API calls, binaries, and/or application task templates. The instructions may include other and/or additional information that may be used to instantiate the application tasks on the associated devices without departing from embodiments disclosed herein. The endpoint controller may execute the instructions or commands included in the provisioning command package, thereby instantiating the one or more application tasks included in the scheduling assignments associated with the device. As a result, the one or more application tasks may begin executing on the device. The provisioning commands included in the provisioning command package may be executed to instantiate the tasks included in the scheduling assignments via other and/or additional methods without departing from embodiments disclosed herein.

At Step 1008, monitoring services are instantiated to collect monitoring information associated with the device and the tasks. The endpoint controller may instantiate the monitoring services using any appropriate method of monitoring service instantiation without departing from embodiments disclosed herein. For example, the endpoint controller may spawn monitoring containers that may be executed by the device, thereby collecting monitoring information associated with the device and/or the execution of the application tasks. In yet another example, the endpoint controller uses monitoring service templates to instantiate monitoring services. The monitoring services may include tracing services generating tracing data (e.g., response latencies, count of successfully performed responses, count of total responses, application task availability, network latency, network hops, etc.) telemetry services generating telemetry data (e.g., performance metrics associated with device resources), and/or log services for generating log information (e.g., audit logs). The monitoring services may include other and/or additional types of services for monitoring the device and/or the execution of the application tasks without departing from embodiments disclosed herein. The monitoring information may include the aforementioned tracing data, telemetry data, and log information. The monitoring information may further include capacity information associated with the device. The monitoring services may periodically generate monitoring information. Monitoring services may be instantiated to collect monitoring information associated with the device and the application tasks via other and/or additional methods without departing from embodiments disclosed herein.

At Step 1010, monitoring information and configuration confirmation is sent to the local controller. The configuration confirmation may refer to one or more data structures that notifies the local controller that the device level scheduling was successfully performed and the application tasks included in the scheduling assignments are executing on the device. In one or more embodiments disclosed herein, the monitoring information and configuration confirmation are provided to the local controller using any appropriate method of data transmission. As an example, the endpoint controller may communicate the monitoring information and configuration confirmation as network data traffic units over a series of network devices that operatively connect the local controller and the endpoint controller. The monitoring information may be periodically sent to the local controller. The monitoring information and configuration confirmation may be provided to the local controller via other and/or additional methods without departing from embodiments disclosed herein.

In one or more embodiments disclosed herein, the method ends following Step 1010.

At Step 1012, the local controller is notified that the device is not available for scheduling at least a portion of the tasks. To notify the local controller that the device is not available for scheduling at least a portion of the tasks, the endpoint controller may send a message that includes an indication (e.g., flag, tag, description, etc.) that the device is not available. In one or more embodiments disclosed herein, the message is provided to the local controller using any appropriate method of data transmission. As an example, the endpoint controller may communicate the message as network data traffic units over a series of network devices that operatively connect the local controller and the endpoint controller. The local controller may be notified that the device is not available for scheduling at least a portion of the tasks via other and/or additional methods without departing from embodiments disclosed herein.

In one or more embodiments disclosed herein, the method ends following Step 1012.

Seventh Example

The following section describes a seventh example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to include simple examples to illustrate, at least in part, concepts described herein.

Consider a scenario in which an endpoint controller performs device level scheduling. At a first point in time, the endpoint controller obtains scheduling assignments and a provisioning command package from a local controller. The scheduling assignments include an ordered list of application tasks in which the endpoint controller is to instantiate on the device. The provisioning command package includes commands (e.g., API calls) and instructions (e.g., configuration files, binaries files, template files, etc.) to use to instantiate the application tasks.

After obtaining the scheduling assignments and the provisioning command package, the endpoint controller determines, using scheduling requirements associated with the application tasks and capacity information associated with the device, that the device is capable of executing the application tasks and is available for the scheduling assignments. In response to the determination, the endpoint controller modifies the device configuration based on the scheduling assignments by adjusting virtual resource parameters and allocating resources to execute the application tasks. The endpoint controller then executes the provisioning commands included in the provisioning command package to instantiate the application tasks.

The endpoint controller instantiates monitoring services to capture application tracing data, network tracing data, application task performance metrics, device performance metrics, and log information. The aforementioned data types are referred to as monitoring information. The endpoint controller collates the monitoring information, and sends the monitoring information and configuration confirmation to the local controller to confirm that the application tasks were successfully scheduled to the device. The endpoint controller periodically sends monitoring information to the local controller as new monitoring information is collected over time.

End of Seventh Example

Figure 11:
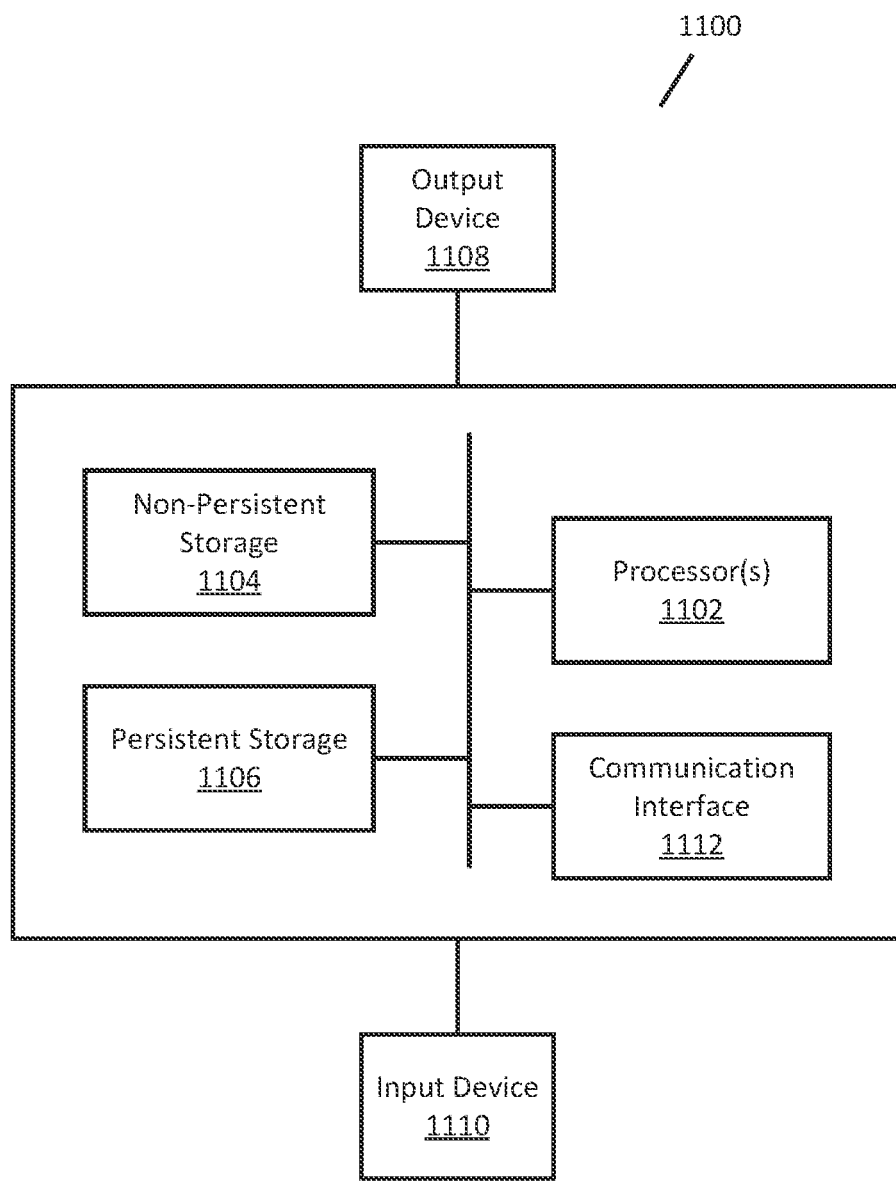
FIG. 11 shows a diagram of a computing device in accordance with one or more embodiments disclosed herein.

As discussed above, embodiments disclosed herein may be implemented using computing devices. FIG. 11 shows a diagram of a computing device in accordance with one or more embodiments disclosed herein. The computing device (1100) may include one or more computer processors (1102), non-persistent storage (1104) (e.g., volatile memory, such as random access memory (RAM), cache memory), persistent storage (1106) (e.g., a hard disk, an optical drive such as a compact disc (CD) drive or digital versatile disc (DVD) drive, a flash memory, etc.), a communication interface (1112) (e.g., Bluetooth® interface, infrared interface, network interface, optical interface, etc.), input devices (1110), output devices (1108), and numerous other elements (not shown) and functionalities. Each of these components is described below.

In one embodiment disclosed herein, the computer processor(s) (1102) may be an integrated circuit for processing instructions. For example, the computer processor(s) may be one or more cores or micro-cores of a processor. The computing device (1100) may also include one or more input devices (1110), such as a touchscreen, keyboard, mouse, microphone, touchpad, electronic pen, or any other type of input device. Further, the communication interface (1112) may include an integrated circuit for connecting the computing device (1100) to a network (not shown) (e.g., a local area network (LAN), a wide area network (WAN) such as the Internet, mobile network, or any other type of network) and/or to another device, such as another computing device.

In one embodiment disclosed herein, the computing device (1100) may include one or more output devices (1108), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1102), non-persistent storage (1104), and persistent storage (1106). Many different types of computing devices exist, and the aforementioned input and output device(s) may take other forms.

Embodiments described herein use a local controller of a domain to provision all, or portions thereof application tasks within a domain. The local controller may obtain a scheduling package from the global controller. In one or more embodiments, the local controller generates a final list of candidate devices based on scheduling requirements associated with application tasks specified by the scheduling package. Moreover, local controllers may generate scheduling assignments based on the final candidate list of device and the scheduling requirements. Accordingly, the local controller may efficiently schedule application tasks to devices included in the domain based on a scheduling package obtained from the global controller. Efficiently scheduling application tasks to devices of a domain may increase the efficiency of provisioning applications within the distributed multi-tiered computing environment, increase the likelihood of meeting the SLAs and SLOs for the application, and reduce the computational burden of the global controller and the local controllers when provisioning application portions within the distribute multi-tiered computing environment.

The problems discussed above should be understood as being examples of problems solved by embodiments disclosed herein, and embodiments disclosed herein should not be limited to solving the same/similar problems. The embodiments disclosed herein are broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing domain level scheduling in a distributed multi-tiered computing (DMC) environment, comprising:
   identifying, by a local controller associated with a DMC domain, a domain scheduling event associated with a scheduling job; and
   in response to identifying the domain scheduling event:
      performing, using a scheduling package associated with the scheduling job, constraint matching;
      identifying, from devices in the DMC domain, a candidate list of devices of the DMC domain to schedule tasks associated with the scheduling job based on locations of the devices in the DMC domain, the constraint matching, and service level objectives;

refining the candidate list of devices based on device configuration requirements, device management requirements, and security requirements to generate a final candidate list;

sending, by the local controller, a verification request to at least one endpoint controller associated with at least one device in the final candidate list;

confirming, using the at least one endpoint controller, data information, wherein the data information is included in the scheduling package;

scheduling tasks to the at least one device in the final candidate list;

generating scheduling assignments and provisioning command packages based on the scheduled tasks;

providing the scheduling assignments and the provision command packages to the at least one device in the final candidate list; and updating a graph based on the scheduling assignments.

2. The method of claim 1, wherein the tasks, location, and service level objectives are specified by the scheduling package associated with the scheduling job.

3. The method of claim 2, wherein the scheduling package is obtained from a global controller.

4. The method of claim 2, wherein the candidate list is identified using the scheduling package and the graph.

5. The method of claim 1, wherein the graph specifies all scheduling assignments associated with the DMC domain.

6. The method of claim 1, wherein the DMC domain comprises one selected from a group consisting of:
an edge domain;
a core domain; and
a cloud domain.

7. The method of claim 6, wherein:
the edge domain comprises an edge domain device set;
the core domain comprises a core domain device set; and
the cloud domain comprises a cloud domain device set.

8. A non-transitory computer readable medium comprising computer readable program code, which when executed by a computer processor enables the computer processor to perform a method for managing a distributed multi-tiered computing (DMC) environment, comprising:
identifying, by a local controller associated with a DMC domain, a domain scheduling event associated with a scheduling job; and
in response to identifying the domain scheduling event:
performing, using a scheduling package associated with the scheduling job, constraint matching;
identifying, from devices in the DMC domain, a candidate list of devices of the DMC domain to schedule tasks associated with the scheduling job based on locations of the devices in the DMC domain, the constraint matching, and service level objectives;
refining the candidate list of devices based on device configuration requirements, device management requirements, and security requirements to generate a final candidate list;
sending, by the local controller, a verification request to at least one endpoint controller associated with at least one device in the final candidate list;
confirming, using the at least one endpoint controller, data information, wherein the data information is included in the scheduling package;
scheduling tasks to the at least one device in the final candidate list;
generating scheduling assignments and provisioning command packages based on the scheduled tasks;
providing the scheduling assignments and the provision command packages to the at least one device in the final candidate list; and
updating a graph based on the scheduling assignments.

9. The non-transitory computer readable medium of claim 8, wherein the tasks, location, and service level objectives are specified by the scheduling package associated with the scheduling job.

10. The non-transitory computer readable medium of claim 9, wherein the scheduling package is obtained from a global controller.

11. The non-transitory computer readable medium of claim 9, wherein the candidate list is identified using the scheduling package and the graph.

12. The non-transitory computer readable medium of claim 8, wherein the graph specifies all scheduling assignments associated with the DMC domain.

13. The non-transitory computer readable medium of claim 8, wherein the DMC domain comprises one selected from a group consisting of:
an edge domain;
a core domain; and
a cloud domain.

14. The non-transitory computer readable medium of claim 13, wherein:
the edge domain comprises an edge domain device set;
the core domain comprises a core domain device set; and
the cloud domain comprises a cloud domain device set.

15. A system for managing a distributed multi-tiered computing (DMC) environment, the system comprising:
a DMC environment; and
a local controller associated with a DMC domain of the DMC environment, comprising a processor and memory, and configured to:
identify, by a local controller associated with a DMC domain, a domain scheduling event associated with a scheduling job; and
in response to identifying the domain scheduling event:
perform, using a scheduling package associated with the scheduling job, constraint matching;
identify, from devices in the DMC domain, a candidate list of devices of the DMC domain to schedule tasks associated with the scheduling job based on locations of the devices in the DM domain, the constraint matching, and service level objectives;
refine the candidate list of devices based on device configuration requirements, device management requirements, and security requirements to generate a final candidate list;
send, by the local controller, a verification request to at least one endpoint controller associated with at least one device in the final candidate list;
confirm, using the at least one endpoint controller, data information, wherein the data information is included in the scheduling package;
schedule tasks to the at least one device in the final candidate list;
generate scheduling assignments and provisioning command packages based on the scheduled tasks;
provide the scheduling assignments and the provision command packages to the at least one device in the final candidate list; and
update a graph based on the scheduling assignments.

16. The system of claim 15, wherein the tasks, location, and service level objectives are specified by the scheduling package associated with the scheduling job.

17. The system of claim 16, wherein the scheduling package is obtained from a global controller.

18. The system of claim 16, wherein the candidate list is identified using the scheduling package and the graph.

19. The system of claim 15, wherein the graph specifies all scheduling assignments associated with the DMC domain.

20. The system of claim 15, wherein the DMC domain comprises one selected from a group consisting of:
   an edge domain;
   a core domain; and
   a cloud domain.

\* \* \* \* \*